United States Patent
Baughman et al.

(10) Patent No.: US 11,085,422 B2
(45) Date of Patent: Aug. 10, 2021

(54) COILED AND TWISTED NANOFIBER YARNS FOR ELECTROCHEMICALLY HARVESTING ELECTRICAL ENERGY FROM MECHANICAL DEFORMATION

(71) Applicants: BOARD OF REGENTS, THE UNIVERSITY OF TEXAS SYSTEM, Austin, TX (US); INDUSTRY-UNIVERSITY COOPERATION FOUNDATION HANYANG UNIVERSITY, Seoul (KR)

(72) Inventors: Ray H. Baughman, Dallas, TX (US); Shaoli Fang, Richardson, TX (US); Carter S. Haines, Murphy, TX (US); Na Li, Dallas, TX (US); Jiangtao Di, Jiangsu (CN); Seon Jeong Kim, Seoul (KR); Shi Hyeong Kim, Seoul (KR); Keon Jung Kim, Seoul (KR); Tae Jin Mun, Seoul (KR); Changsoon Choi, Seoul (KR)

(73) Assignees: Board of Regents, The University of Texas System, Austin, TX (US); Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 16/624,115

(22) PCT Filed: Jun. 28, 2018

(86) PCT No.: PCT/US2018/039961
§ 371 (c)(1),
(2) Date: Dec. 18, 2019

(87) PCT Pub. No.: WO2019/032217
PCT Pub. Date: Feb. 14, 2019

(65) Prior Publication Data
US 2020/0208614 A1 Jul. 2, 2020

Related U.S. Application Data

(60) Provisional application No. 62/526,188, filed on Jun. 28, 2017.

(51) Int. Cl.
*F03G 1/06* (2006.01)
*D02G 3/38* (2006.01)
(Continued)

(52) U.S. Cl.
CPC ............... *F03G 1/06* (2013.01); *D02G 3/38* (2013.01); *D02G 3/441* (2013.01); *F03B 13/14* (2013.01);
(Continued)

(58) Field of Classification Search
CPC .... F03G 1/06; F03G 5/06; F03G 7/08; D02G 3/38; D02G 3/441; F03B 13/14
See application file for complete search history.

(56) References Cited

U.S. PATENT DOCUMENTS 9,514,892 B2 * 12/2016 Kim .................. H01G 11/04
2007/0243124 A1 * 10/2007 Baughman ............... D01F 9/12
423/447.1
(Continued)

*Primary Examiner* — Sean Gugger
(74) *Attorney, Agent, or Firm* — Dickinson Wright PLLC; Ross Spencer Garsson

(57) ABSTRACT

Yarn energy harvesters containing conducing nanomaterials (such as carbon nanotube (CNT) yarn harvesters) that electrochemically convert tensile or torsional mechanical energy into electrical energy. Stretched coiled yarns can generate 250 W/kg of peak electrical power when cycled up to 24 Hz, and can generate up to 41.2 J/kg of electrical energy per mechanical cycle. Unlike for other harvesters, torsional rotation produces both tensile and torsional energy harvest-
(Continued)

ing and no bias voltage is required, even when electrochemically operating in salt water. Since homochiral and heterochiral coiled harvester yarns provide oppositely directed potential changes when stretched, both contribute to output power in a dual-electrode yarn. These energy harvesters were used in the ocean to harvest wave energy, combined with thermally-driven artificial muscles to convert temperature fluctuations to electrical energy, sewn into textiles for use as self-powered respiration sensors, and used to power a light emitting diode and to charge a storage capacitor.

30 Claims, 37 Drawing Sheets

(51) Int. Cl.
  *D02G 3/44* (2006.01)
  *F03B 13/14* (2006.01)
  *F03G 1/02* (2006.01)
  *F03G 5/06* (2006.01)
  *F03G 7/08* (2006.01)
  *D02G 3/02* (2006.01)

(52) U.S. Cl.
  CPC .................. *F03G 1/02* (2013.01); *F03G 5/06* (2013.01); *F03G 7/08* (2013.01); *D02G 3/02* (2013.01); *D10B 2101/122* (2013.01)

(56) References Cited

U.S. PATENT DOCUMENTS

| | | | |
|---|---|---|---|
| 2008/0170982 A1* | 7/2008 | Zhang | C01B 32/15 423/447.3 |
| 2009/0021106 A1* | 1/2009 | Baughman | F03G 7/065 310/300 |
| 2011/0020563 A1* | 1/2011 | Jiang | H01J 37/20 427/554 |
| 2012/0100203 A1* | 4/2012 | Fang | A61L 17/04 424/443 |
| 2015/0152852 A1* | 6/2015 | Li | D01F 6/00 60/528 |
| 2015/0354101 A1* | 12/2015 | Liao | D03D 15/08 442/182 |
| 2016/0064156 A1* | 3/2016 | Mirvakili | H01G 9/048 361/502 |
| 2016/0222536 A1* | 8/2016 | Schauer | C25F 1/00 |
| 2016/0241119 A1* | 8/2016 | Keeler | H02K 33/00 |
| 2016/0336119 A1* | 11/2016 | Kim | H01G 11/56 |
| 2017/0309409 A1* | 10/2017 | Kim | H01G 11/30 |
| 2018/0327937 A1* | 11/2018 | Di | D02J 11/00 |
| 2018/0374659 A1* | 12/2018 | Kim | H01G 11/28 |
| 2019/0006125 A1* | 1/2019 | Kim | H01G 11/26 |
| 2019/0096540 A1* | 3/2019 | Baughman | B29C 70/14 |

* cited by examiner

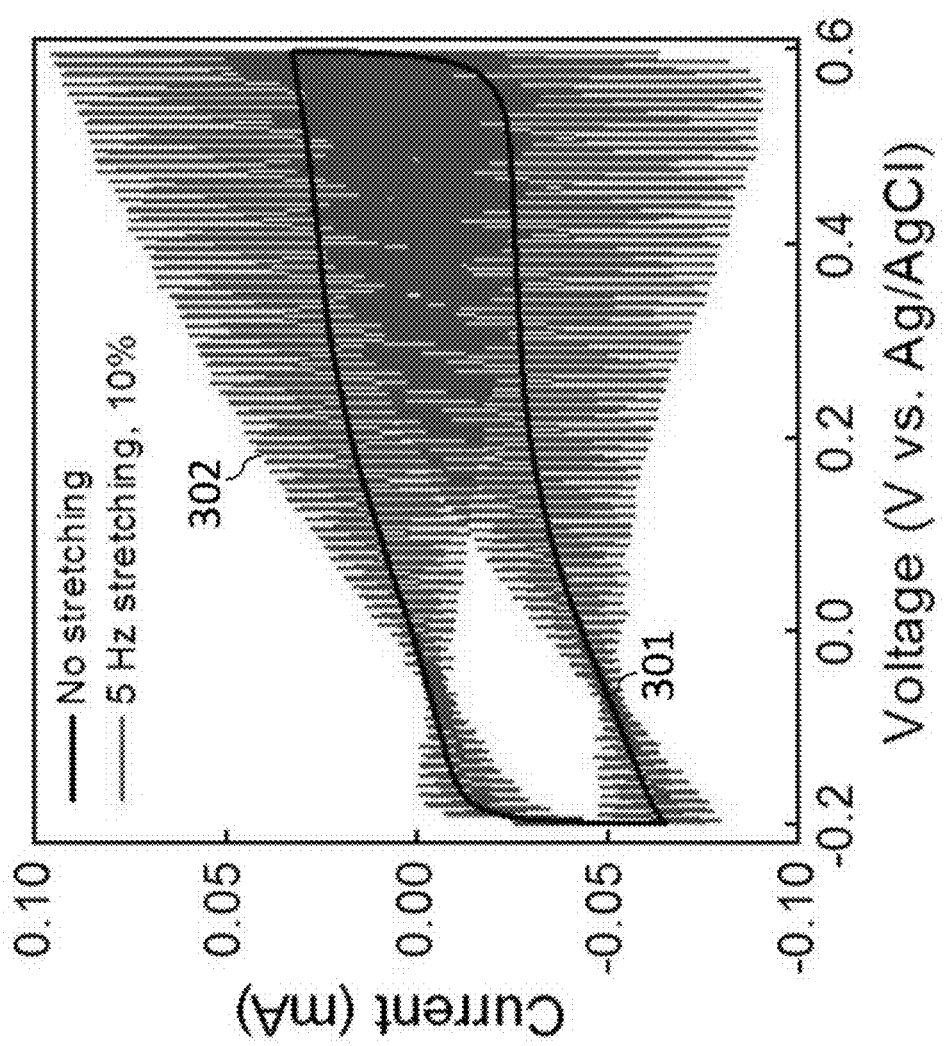

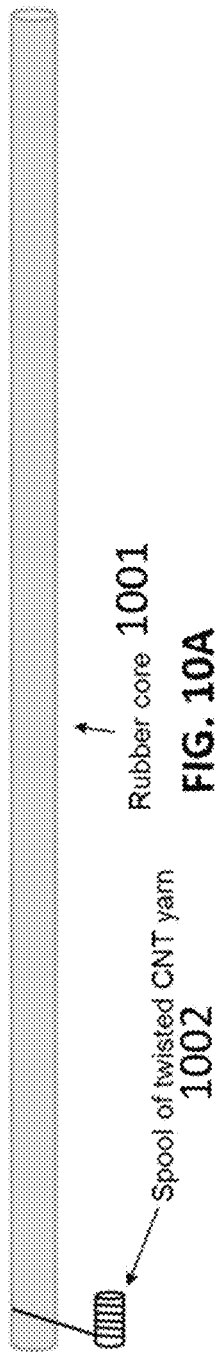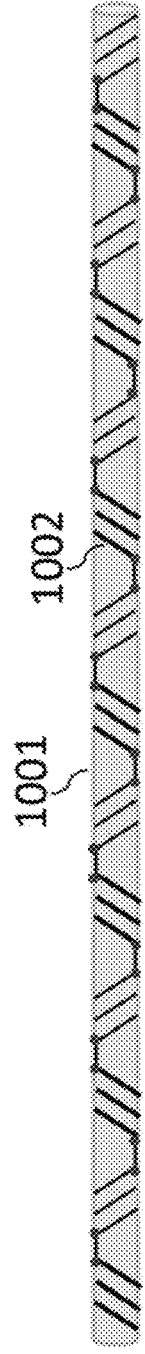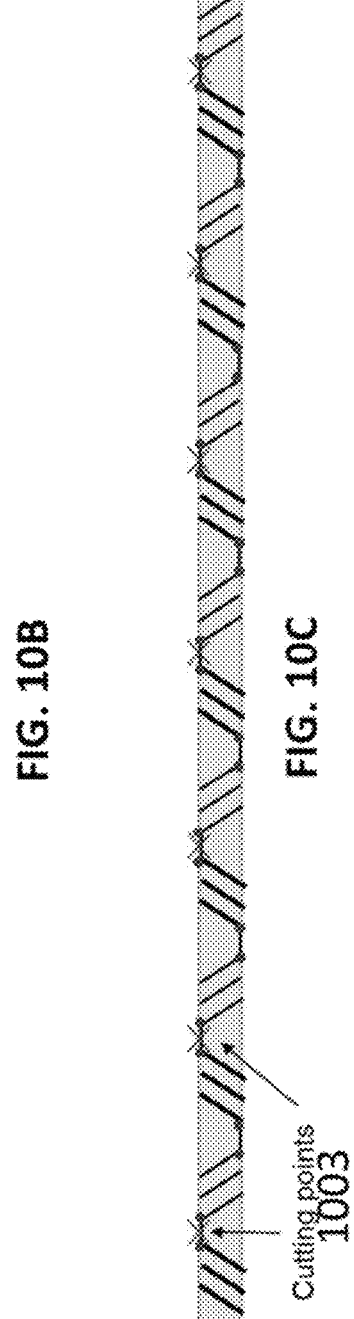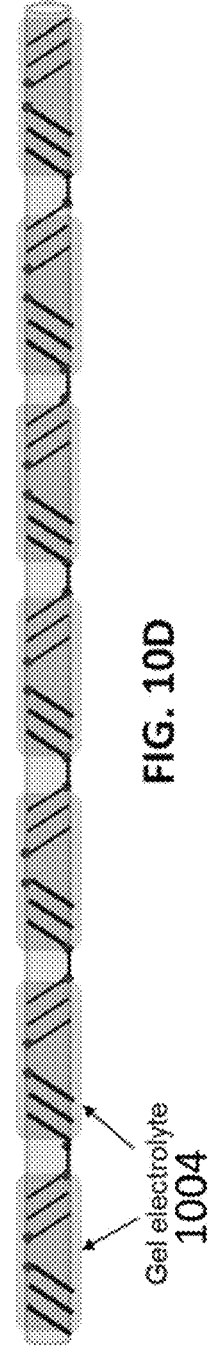
FIG. 10A — Rubber core 1001, Spool of twisted CNT yarn 1002
FIG. 10B — 1001, 1002
FIG. 10C — Cutting points 1003
FIG. 10D — Gel electrolyte 1004

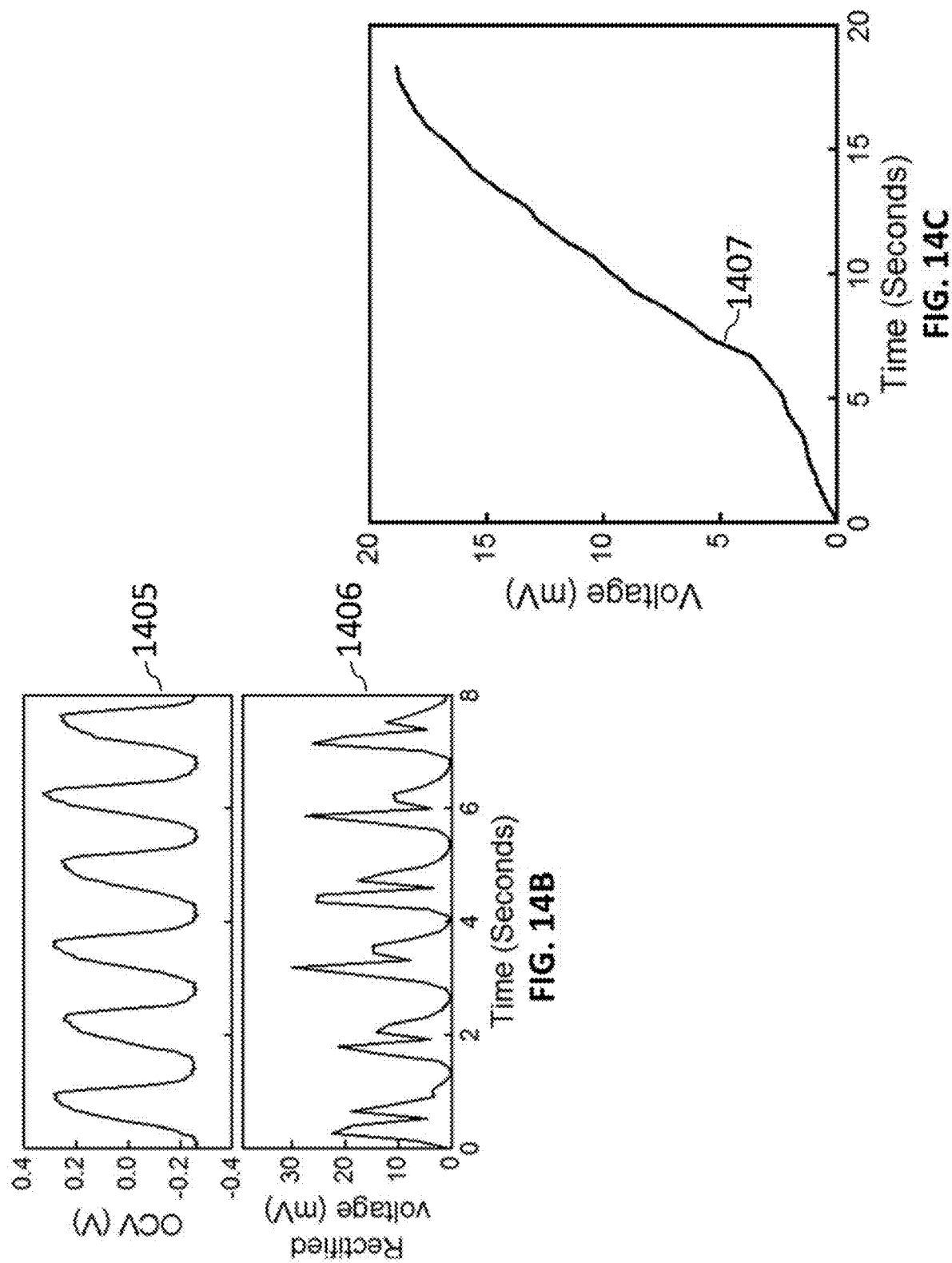

COILED AND TWISTED NANOFIBER YARNS FOR ELECTROCHEMICALLY HARVESTING ELECTRICAL ENERGY FROM MECHANICAL DEFORMATION

CROSS-REFERENCE TO RELATED APPLICATIONS

This application for Patent is a 35 U.S.C § 371 national application of PCT Application No. PCT/US18/39961, filed on Jun. 28, 2018, entitled "Coiled And Twisted Nanofiber Yarns For Electrochemically Harvesting Electrical Energy From Mechanical Deformation", which claims priority to U.S. Provisional Patent Application No. 62/526,188, entitled "Coiled And Twisted Nanofiber Yarns For Electrochemically Harvesting Electrical Energy From Mechanical Deformation," filed Jun. 28, 2017, which provisional application (including appendices) is incorporated by reference herein in its entirety.

GOVERNMENT INTEREST

This invention was made with government support under Air Force Office of Scientific Research grants FA9550-15-1-0089 and FA9550-12-1-0035, Air Force Grant AOARD-FA2386-13-4119, NASA project NNX15CS05C, and Office of Naval Research grant N00014-14-1-0158. This invention was also made with government support under Grant No. 2013K1A3A1A32035592 awarded in a Korea-US Air Force Cooperation Program. The United States government has certain rights in the invention.

FIELD OF INVENTION

Yarn energy harvesters containing conducting nanomaterials, which yarn energy harvesters that can electrochemically convert the energy change of tensile or torsional deformations directly into electrical energy.

BACKGROUND OF INVENTION

Improved means for converting large-stroke and low-frequency mechanical energy into electrical energy are needed for diverse applications, from harvesting the mechanical energy of ocean waves to powering wearable electronics and medical devices within the human body. When driven by artificial muscles that produce large-stroke mechanical deformations from environmental humidity or temperature changes, such converters could be used to power wireless sensors for the "Internet of Things".

Electromagnetic electric energy generators, which are basically motors operated in reverse, have been available for almost two centuries, and successfully meet many needs. However, they suffer from low power densities and high cost per Watt when scaled to the millimeter and smaller dimensions needed for emerging applications (Beeby 2009). Piezoelectric and ferroelectric harvesters work well for high-frequency, low-strain deformations (Persano 2013), especially, when individual nanofibers are driven at ultrahigh resonant frequencies (Wang 2006), but lack the elasticity needed for harvesting the energy of large tensile strains. Electrostatic harvesters based on triboelectric charge (Niu 2015; Wen 2014) provide remarkable performance, and are promising for future applications. Harvesters using the coupling between flowing fluids and electronic charge are also receiving considerable attention (Yin 2014; Ghosh 2003; Liu 2007), but need improvements to increase power output. Various types of electrochemically-based mechanical energy harvesters are known, including conducting polymer harvesters (Park 2013), lithium-battery-based bending harvesters (Kim 2016), and ionic-polymer-metal-composite (IPMC) harvesters (Aureli 2010), but have so far not provided competitive performance. The capacitance change caused by mechanically changing the area of liquid contact with two charged or self-charged capacitor electrodes has been used for dielectric (Krupenkin 2011) and electrochemical (Moon 2013) energy harvesting, but are in early development.

Rubber-based dielectric capacitors provide an especially attractive way to convert large-stroke mechanical energy into electrical energy. In commercial devices, a thin elastomeric sheet is sandwiched between two deformable electrodes (Pelrine 2008; Chiba 2008). An applied voltage (V), typically about a thousand volts, is used to inject a charge, Q, into this elastomeric capacitor. When stretched, the Poisson's ratio causes the rubber dielectric to decrease thickness, thereby increasing capacitance (C). A stress-induced capacitance change ($\Delta C$) produces a voltage change, according to Q=CV, which enables efficient harvesting of electrical energy.

To avoid these high voltages, and associated circuits, the inventors previously tried to make a twisted non-coiled carbon nanotube yarn mechanical energy harvester that electrochemically generated electrical energy when stretched. However, even when volt-scale positive or negative bias voltages were applied, tensile stresses of up to 45 MPa resulted in such small short circuit currents that the only possible application was as an externally powered strain sensor (Mirfakharal 2008).

SUMMARY OF INVENTION

Yarn energy harvesters containing conducing nanomaterials (such as carbon nanotube (CNT) yarn energy harvesters) are described that can electrochemically convert tensile or torsional mechanical energy into electrical energy. Stretching coiled yarns can generate up to at least 250 W/kg of peak electrical power when cycled up to 24 Hz and can provide up to at least 41.2 J/kg of electrical energy per mechanical cycle. Unlike for other harvesters, torsional rotation can produce both tensile and torsional energy harvesting and no bias voltage is required, even when electrochemically operating in salt water. Reflecting this novel twist-based mechanism for converting mechanical energy to electrical energy, the harvesters of invention embodiments are called "twistron harvesters." Since homochiral and heterochiral coiled harvester yarns provide oppositely directed potential changes when stretched, both can contribute to output power in a dual-electrode yarn. These energy harvesters are used in the ocean to harvest wave energy, combined with thermally-driven artificial muscles to convert temperature fluctuations to electrical energy, sewn into textiles for use as self-powered respiration sensors, and used to power a LED and to charge a storage capacitor. The development of "piezoelectrochemical spectroscopy" and insights into the hierarchical origins of capacitance have increased fundamental understanding.

Inventors have developed CNT yarns that can be stretched to generate a peak electrical power of over 250 W per kg of yarn, without needing an external power source to provide a bias voltage.

In general, in one embodiment, the invention features a mechanical energy harvester. The mechanical energy harvester includes a first electrode, a second electrode, and an electrolyte. Both the first electrode and the second electrode are immersed in the electrolyte. There exists a path for ionic conductivity between the first electrode and the second electrode. The energy harvester is operable to generate power without an external bias voltage. At least one electrode comprises a twisted, high-electrochemical-surface-area, conductive yarn.

Implementations of the invention can include one or more of the following features:

The twisted yarn can be additionally coiled.

The coil spring index can be between 0.2 and 0.8.

The energy harvester can be operable to convert tensile deformation directly into electrical energy.

The energy harvester can be operable to convert torsional deformation directly into electrical energy.

The energy harvester can include high-surface-area carbon materials.

The high-surface-area carbon materials can be selected from a group consisting of carbon nanotubes, carbon nanohorns, graphene, fullerene, activated carbon, carbon black, carbon nanofibers, and combinations thereof.

The energy harvester can be operable to provide at least 20 W of peak electrical power per kilogram of the twisted, high-electrochemical-surface-area, conductive yarn when stretched at rates above 20 Hz.

The energy harvester can be operable to provide at least 10 J of electrical energy per kilogram of the twisted, high-electrochemical-surface-area, conductive yarn per mechanical cycle.

The twisted yarn can be selected from a group consisting of cone spun yarns, funnel spun yarns, Fermat spun yarns, and dual-Archimedean spun yarns.

The twisted yarn can have a diameter between 10 µm and 500 µm.

The twisted yarn can include a twisted single-ply yarn having a diameter between 100 nm and 10 µm.

At least one electrode can include an overcoat that includes an elastomeric barrier material.

The elastomeric barrier material can include polyurethane.

The electrolyte can include NaCl.

The electrolyte can include hydrochloric acid.

The electrolyte can be a gel electrolyte.

The energy harvester can be operable to generate a change of voltage of at least 50 mV during stretch.

The twisted yarn can be wrapped around an elastomeric support.

The twisted yarn wrapped around an elastomeric support can be wrapped in a helical manner to provide a homochiral coil.

The twisted yarn wrapped around an elastomeric support can be wrapped in a helical manner to provide a heterochiral coil.

The harvester can include a plurality of segments which are electrically connected in series, in parallel, or in combinations thereof.

Both the first electrode and the second electrode can include twisted, high-electrochemical-surface area, conductive yarn.

The first electrode can increase in potential when stretched. The second electrode can decrease in potential when stretched.

The first electrode can include homochiral coils. The second electrode can include heterochiral coils.

The first electrode and the second electrode can both be homochiral or heterochiral and mechanically deformed with opposite phases.

The first energy harvesting electrode and the second energy harvesting electrode can include twisted yarns wrapped around a stretchable core.

At least one energy harvesting electrode can include an auxiliary conductor which lowers the impedance of the energy harvester.

The first electrode and second electrode can be components of the same yarn.

In general, in another embodiment, the invention features a textile that includes an above-described energy harvester.

In general, in another embodiment, the invention features a method of making an energy harvester. The method includes the step of spinning sheets of aligned carbon nanotubes into high strength carbon nanotube yarns. The method further includes the step of inserting twist into the high strength carbon nanotube yarns that are under tension to yield a twisted yarn. The method further includes the step of forming an electrode comprising the twisted carbon nanotube yarn.

The method further includes the step of immersing the electrode in an electrolyte.

Implementations of the invention can include one or more of the following features:

The method can further include a step of inserting additional twist until coils spontaneously form.

The method can further include a step of adding a high-surface-area carbon material to the twisted carbon nanotube yarn electrode.

The high-surface-area carbon material can be selected from a group consisting of carbon nanotubes, carbon nanohorns, graphene, fullerene, activated carbon, carbon black, carbon nanofibers, and combinations thereof.

The electrode can be operable to generate an average electrical power of at least 10 W per kilogram of the carbon nanotube yarn, without requiring an external bias voltage.

Tensile or torsional oscillations of the twisted carbon nanotube yarn can be converted directly into electrical energy.

The energy harvester can be operable to provide at least 20 W of peak electrical power per kilogram of the carbon nanotube yarn when cycled at rates above 20 Hz.

The energy harvester can be operable to provide at least 10 J of electrical energy per kilogram of the carbon nanotube yarn per mechanical cycle.

The step of spinning can be selected from a group consisting of cone spinning, funnel spinning, Fermat spinning, tow-spinning, and dual-Archimedean spinning.

The step of spinning can be cone spinning.

The twisted carbon nanotube yarn can have a diameter between 10 µm and 500 µm.

The twisted carbon nanotube yarn can have a diameter between 100 nm and 10 µm.

The electrode can include an overcoat comprising an elastomeric barrier material.

The elastomeric barrier material can include polyurethane.

The electrolyte can include NaCl.

The electrolyte can include hydrochloric acid.

In general, in another embodiment, the invention features a method that includes selecting a twistron mechanical energy harvester that includes an electrode including a twisted, high-electrochemical-surface-area, conductive yarn. The electrode is immersed in an electrolyte. The method further includes applying mechanical energy to deform the yarn by tension, torsion, or combinations thereof, to convert the mechanical energy directly to electrical energy.

Implementations of the invention can include one or more of the following features:

The minimum applied strain can be selected to prevent yarn snarling from occurring.

The twisted, high-electrochemical-surface-area, conductive yarn can be additionally coiled.

The yarn can include high-surface-area carbon material.

The high-surface-area carbon material can be selected from a group consisting of carbon nanotubes, carbon nanohorns, graphene, fullerene, activated carbon, carbon black, carbon nanofibers, and combinations thereof.

The electrode can generate an average electrical power of at least 1 W per kilogram of the twisted, high-electrochemical-surface-area, conductive yarn, without requiring an external bias voltage.

The twistron mechanical energy harvester can provide at least 20 W of peak electrical power per kilogram of the twisted, high-electrochemical-surface-area, conductive yarn when stretched at rates above 20 Hz.

The twistron mechanical energy harvester can provide at least 1 J of electrical energy per kilogram of the twisted, high-electrochemical-surface-area, conductive yarn, per mechanical cycle.

The twisted yarn is selected from a group consisting of cone spun yarns, funnel spun yarns, Fermat spun yarns, and dual-Archimedean spun yarns.

The twisted yarn can be a cone spun yarn.

The twisted single yarn can have a diameter between 10 µm and 500 µm.

The twisted single yarn can have a diameter between 100 nm and 10 µm.

The electrode can include an overcoat that includes an elastomeric barrier material.

The elastomeric barrier material can include polyurethane.

The electrolyte can include NaCl.

The twisted yarn can be wrapped around a stretchable core.

The twist direction and wrapping direction can be of the same chirality.

The twist direction and the wrapping direction can be of opposite chirality.

The electrolyte can include hydrochloric acid.

The mechanical energy can be supplied by a human body.

The mechanical energy can be supplied by an oscillating source.

The oscillating source can be ocean waves.

The oscillating source can include one or more water wheels.

The method can further include utilizing the generated electrical energy to power a device selected from a group consisting of sensor nodes, sensors, actuators, transmitters, wearable electronics, and combinations thereof.

The energy harvester can be incorporated into a textile.

In general, in another embodiment, the invention features an electrochemical mechanical energy harvester that includes an electrolyte-containing electronically conducting yarn electrode that is operable to cause a reversible change in electrochemical capacitance when the level of inserted twist is changed, thereby enabling the harvesting of torsional mechanical energy as electrical energy. The electrochemical mechanical energy harvester further includes a counter electrode. The electrochemical mechanical energy harvester further includes an electrolyte that ionically connects said electronically conducting electrode and said counter electrode.

Implementations of the invention can include one or more of the following features:

The electrochemical mechanical energy harvester can be operable to cause a reversible change in open circuit voltage of at least 20 mV when the level of inserted twist is changed.

The electronically conducting yarn electrode can be operable to cause the reversible change in electrochemical capacitance of at least 5% when the level of inserted twist is changed.

The electronically conducting yarn electrode can have an electrochemical capacitance of at least 0.5 Farads per gram of electrochemically-active material.

In general, in another embodiment, the invention features an electrochemical mechanical energy harvester that includes an electrolyte-containing coiled electronically conducting yarn electrode that is operable to cause reversible changes in electrochemical capacitance when either stretched, twisted, or combinations thereof, thereby enabling the harvesting of either tensile mechanical energy, torsional mechanical energy or a combination of tensile and torsional mechanical energy, as electrical energy. The electrochemical mechanical energy harvester further includes a counter electrode. The electrochemical mechanical energy harvester further includes an electrolyte that ionically connects said electronically conducting electrode and said counter electrode.

Implementations of the invention can include one or more of the following features:

The electrochemical mechanical energy harvester can be operable to cause a reversible change in open circuit voltage of at least 20 mV when the level of inserted twist is changed.

The electronically conducting yarn electrode can be operable to cause the reversible change in electrochemical capacitance of at least 5% when the level of inserted twist is changed.

The electronically conducting yarn electrode can have an electrochemical capacitance of at least 0.5 Farads per gram of electrochemically-active material.

In general, in another embodiment, the invention features a wearable self-generating and storing packing. The wearable self-generating and storing packing includes an electrochemical mechanical energy harvester that is a twistron fiber harvester. The wearable self-generating and storing packing further includes a stretchable fiber supercapacitor.

Implementations of the invention can include one or more of the following features:

The twistron fiber harvester can include a first fiber that is stretchable, a homochiral CNT yarn wrapped about the first fiber, a heterochiral CNT yarn wrapped about the first fiber, a first solid electrolyte about the first fiber wrapped with the homochiral CNT yarn and the heterochiral CNT yarn, and a first tube about the first solid electrolyte about the fiber wrapped with the homochiral CNT yarn and the heterochiral CNT yarn. The first tube can be stretchable. The stretchable fiber supercapacitor can include a second fiber that is stretchable, an anode including a first substantially non-twisted CNT yarn wrapped about the second fiber, a cathode including a second substantially non-twisted CNT yarn wrapped about the second fiber, a second solid electrolyte about the second fiber wrapped with the anode and the cathode, and a second tube about the second solid electrolyte about the second fiber wrapped with the anode and the cathode. The second tube can be stretchable.

The first fiber, the second fiber, the first tube, and the second tube can each include rubber.

The wearable self-generating and storaging packing of Claim 74 can include a plurality of twistron fiber harvesters and a plurality of stretchable fiber supercapacitors (SFSCs).

BRIEF DESCRIPTION OF THE DRAWINGS

FIG. 1A shows schematic illustrations of cone, funnel, Fermat, and dual-Archimedean spinning, which are used to make twistron harvesters, and the cross sections of the resulting respective yarns.

FIG. 1B shows an illustration of a torsional-tethered coiled harvester electrode and counter and reference electrodes in an electrochemical bath, showing the coiled yarn before and after stretch.

FIG. 1C provides graphs that show, respectively, the time dependence of the sinusoidal applied tensile strain and the resulting change in open-circuit voltage (OCV) and short-circuit current (SCC) for a cone-spun coiled harvester that is harvesting tensile mechanical energy in a 0.1 M aqueous HCl electrolyte.

FIG. 1D is a graph that shows capacitance and OCV versus applied tensile strain for a coiled twistron harvester in 0.1 M HCl electrolyte. The inset 112 provides the cyclic voltammogram (CV) curve for 0% strain and 30% strain.

FIG. 1E is a graph that shows the frequency dependence of peak power, peak-to-peak OCV, and electrical energy per cycle for 50% stretch of a 8.5% untwisted coiled harvester in 0.1 M HCl electrolyte.

FIG. 1F is a graph that shows generated peak voltage and peak power versus load resistance for a coiled yarn and a partially untwisted coiled yarn when stretched at 1 Hz to the maximum reversible elongation.

FIG. 2A is a graph that shows the generated peak power and peak voltage versus load resistance for 1 Hz stretch to 30% strain for the cone spun harvester of FIG. 1A and an otherwise identical dual-Archimedean-spun harvester.

FIG. 2B is a graph that shows the negligible effect of 30,000 stretch/release cycles on peak power, average power, and electrical energy per cycle for the above twistron yarn, when cycling at 1 Hz to 30% strain in 0.6 M NaCl at 0° C. The inset of FIG. 28 shows output power versus time during typical cycles.

FIG. 2C is a graph that shows the dependence of capacitance and electrode potential on isometric twist and untwist for a non-coiled, 47-mm-long, 360-μm-diameter, cone-spun yarn in 0.1 M HCl.

FIG. 2D are graphs that show OCV versus time during 60% stretch in 0.1 M HCl for homochiral and heterochiral cone-spun yarns produced by mandrel coiling on a stretched rubber core, showing opposite stretch-induced voltage responses for the homochiral and heterochiral yarns. The inset of the graph of FIG. 2D illustrate the opposite changes in yarn twist in response to stretch for homochiral and heterochiral coils.

FIGS. 3A-3D show piezoelectrochemical spectroscopy and its application for twistron harvesters.

FIG. 3A is a graph that shows the cyclic voltammogram (50 mV/s scan rate) of a coiled twistron electrode in 0.1 M HCl during 5 Hz sinusoidal stretch to 10%.

FIG. 3B is a graph that shows the magnitude and phase of current fluctuations relative to the applied mechanical stretch. The potential of both the minimum current amplitude and the 180 degree phase shift correspond to the PZC (−58 mV vs. Ag/AgCl).

FIG. 3C is a graph that shows OCV (versus PZC) in different electrolytes for 1 Hz strain, indicating the combined effects of chemically-induced charge injection and stretch-induced capacitance change.

FIG. 3D is a graph that shows the negligible dependence of PZC on applied tensile strain for increasing and decreasing strain and temperature. The inset of FIG. 3D shows that the PZC varies little with temperature.

FIG. 4A is a graph that shows the peak power and peak output voltage versus load resistance for 1 Hz, 30% stretch of a two-electrode twistron harvester containing an energy-harvesting, coiled CNT yarn working electrode, which is wrapped with a non-harvesting, non-coiled CNT yarn counter electrode. Polyvinyl alcohol (PVA) containing 0.1 M HCl was used to protect the harvester and electronically insulate opposite electrodes. The inset of FIG. 4A shows that the OCV versus time, before and after PVA coating.

FIG. 4B is a graph that shows peak-to-peak OCV and peak SCC at 1 Hz and 50% strain for series and parallel connected two-electrode harvesters made from the homochiral and heterochiral yarns. The yarns were coated with 10 wt % PVA/4.5 M LiCl gel electrolyte after being sewn into a textile. The insets of FIG. 4B show low and high magnification photographs of the textile at 0% and 50% strain (scale bar: 1 cm).

FIG. 4C is a graph that shows the peak power, average power, and energy per cycle generated by a coiled twistron harvester when mechanically stretched and twisted by an in-series, coiled, 127-μm-fiber-diameter nylon artificial muscle (located over the electrolyte bath) that converts thermal energy into mechanical energy. The inset of FIG. 4C shows an illustration of twistron up-twist and stretch during muscle heating, and the reverse processes during muscle cooling.

FIG. 4D is a graph that shows the frequency dependence of peak power and energy-per-cycle before and after incorporating a Pt wire current collector into a coiled twistron yarn. The inset of FIG. 4D is an SEM image of this harvester (scale bar: 100 μm) showing the coiled CNT yarn and Pt wire.

FIG. 5A is a TEM image showing MWNT collapse to increase inter-nanotube van der Waals energy in a MWNT bundle.

FIG. 5B is scanning transmission microscope (STEM) image showing the origin of the high capacitance of MWNT bundles.

FIGS. 5C-5D are graphs that show peak power (FIG. 5C) and frequency-normalized peak power (FIG. 5D), respectively, versus the frequency at which this peak power was obtained for present and prior-art technologies for piezoelectric (PZ), electrostatic (ES), triboelectric (TEG), and dielectric elastomer (DEG) generators.

FIG. 7A shows cyclic voltammograms of the yarn during 10% sinusoidal stretch at 5 Hz and with no stretch. FIG. 7B shows the difference between the curves in FIG. 7A, to highlight the AC current caused by stretching. FIG. 7C plots the amplitude of the AC current in FIG. 7B as a function of the applied voltage, and extrapolates this trend to predict that the PZC occurs at −950 mV vs. Ag/AgCl.

FIG. 9A illustrates a twistron harvester in which twisted fibers of opposite chiralities are wrapped around a rubber fiber core, and then overcoated with gel electrolyte. FIG. 9B depicts a textile woven from yarns of FIG. 9A and fibers made using non-twisted electrodes, which act as supercapacitor yarns for storing energy. These non-twisted electrodes can be connected in parallel to store more charge, while the twisted harvester electrodes can be connected in series to increase generated voltage. The generated AC voltage from the harvesting yarns can be rectified through a diode bridge for storage in the energy storage yarns.

FIGS. 10A-10D illustrate the fabrication of a complete harvester yarn which combines opposite chirality harvester electrodes and gel electrolyte along the length of the yarn. The twisted fiber of FIG. 10A is wrapped around a rubber mandrel in alternating directions to make the structure of FIG. 10B. Cutting at the points designated in FIG. 10C and coating with gel electrolyte, as shown in FIG. 10D, yields series-connected harvesters along the length of the yarn.

FIG. 1A is a configuration of the self-generating and storaging package, which has an energy harvester and supercapacitor based on carbon nanotube (CNT) yarn twist. Each of the harvester and supercapacitor include two CNT yarns, silicone rubber fiber, and solid electrolyte in silicone rubber tube. The energy harvester shown in FIG. 11A includes a homochiral CNT yarn and heterochiral CNT yarn (similar to as shown in FIG. 9A). When stretching the harvester, the homochiral CNT yarn is twisted and the heterochiral CNT yarn is untwisted. FIG. 11B is an illustration of the supercapacitor, which includes two non-twisted CNT yarns for anode and cathode. When stretching the supercapacitor, both non-twisted CNT yarns retain essentially constant capacitance, so no electrical energy is generated.

FIG. 12A shows capacitance change and open circuit voltage of a CNT yarn that enwrapping rubber fiber clockwise direction when stretched to 80% strain. Twist insertion of CNT yarn was controlled from −2000 (counter clockwise direction) to 2000 (clockwise direction) turns/m. Negative sign of twist insertion represent heterochiral CNT yarn, and positive sign of twist insertion represent homochiral CNT yarn. FIG. 12B shows capacitance and peak-to-peak open circuit voltage versus strain for the homochiral (squares 1203 and 1205, respectively) and heterochiral (squares 1204 and 1206, respectively) CNT yarns enwrapping a rubber fiber. FIG. 12C shows open circuit voltage of one-body energy harvester when stretched using 1 Hz sinusoidal wave to 60% strain. FIG. 12D shows voltage and peak power versus frequency. The inset of FIG. 12D shows voltage and peak power versus load resistance.

FIG. 13A shows cyclic voltammetry curves measured from 100 to 1000 mV/s for a solid-state stretchable fiber supercapacitor (SFSC) coated with solid electrolyte gel (comprising 10 wt % polyvinyl alcohol, PVA, in 0.1 M HCl). FIG. 13B shows galvanostatic charge/discharge curves measured from 1.6 μA/cm$^2$ to 16 μA/cm$^2$ current densities. FIG. 13C shows calculated linear capacitance (normalized by SFSC length) and areal specific capacitance (normalized by the surface area of SFSC) at scan rate from 100 to 1000 mV/s. FIG. 13D shows static CV curves of a solid-state SFSC for 0 to 60% strains. The insets of FIG. 13D show optical images of the SFSC at 0% and 60% strains. FIGS. 13E-13F show capacitance retention during sinusoidal stretching and 180 degree bending deformation for 1000 cycles. For FIGS. 13E-13F, capacitance was measured after each mechanical deformation cycle. The inset of FIG. 13E shows dynamic CV curves of the solid-state SFSC at 0% strain and 1 Hz stretched to 60% strain. The insets of FIG. 13F shows optical images and CV curve of the solid-state SFSC at 0° and 180° bending state.

FIGS. 14A-14C show the performance of a self-generating and storaging package. FIG. 14A shows OC voltage as a function of the number of TFH. Insets of FIG. 14A show optical images of a self-generating and storaging package woven into a glove at 0% and 50% strain. FIG. 14B shows OCV and rectified OCV at 0.75 Hz from a rectification circuit. FIG. 14C shows the time dependence of SFSC voltage when charging three SFSCs connected in parallel.

DETAILED DESCRIPTION

Figure 1A:
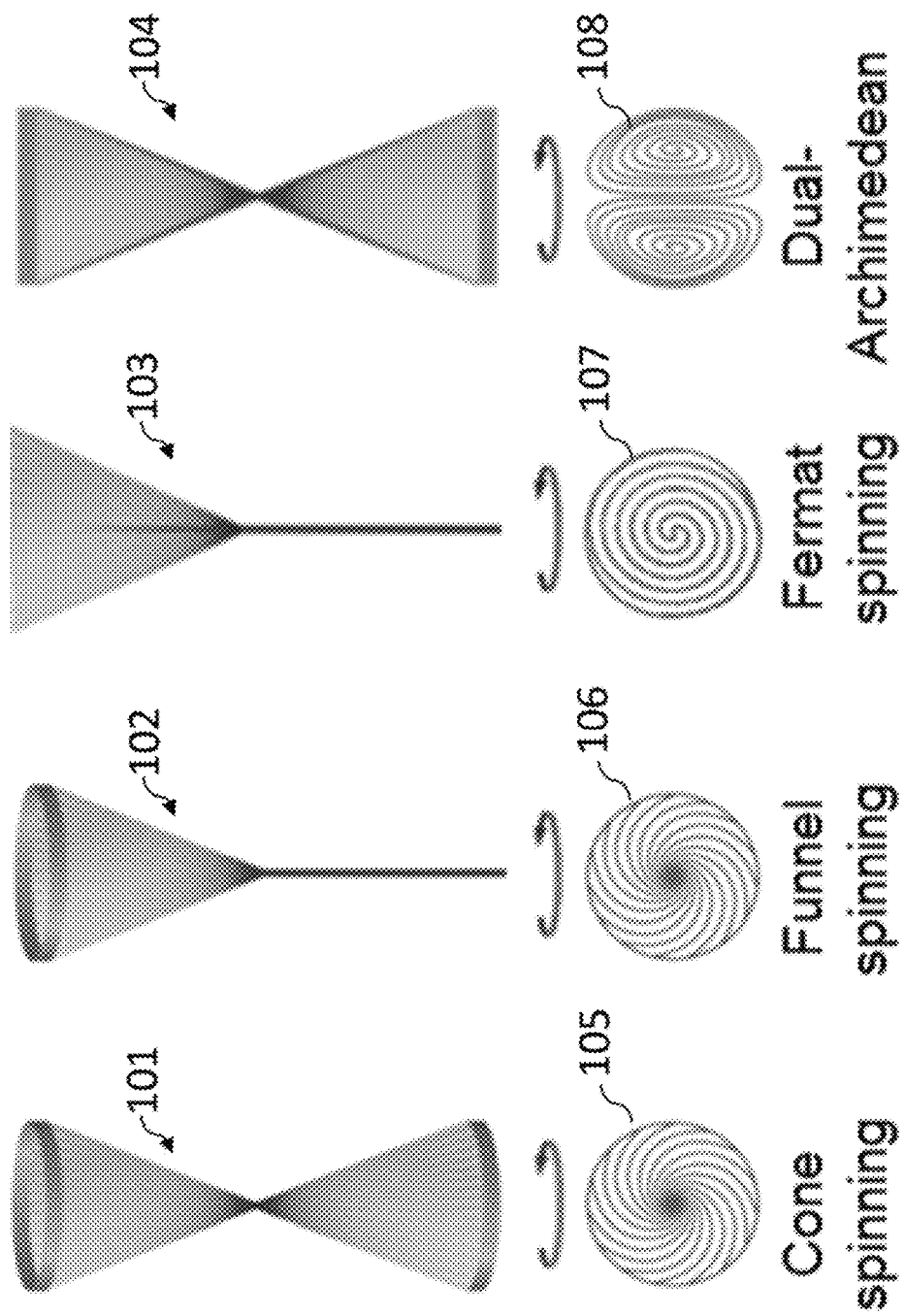
FIGS. 1A-1F show twistron harvester configuration, structure, and performance for tensile energy harvesting in 0.1 M HCl.

In some embodiments, harvesters were produced by spinning sheets of forest-drawn carbon multi-walled nanotubes (MWNT) into high strength yarns (Zhang 2004; Zhang 2005). Due to large MWNT diameters, MWNT bundling, and the absence of pseudo-capacitive redox groups, these yarns have a capacitance of <15 F/g (Lepró 2012). By inserting extreme twist into a CNT yarn that supports a weight, coils initiate and propagate, producing a highly elastic, uniformly coiled structure. FIG. 1A illustrates the spinning methods and resulting yarn topologies before the onset of coiling. FIG. 1A are schematic illustrations of cone 101, funnel 102, Fermat 103, and dual-Archimedean 104 spinning, which are used to make twistron harvesters, and the cross sections 105-108 of the resulting respective yarns. Unless otherwise noted, the harvester yarns had a diameter of 50 to 70 μm when twisted to just before coiling, and were made by the cone spinning process shown in FIG. 1A. Such harvesters can generally be made from twisted, high-electrochemical-surface-area, conductive yarn, where "high-electrochemical-surface-area" yarns are yarns which are capable of providing at least 0.1 Farads per gram of active material.

Figure 1B:
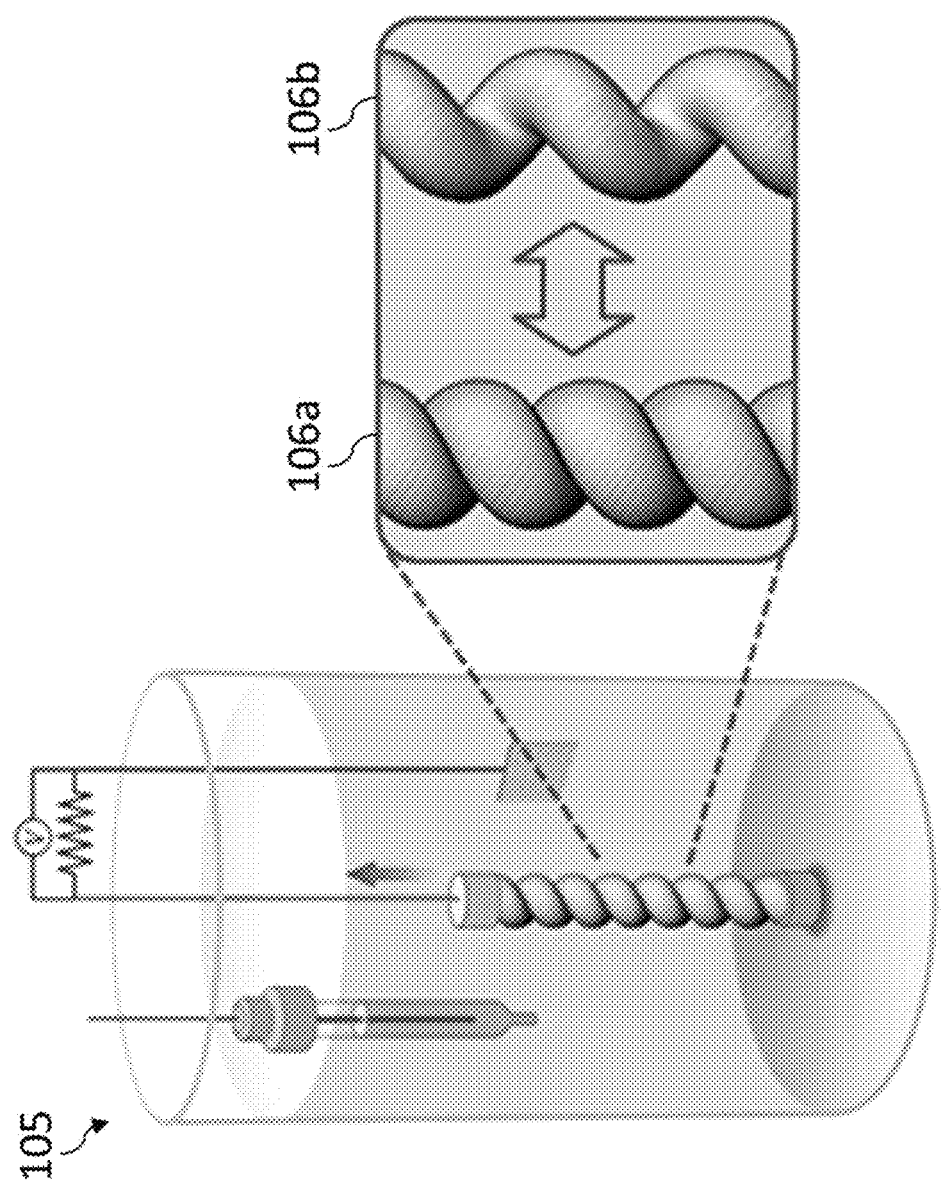

FIG. 1B illustrates the electrochemical cell used for the initial characterization of harvester yarns, which comprises a coiled MWNT yarn working electrode, a high-surface-area counter electrode, and a reference electrode that are immersed in aqueous electrolyte. FIG. 1B shows an illustration of a torsional-tethered coiled harvester electrode and counter and reference electrodes in an electrochemical bath 105a, showing the coiled yarn before and after stretch (yarn 106a and yarns 106b, respectively).

Figure 1C:
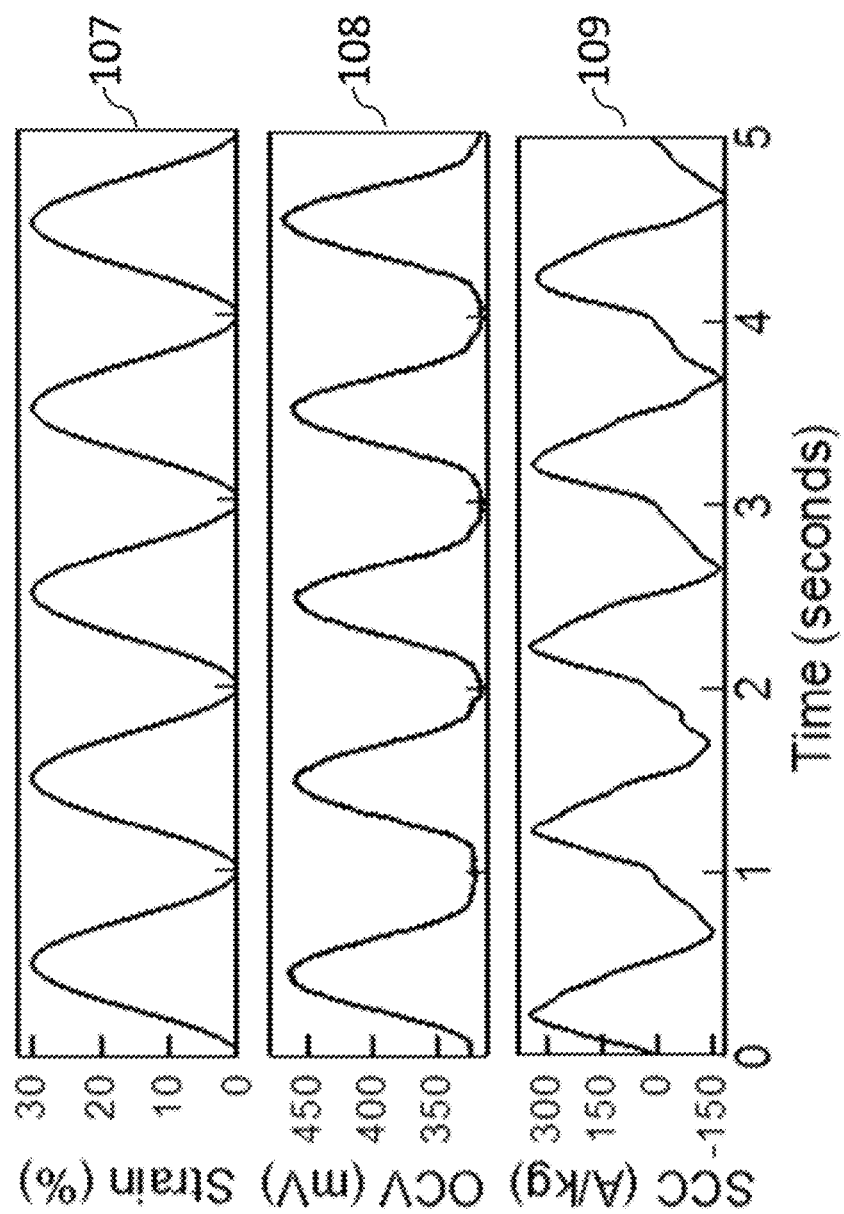

FIG. 1C provides graphs 107-109 that show, respectively, the time dependence of the sinusoidal applied tensile strain and the resulting change in open-circuit voltage (OCV) and short-circuit current (SCC) for a cone-spun coiled harvester that is harvesting tensile mechanical energy in a 0.1 M aqueous HCl electrolyte. FIG. 1C shows the time dependence of open-circuit voltage (OCV) and short circuit current (SCC) generated by a coiled cone-spun harvester during 1 Hz sinusoidal stretch to 30% strain in 0.1 M HCl electrolyte. This sinusoidal stretch does not generally produce sinusoidal variation in OCV or SCC. Such non-linear response occurs when harvesting is conducted over a strain range that includes yarn snarling, since the voltage generated per change in strain is greatest when no snarling occurs. Consequently, peak power can exceed average power by more than the factor of 2 expected for a purely sinusoidal voltage profile, since the voltage peaks most sharply when the yarn is fully stretched. When increasing tensile strain to 30%, the harvester's capacitance decreased by 30.7% and its OCV increased by 140 mV (FIG. 1D, which is a graph that shows capacitance and OCV versus applied tensile strain for a coiled twistron harvester in 0.1 M HCl electrolyte (plots 110-111, respectively, with the inset 112 providing the cyclic voltammogram (CV) curve for 0% strain and 30% strain (plots 113-114, respectively)). Unless otherwise noted herein, the electrolyte was 0.1 M HCl, the reference electrode was Ag/AgCl, and the applied strain was sinusoidal. Applied tensile stresses were normalized to the cross-sectional area of the twisted, non-coiled yarn.

Figure 6:
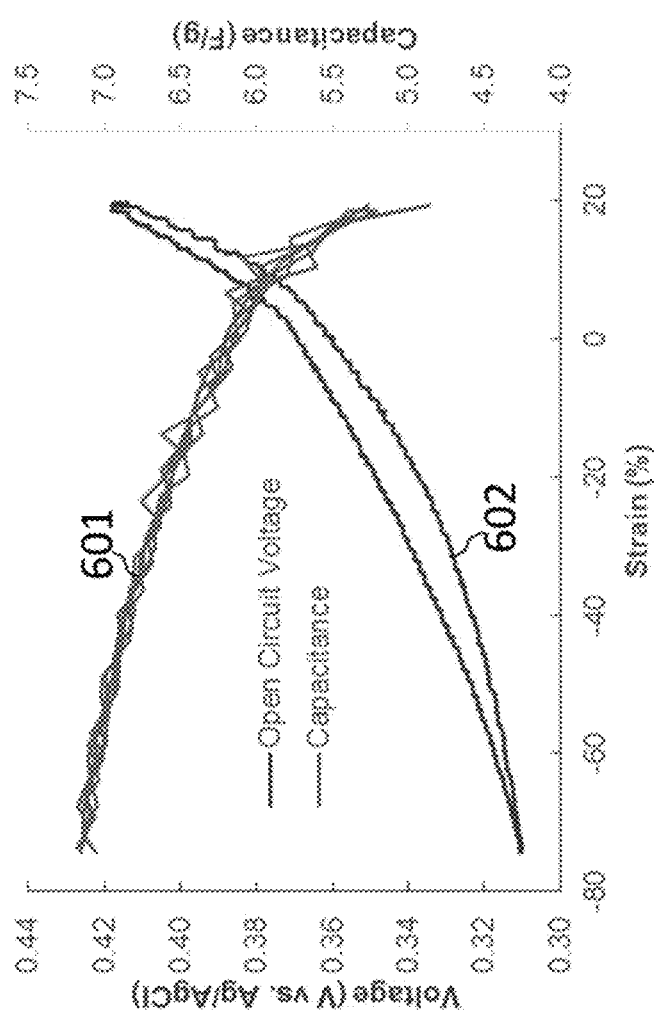
FIG. 6 shows the voltage and capacitance of a coiled CNT yarn when stretched to 20% strain, and released to −75% strain.

Tensile energy harvesting can also be conducted in the range where snarling occurs, although the voltage generated per degree strain will be reduced. FIG. 6 shows the capacitance and voltage change (plots 601-602, respectfully) resulting from stretching a coiled CNT yarn from 20% to −75% strain, wherein 0% strain is defined as the minimum strain at which the coiled yarn is straight and a negative strain corresponds to an additional contraction below this point which can result in the coiled yarn undergoing snarling Harvester can be improved by using the non-holonomic nature of the twist insertion and removal process: untwisting a coiled yarn by a small amount does not result in coil loss, but instead increases coil diameter and reduces twist-induced densification. It was found, for the yarn shown in FIGS. 1E-1F, that untwisting by 500 turns/m (8.5% of the twist inserted to fully coil) increased the reversible tensile strain range from 30% to 50% and increased the tensile-strain-induced capacitance change from 30% to 36%. FIG. 1E shows the frequency dependence of peak power (plot 115), peak-to-peak OCV (plot 116), and electrical energy per cycle (plot 117) for 50% stretch of an 8.5% untwisted coiled harvester in 0.1 M HCl electrolyte. FIG. 1F shows the generated peak voltage versus load resistance for the coiled yarn (plot 118) and the partially untwisted coiled yarn (plot 119) when stretched at 1 Hz to the maximum reversible elongation. FIG. 1F further shows peak power versus load resistance for the coiled yarn (plot 120) and the partially untwisted coiled yarn (plot 121) again when stretched at 1 Hz to the maximum reversible elongation.

The non-strained capacitance increased from 3.97 to 6.50 F/g, indicating a 64% increase in electrochemically accessible surface area. Most importantly, this twist removal increased peak power by a factor of 1.4 (to 179 W/kg at 12 Hz, FIG. 1E) and increased maximum output energy per cycle by a factor of 2.9 (to 41.2 J/kg at 0.25 Hz). The existence of a long plateau in frequencies that maximize power (from 12 Hz to above 25 Hz in FIG. 1E) provides a major advantage compared to resonant harvesters, whose power output rapidly degrade as mechanical deformation frequencies deviate from resonance (Jaffe 1971).

Figure 2A:
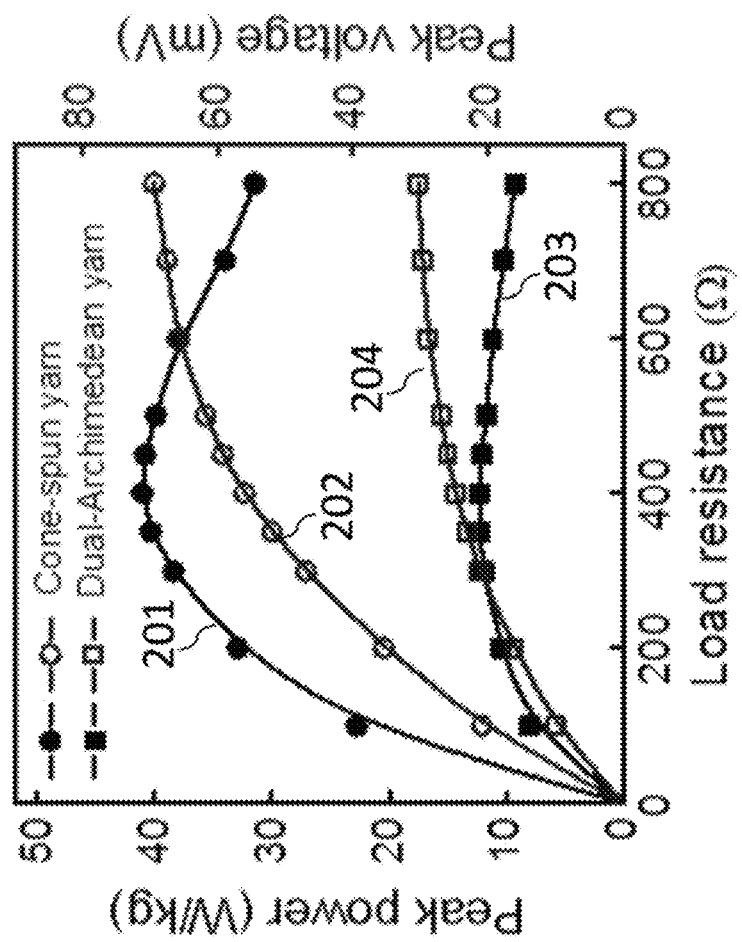
FIGS. 2A-2D show torsional and tensile performance of twistron harvesters.

The above performance was obtained for CNT yarn electrodes produced by a novel twist insertion process, called cone spinning, which optimizes harvester performance. During conventional fabrication of large-diameter CNT yarns, a rectangular stack of sheets is twisted between fixed supports (Lima 2011), causing a gradient of tension along its width, with maximum tension on sheet edges and minimum tension in the center. The resulting 'dual-Archimedean' yarn produced only a quarter of the peak power and average power delivered by cone-spun yarns (FIG. 2A and TABLE 1 for 1 Hz sinusoidal tensile strain of 30% in 0.1 M HCl electrolyte). Plots 201-202 in FIG. 2A show, respectively, the generated peak power and peak voltage versus load resistance for 1 Hz stretch to 30% strain for the cone spun harvester of FIG. 1A. Plots 203-204 in FIG. 2A show, respectively, the generated peak power and peak voltage versus load resistance for 1 Hz stretch to 30% strain for an otherwise identical dual-Archimedean-spun harvester. This stress non-uniformity was avoided by cone spinning (FIG. 1A), which involves rolling a CNT sheet stack about the CNT alignment direction to make a cylinder. By twisting this cylinder around its central axis to produce two cones, which densify to a yarn, stress is evenly distributed during spinning.

TABLE 1

Comparison of Structure and Performance for Yarns Twist-Spun Using Different Methods

|  | Dual-Archimedean | Cone-spun | Funnel-spun | Fermat-spun | Tow-spun |
|---|---|---|---|---|---|
| Diameter (μm) | 58 | 67 | 66 | 44 | 67 |
| Spring index | 0.43 | 0.43 | 0.43 | 0.44 | 0.44 |
| Capacitance (F/g) | 5.2 | 4.2 | 3.5 | 3.9 | 3.2 |
| Capa. Change (%) | 19 | 30 | 38 | 37 | 40 |
| OCV (mV) | 80 | 140 | 130 | 146 | 104 |
| Power (W/kg) | 10.2 | 41.3 | 36.4 | 42.0 | 32.4 |
| Density (g/cm$^3$) | 1.21 | 1.29 | 1.30 | 1.32 | 1.36 |

Unless otherwise indicated, this cone spinning process was used to make coiled twistron harvesters. Similar performance was obtained by spinning methods that maintain quasi-uniform tension across the CNT array (TABLE 1), such as by (1) tow spinning by inserting twist into an oriented yarn obtained by collapsing a sheet using lateral pressure (or liquid-based densification) or (2) 'funnel spinning', wherein yarn is spun by drawing and twisting along the axis of a cylindrical CNT forest (or a cylindrically positioned array of CNT forests). Direct spinning from a CNT forest to produce a 'Fermat' yarn structure (Lima 2011) provided yarns with similarly high energy harvesting performance.

While other methods can be used to produce carbon-nanotube-based twistron harvester electrodes than forest-based carbon nanotube spinning, such as floating-catalyst-synthesized web spinning (Koziol 2007) and super-acid-based carbon nanotube spinning (Behabtu 2013), each of these methods must be optimized (using well know methods of capacitance enhancement and surface modification) in order to provide the most useful harvester performance.

For a given inserted twist, the mechanical load applied during twisting determines the coil spring index, which affects harvester performance. The peak power and change in capacitance for a given percent strain were found to depend on the spring index (measured after coiling, with the coiling load still applied), with a spring index of ~0.43 yielding the highest peak power (41.3 W/kg for 30% strain at 1 Hz). However, as the spring index increases, the maximum reversible coil deformation increases (and the coil stiffness decreases), which enables energy harvesting over a larger strain range. This tunability allows the twistron harvester to be customized for the stroke range needed for a particular application. Unless otherwise indicated a spring index of ~0.43 was used for all experiments.

Figure 2B:
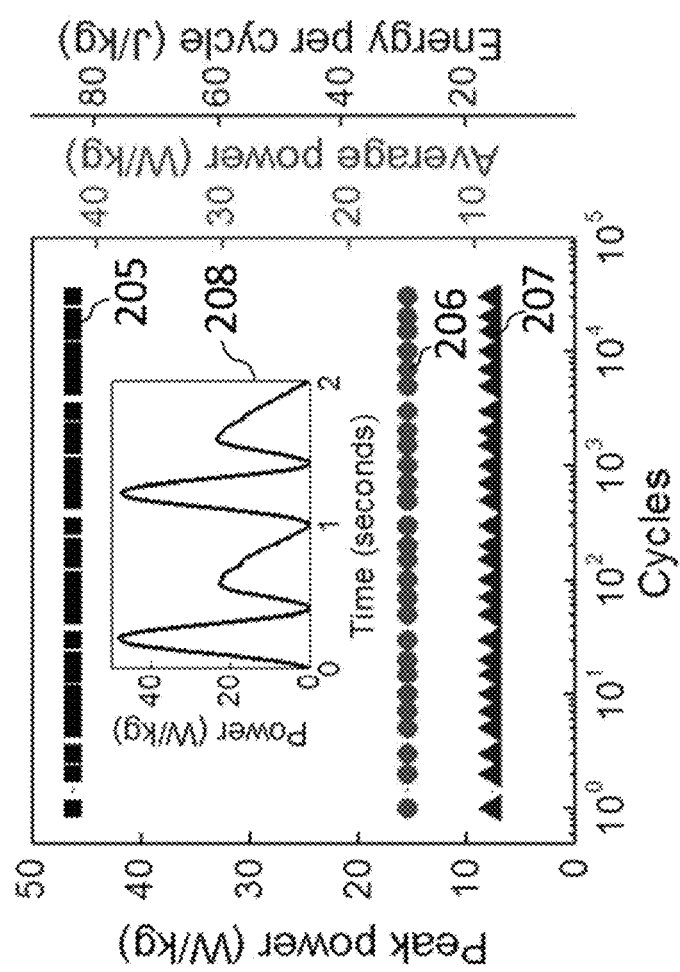

For potential use in harvesting the energy in ocean waves, CNT yarn harvesters were tested in 0.6 M NaCl, near the salt concentration of seawater. For 30% stretch and deformation frequencies of 0.25 to 12 Hz, a plateau in peak power (at ~94 W/kg) was observed between 6 and 12 Hz. As needed for ocean wave harvesting, harvester performance in 0.6 M NaCl and in 0.1 M HCl varies little with temperature. FIG. 2B is a graph that shows in plots 205-206, respectively, the negligible effect of 30,000 stretch/release cycles on peak power, average power, and electrical energy per cycle for the above twistron yarn, when cycling at 1 Hz to 30% strain in 0.6 M NaCl at 0° C. Inset 208 of FIG. 2B shows output power versus time during typical cycles. FIG. 2B shows that the peak power and average power at 0° C. (46.3 and 15.3 W/kg) were maintained for over 30,000 cycles at 1 Hz to 30% strain in 0.6 M NaCl.

Important for many applications, gravimetric energy output per cycle is scale invariant. The amount of inserted twist (T, in turns per meter) was scaled inversely with yarn diameter D to keep TD constant. This structural scaling automatically occurred, since yarns were twisted under the same stress until fully coiled, and 77) was scale invariant for this degree of inserted twist. Likewise, the obtained spring index (presently 0.43) was scale invariant. The per-cycle gravimetric energy, peak-to-peak OCV, and the frequency dependence of gravimetric peak power were found to be constant for yarn diameters between 40 and 110 μm. Also, a similar peak power density was obtained at 1 Hz for a coiled yarn and a four-ply yarn made from this coiled yarn.

Figure 2C:
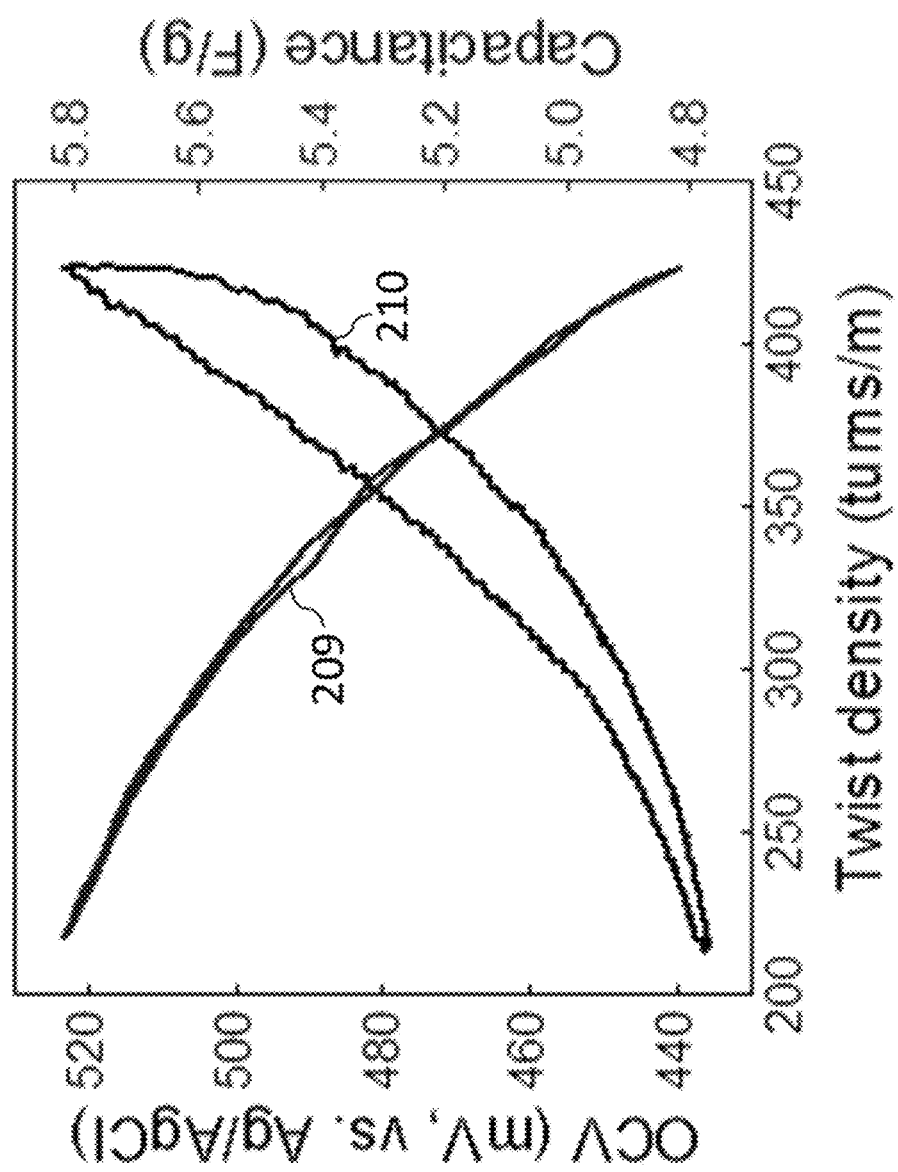

Unlike for other non-resonant mechanical energy harvesters, twist changes induce the capacitance changes that enable mechanical energy harvesting. Hence, these devices are referred to as "twistron" harvesters, using "twist" to denote the harvester mechanism and "tron," which is the Greek suffix for device. The twist mechanism for energy harvesting by stretching a coiled yarn was first suggested by the observation that twisting a non-coiled yarn generated electrical energy. It has been found that for isometric (constant length) and isobaric (constant force) twist insertion, twist insertion reversibly decreases the electrochemical capacitance and increases the OCV (the results for isometric twist insertion are shown respectively in plots 209-210 in FIG. 2C). The change in OCV is larger (86.8 mV) for isometric twist insertion than for isobaric twist insertion (43.6 mV), likely reflecting yarn densification and associated capacitance decrease during isobaric loading.

Figure 2D:
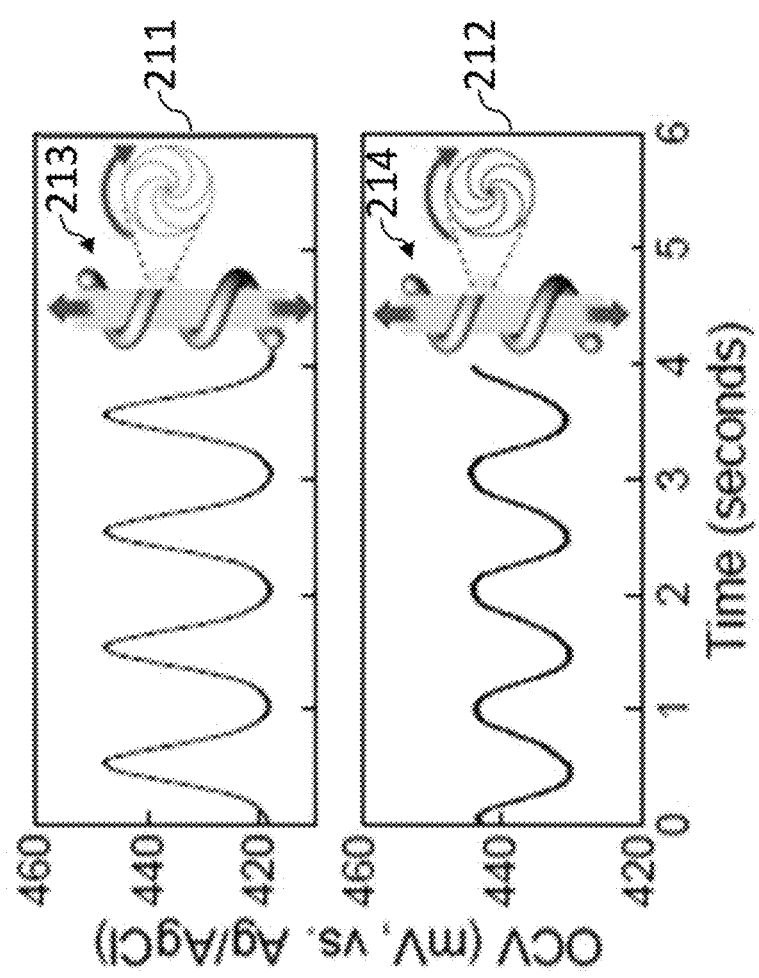

When a coiled yarn is stretched, yarn writhe is converted to increased yarn twist, which increases yarn density, decreases yarn capacitance, and thereby increases the OCV. A related process occurs during the actuation of coiled, guest-filled CNT yarns (lima 2011) and polymer artificial muscles (Haines 2014), where thermally-driven untwist causes tensile contraction. Further evidence of this torsional mechanism was obtained by comparing the direction of OCV change during stretch of 'homochiral' and 'heterochiral' yarns. The twist and coiling directions were identical for homochiral yarns, but were opposite for heterochiral yarns. Hence, stretching a homochiral yarn increases yarn twist and OCV, whereas stretching a heterochiral yarn decreases yarn twist and OCV (FIG. 2D). FIG. 2D show OCV versus time during 60% stretch in 0.1 M HCl for homochiral and heterochiral cone-spun yarns produced by mandrel coiling on a stretched rubber core, showing opposite stretch-induced voltage responses for the homochiral and heterochiral yarns (in, respectively graphs 211-212). The respective insets 213-214 in the graphs 211-212 of FIG. 2D illustrate the opposite changes in yarn twist in response to stretch for homochiral and heterochiral coils.

Power output can be increased by simultaneously using working and counter electrodes as energy harvesters. For instance, simple mechanical jigs can convert motion into an out-of-phase tensile deformation of two otherwise identical yarn electrodes, thereby doubling harvester voltage. This need to convert mechanical stretch to elongation of one electrode and release of stretch on the opposite electrode can be avoided by simultaneously stretching a homochiral yarn electrode and a heterochiral yarn counter electrode (FIG. 2D). Since yarn coiling and twist can irreversibly cancel when stretching an unsupported heterochiral yarn, these experiments utilized harvester yarns that are wrapped around a rubber fiber core, which acts as a return spring to prevent this irreversibility.

It was surprising that mechanical energy could be harvested capacitively even in salt water without applying an external bias potential, especially since previous capacitive harvesters required an applied voltage. The question is: "Why is there no need for an applied bias voltage for our harvesters?" The answer is that a chemical potential difference exists between the harvester electrode and the surrounding electrolyte. As a result, simply immersing an electrode into electrolyte generates equilibrium charge on the electrode, which can be used for energy harvesting. The potential of zero charge (PZC) is needed for evaluating the equilibrium charge state of a twistron harvester. Since PZC measurements have been difficult and often inaccurate (Efrima 1973; Iwasita 1996; Gileadi 1966), an easily deployed new method was developed by the inventors for measuring PZC, which utilizes the charge-state-dependent response of a CNT electrode to mechanical deformation.

Figure 3B:
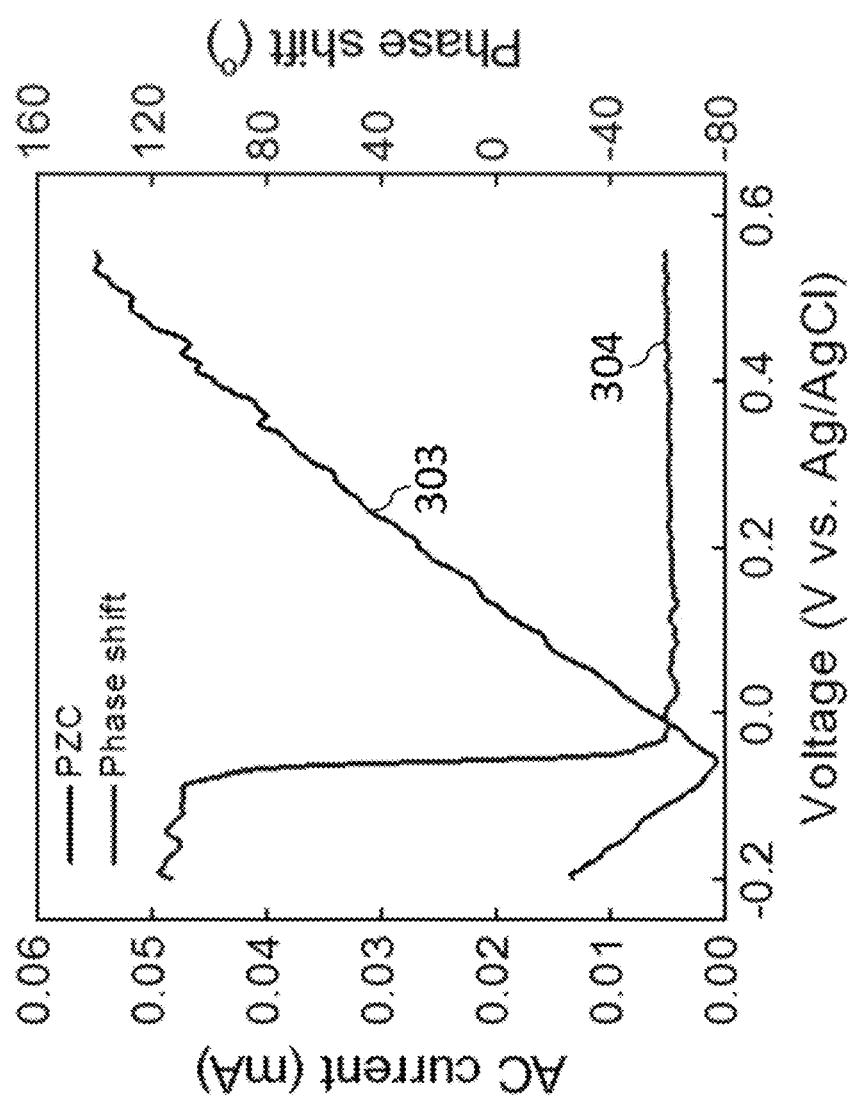
Figure 3C:
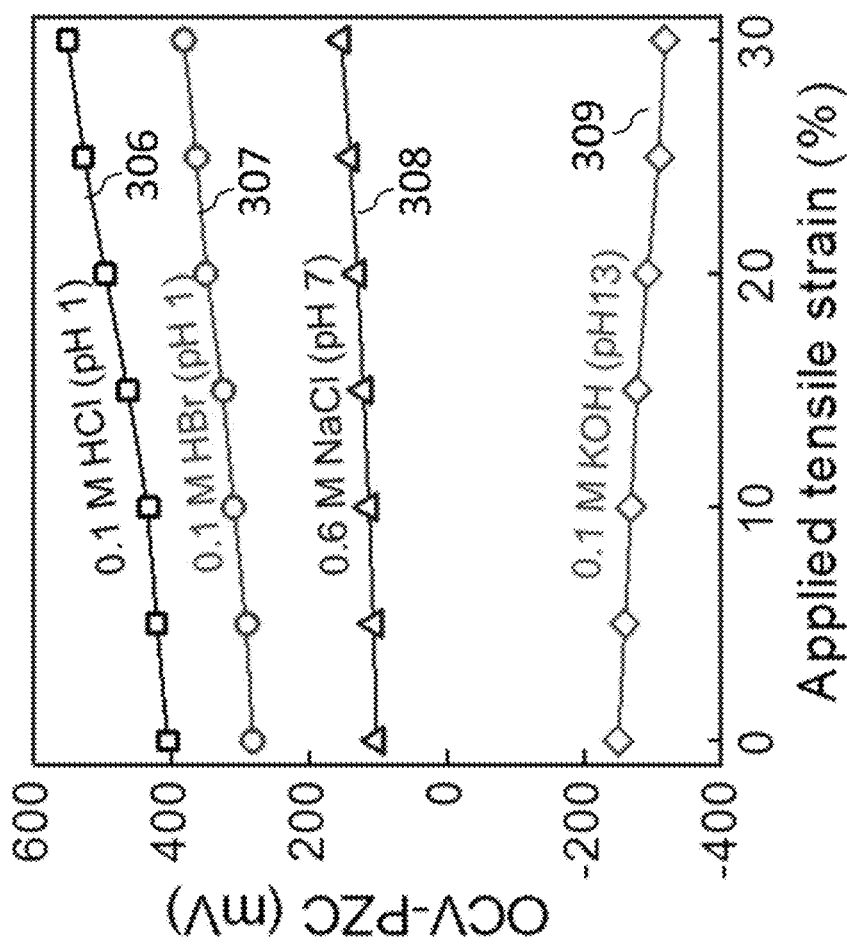
Figure 3D:
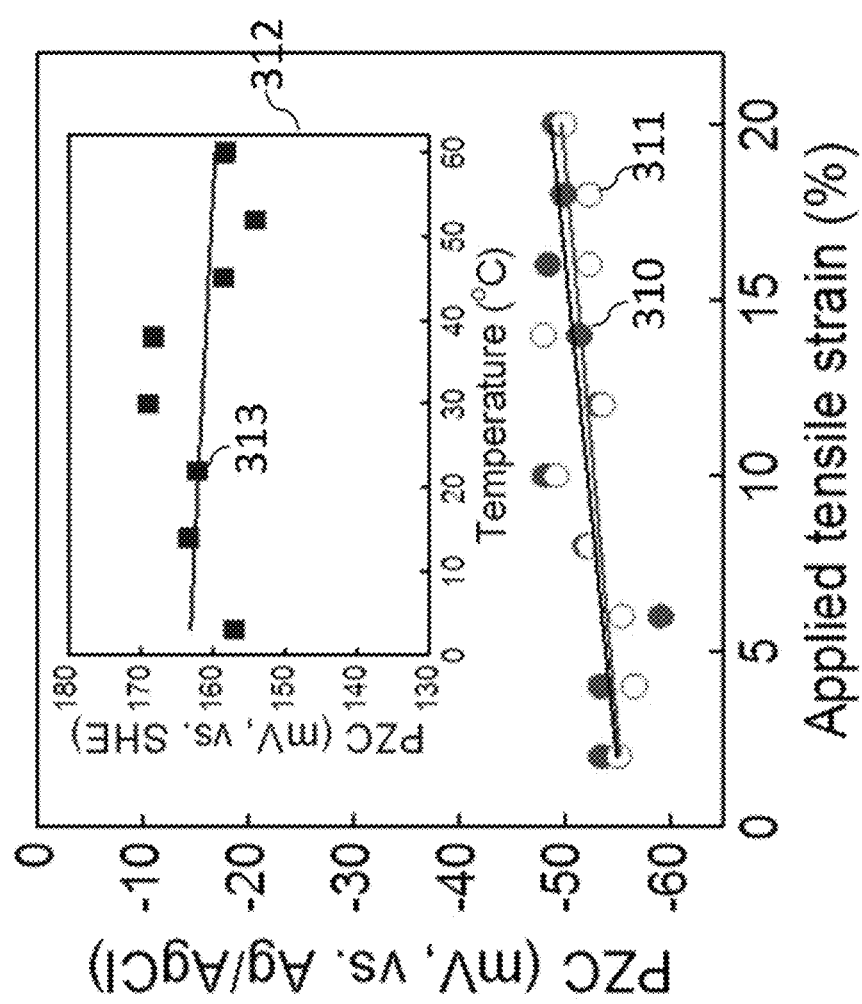

This method (referred to herein as "piezoelectrochemical spectroscopy" or "PECS"), involves characterizing an electrode by cyclic voltammetry (CV) while simultaneously stretching the electrode sinusoidally. By comparing this CV to a baseline scan without deformation, the AC current generated by the electrode can be determined as a function of applied voltage. This is shown in FIG. 3A, where CV scans for 0% strain and 5 Hz (plots 301-302, respectively) stretch to 10% strain are overlaid. Using a lock-in method, the magnitude and phase of the AC current with respect to the mechanical excitation are obtained as a function of voltage (plots 303-304 of FIG. 3B, respectively). In plot 303, the PZC corresponds to the potential of minimum AC current. Furthermore, as shown in plot 304, the phase of the AC current with respect to the mechanical excitation inverts by 180° at the PZC, which is consistent with the yarn having positive net charge at potentials above the PZC and negative charge below the PZC. The high sensitivity of PECS enabled demonstration that the PZC changes by less than ±7 mV from 3 to 60° C. PECS shows that the PZC changes by less than ±5 mV when a coiled twistron harvester is stretched by 20%. This result is very important, since it indicates that the charge injected by the electrolyte is largely strain independent (FIG. 3D). FIG. 3D shows the negligible dependence of PZC on applied tensile strain for increasing and decreasing strain (plots 310-311, respectively) and temperature (plot 313 in inset 312).

Since the open-circuit output voltage for a twistron harvester depends on the applied tensile strain (FIG. 1D), the twistron harvesters can be used as self-powered strain sensors. However, as shown in FIG. 1E, the open-circuit potential for a give deformation depends on strain frequency/rate, which can be compensated for to provide the most accurate measurements of strain when the deformation rate is high.

The intrinsic bias voltage of the CNT yarn is calculated by subtracting the PZC from the OCV of the non-strained yarn. FIG. 3C show that the bias voltage for coiled yarn decreases with increasing pH, from 0.4 V for 0.1 M HCl (plot 306) and 0.28 V for 0.1 M HBr (plot 307) (both with pH 1) to 0.1 V for 0.6 M NaCl (pH 7) (plot 308), and to −0.25 V for 0.1 M KOH (pH 13) (plot 309). Hence, a low pH electrolyte is hole injecting and a high pH electrolyte is electron injecting. Although the bias voltage depends upon the specific electrolyte, even at the same pH, a linear dependence of bias voltage on pH was obtained (~47 mV per pH unit for aqueous HCl), which is consistent with the −59 mV per pH unit theoretically predicted by the Nernst equation (Tanaka 2009). As expected, the direction of OCV change with applied tensile strain depends upon whether the electrolyte provides a positive or negative bias potential (FIG. 3C). The OCV and peak power were maximized for 0.1 M HCl concentration and for 0.6 M NaCl concentration.

Figure 7A:
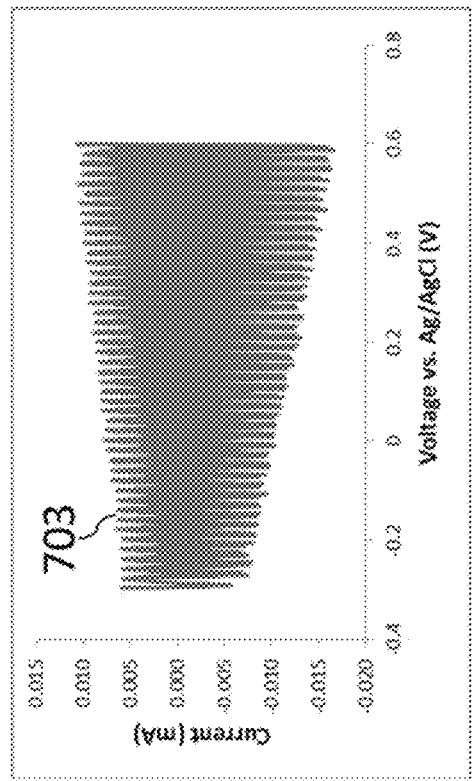
FIGS. 7A-7C show the results of piezoelectrochemical spectroscopy on a coiled CNT yarn that was treated by nitrogen plasma.
Figure 7B:
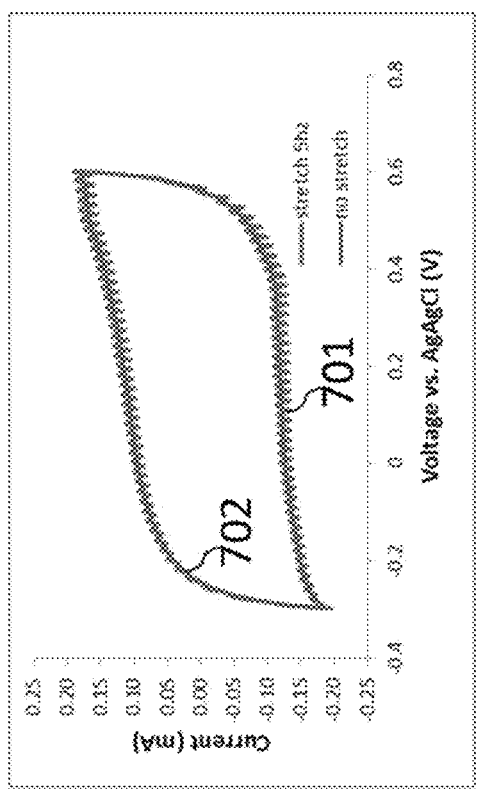
Figure 7C:
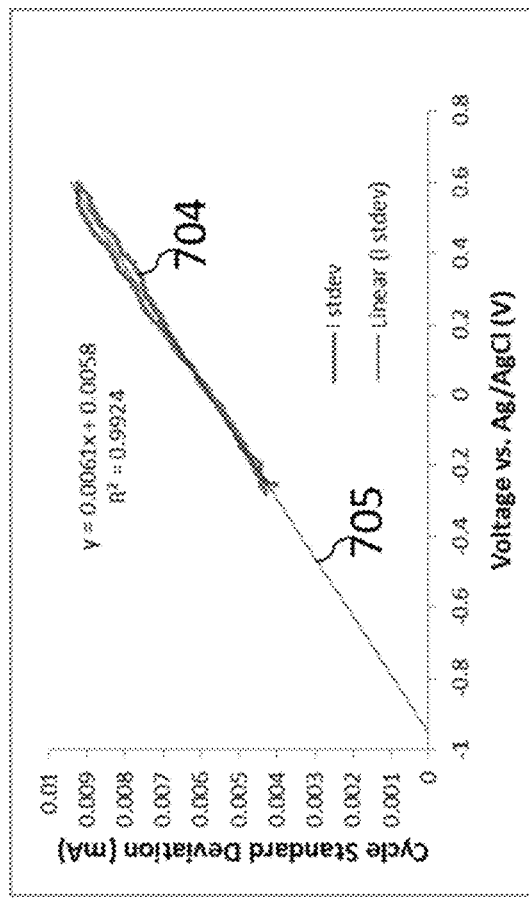

The PZC of coiled CNT yarn harvesters can also be modified by chemical of physical processing. For instance, by treating CNT sheet stacks in nitrogen plasma prior to twisting and coiling, the effective PZC was found to shift from the usual −50 mV to −150 mV vs. Ag/AgCl of pristine yarns to −950 mV vs. Ag/AgCl, as seen in FIG. 7A-7C. FIG. 7A shows cyclic voltammograms of the yarn during 10% sinusoidal stretch at 5 Hz and with no stretch (plots 701-702, respectively). FIG. 7B shows in plot 703 the difference between the curves in FIG. 7A, to highlight the AC current caused by stretching. FIG. 7C plots the amplitude of the AC current in FIG. 7B as a function of the applied voltage (plot 704), and extrapolates this trend in lot 705 to predict that the PZC occurs at −950 mV vs. Ag/AgCl.

Figure 8:
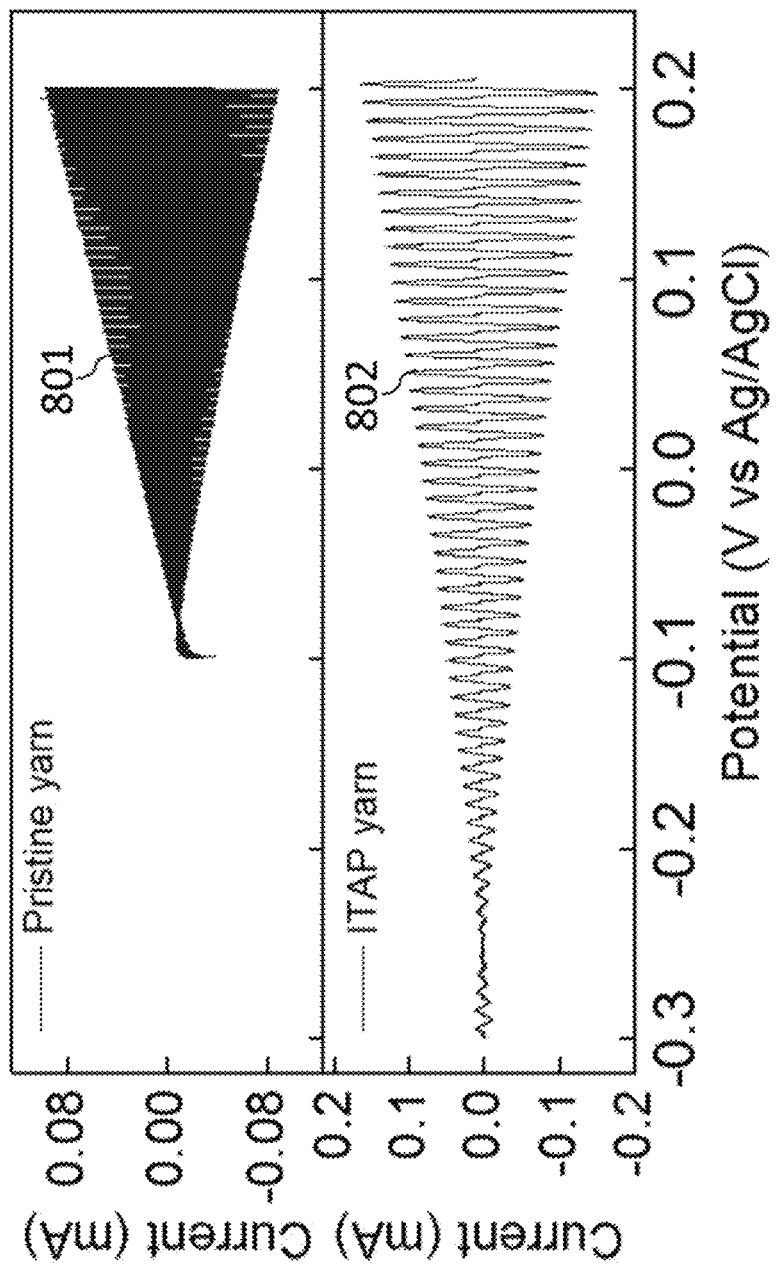
FIG. 8 compares the results of piezoelectrochemical spectroscopy on a pristine coiled CNT yarn and on a coiled CNT yarn that was treated by high temperature annealing under tension in vacuum. The PZC of the pristine yarn, around −80 mV vs. Ag/AgCl, shifts to around −250 mV vs. Ag/AgCl.

In another example, annealing the yarn under tension at high temperature via a process referred to as the incandescent tension anneal process (ITAP) was shown to lower the PZC of a coiled CNT yarn electrode to around −250 mV vs. Ag/AgCl, as shown in FIG. 8 (with plots 801-802 for the pristine yarn and the ITAP yarn, respectively). Such treatments can enable greater degrees of intrinsic bias on twistron harvesters, and may be used to alter the harvester's surface chemistry, such as to adjust which electrolytes optimize harvester performance.

The highest voltage for harvesting was obtained for the 0.1 M HCl electrolyte, since this electrolyte provides a higher magnitude chemically-generated bias voltage than the investigated HBr, NaCl, or KOH electrolytes (FIG. 3C). For 0.1 M HCl, the intrinsic potential of the coiled yarn increases from 0.40 V to 0.55 V during 30% stretch. This peak voltage is relatively close to the potential that causes hydrolysis of the electrolyte, so there is little opportunity to increase power by providing an external bias voltage. By applying a 300 mV bias voltage during tensile energy harvesting in 0.1 M HCl using 0.2 Hz square wave deformation to 20%, the net energy harvested per cycle increased from 17.9 to 27.1 J·kg$^{-1}$/cycle. Higher bias potentials decreased the net harvested energy as electrolytic losses began to predominate.

A twistron harvester's output power is limited by its electrical impedance. Although the full equivalent harvester circuit is complex, a simple R-C model can qualitatively describe the main observed features. In this approximation, the harvester impedance is:

$$Z_{harvester}=R_{internal}+1/(j\omega C).$$

At low stretch frequencies, this impedance is dominated by double-layer capacitance ($Z_c=1/j\omega C$), leading to the observed rise in power with increasing frequency (FIG. 1E). However, at higher frequencies, where capacitor impedance is minimal, internal resistance dominates, and power output versus frequency reaches a plateau.

To better understand twistron harvesters, structural data was used to investigate the origin of yarn capacitance and how twist-induced structure changes decrease this capacitance. Transmission electron microscopy (TEM) and scanning transmission electron microscopy (STEM) were used to assess the size, shape, and accessible surface area of individual CNTs and the bundles they form. Capacitances were calculated using the measured (Randin 1971; Randin 1972) areal capacitance of the basal plane of graphite (~4 µF/cm$^2$), which is close to that measured (Barisci 2003) for single-walled CNTs (~5 µF/cm$^2$). While Gogotsi's group has importantly demonstrated that pore sizes having a radius smaller than the solvated ion can have an enhanced areal capacitance (Chmiola 2006), this effect is ignored in the present calculations.

Since TEM and STEM images indicate that most of the nanotubes are in bundles (FIGS. 5A-5B), one expects that the measured yarn capacitance would be much smaller than predicted if all nanotubes were non-bundled. This is not the case. TEM images of individual MWNTs in twistron yarn provide a gravimetric surface area of 242 m$^2$/g and a calculated capacitance of 9.7 F/g for the hypothetical case where none of the MWNTs in the yarn are in bundles. This calculated capacitance for non-bundled MWNTs is surprisingly close to that measured for the twistron harvester in FIG. 2C and for a similar non-twisted yarn (5.8 F/g for the partially twisted and 8.3 F/g for the non-twisted torsional harvester, respectively).

Figures 5A, 5B:
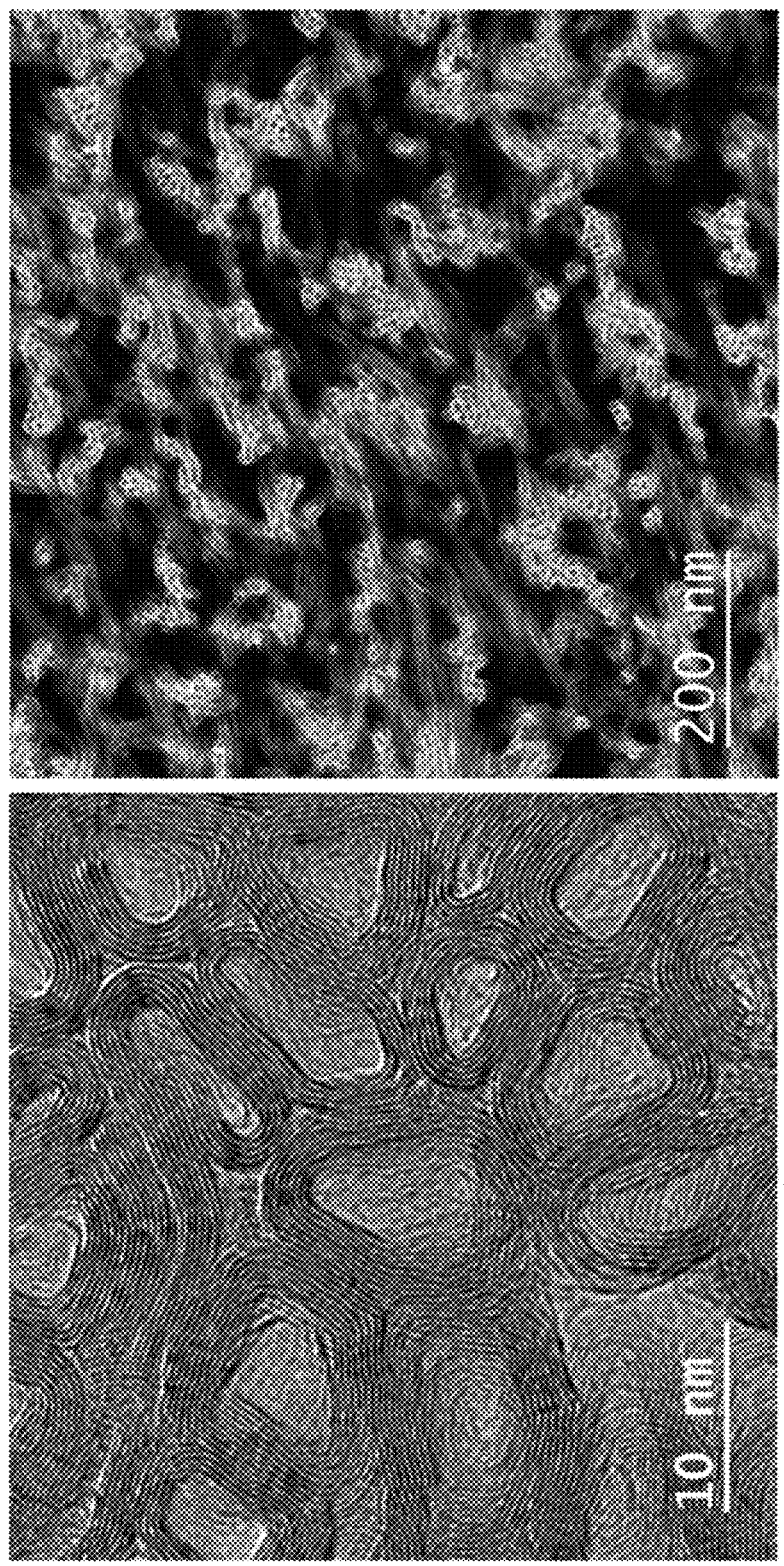
FIGS. 5A-5D show structural origin of twistron performance and performance comparisons with previously known material-based harvesters.
Figure 5D:
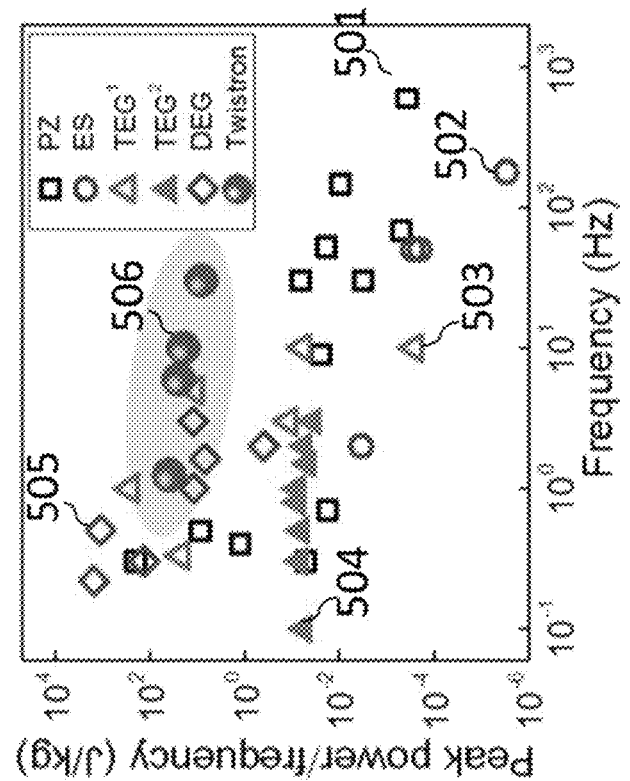
Figure 5C:
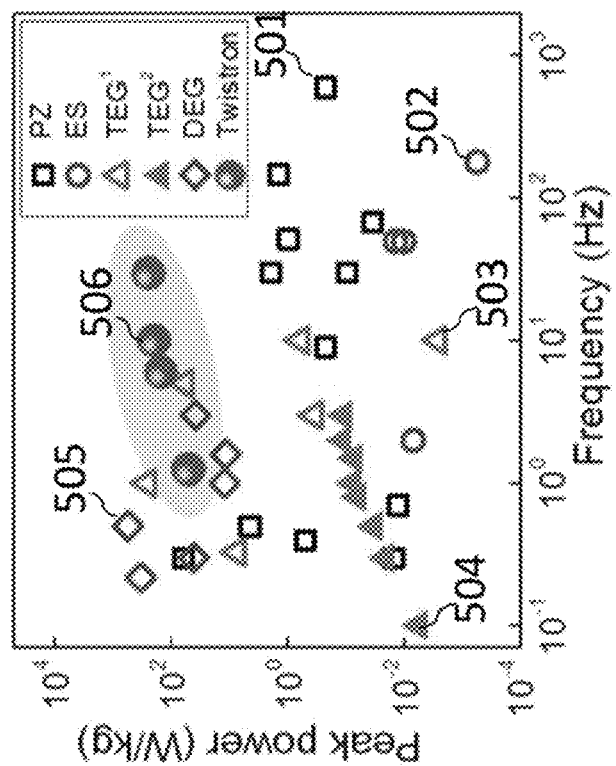

One reason that bundling does not drastically decrease capacitance is that TEM and STEM images show that bundles in forest-drawn MWNTs are far from cylindrical and sometimes even single-MWNT-thick arrays (FIG. 5B). The capacitances predicted from STEM-measured bundle surface area vary from 3.15 to 4.48 F/g, depending on the calculation method used to derive gravimetric surface area. A second reason is that the nanotube bundles contain void space that can be occupied by small ions. This intra-bundle void space exists despite the unexpected observed deformation of MWNTs to increase inter-nanotube van der Waals interactions (FIG. 5A), which occurs in addition to the well-known collapse of nanotubes to gain the van der Waals energy for the inner-most nanotube wall (Monto 2007; Yu 2001). Despite this crowding, there is sufficient void space between nanotubes to provide a structure-derived calculated intra-bundle capacitance of ~2.6 F/g for hydrated $H_3O^+$ ions. Evidence of bundle penetration by NaCl electrolyte was obtained by freeze-drying an electrochemically-charged twisted MWNT yarn, cutting this yarn by ion-beam milling, and then using electron energy loss spectroscopy and high-angle annular dark field (HAADF) STEM to determine the spatial distribution of $Na^{+1}$ and $Cl^{-1}$ in the revealed yarn cross-section. FIGS. 5C-5D show peak power (FIG. 5C) and frequency-normalized peak power (FIG. 5D), respectively, versus the frequency at which this peak power was obtained for present technologies 506 and prior-art technologies for piezoelectric (PZ) 501, electrostatic (ES) 502, triboelectric (TEG) 503, and dielectric elastomer (DEG) 505 generators. (TEG 504 reflect low frequency triboelectric data).

The next question is: "How does increasing twist provide a reversible change in yarn capacitance?" To address this question for intra-bundle capacitance, the inventors started with a typical bundled structure seen in TEM microscopy, and used molecular dynamics simulations to predict the effect of twist-induced pressure on the intra-bundle void space that is sufficiently large for hydrated $H_3O^+$ ions. Using biaxial pressures up to 50 MPa, which agree with the measured torques required for twisting, a reversible 26% change in capacitance (from 2.6 to 1.9 F/g) was predicted, which is similar to the percent capacitance change seen experimentally during energy harvesting.

The observed highly-reversible changes in yarn capacitance likely result from elastic deformation of yarn structure across hierarchical scales, ranging from deformation of MWNT cross-sections and rearrangement of MWNTs within bundles to bundle coalescence. The issues here are so topologically complicated that it is difficult to realize detailed understanding of twist-induced capacitance changes. Bundles that are too disordered to be noticed by TEM might be providing a disproportionally large contribution to capacitance change. Also, bundle densification might be facilitated by mismatched lengths of different MWNTs within bundles and the observed forking and recombination of MWNT bundles. Additionally, the MWNTs in large bundles are so irregularly packed that an individual MWNT likely meanders from side-to-side in a bundle. Twist-induced tension in a bundle might increase the packing density by decreasing this meandering, thereby decreasing the accessible intra-bundle capacitance. The measured rate dependence of capacitance over six orders of magnitude in potential scan rate suggests the possibility that both bundle surface and intra-bundle capacitances contribute at slow scan rates.

Figure 1D:
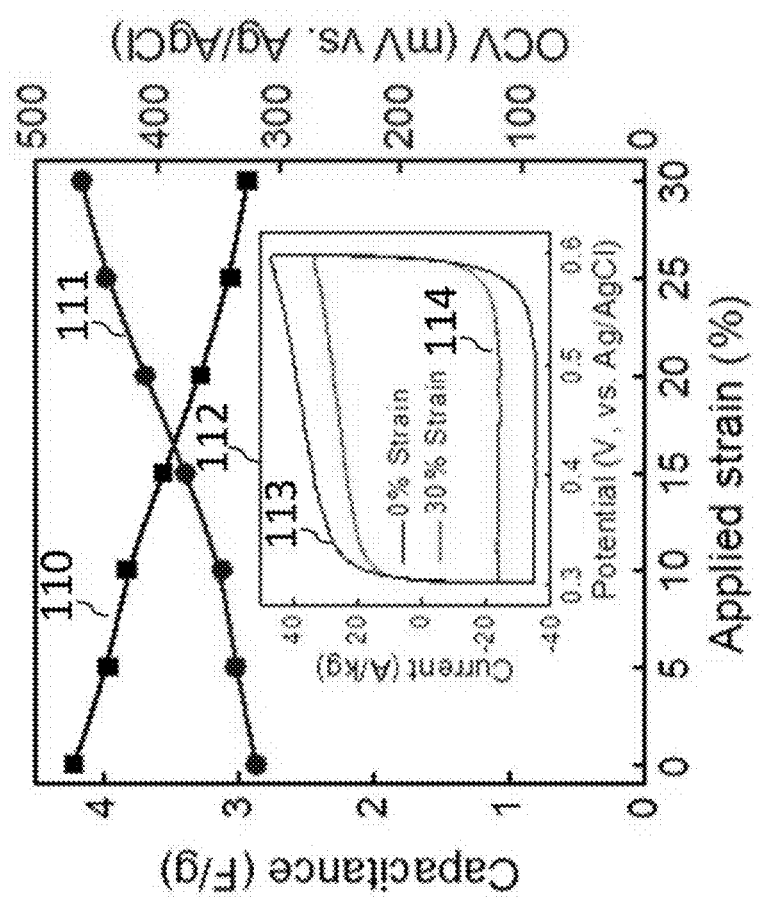
Figure 1E:
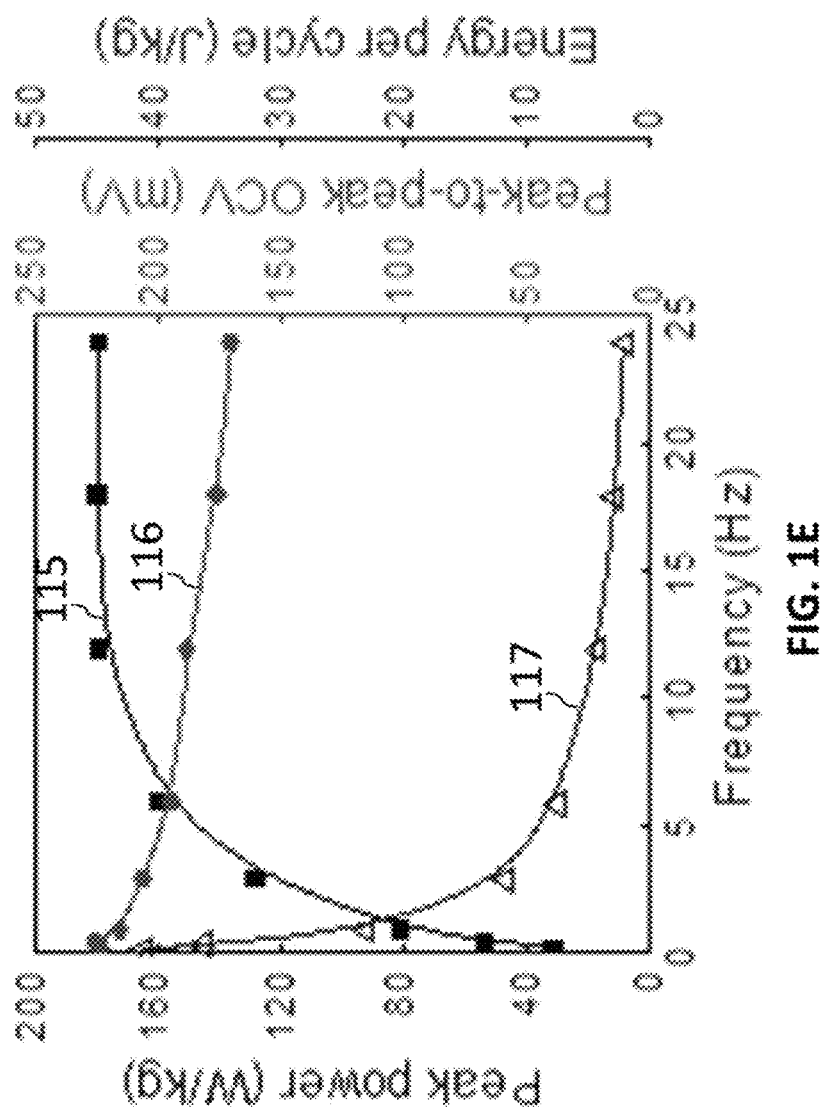
Figure 1F:
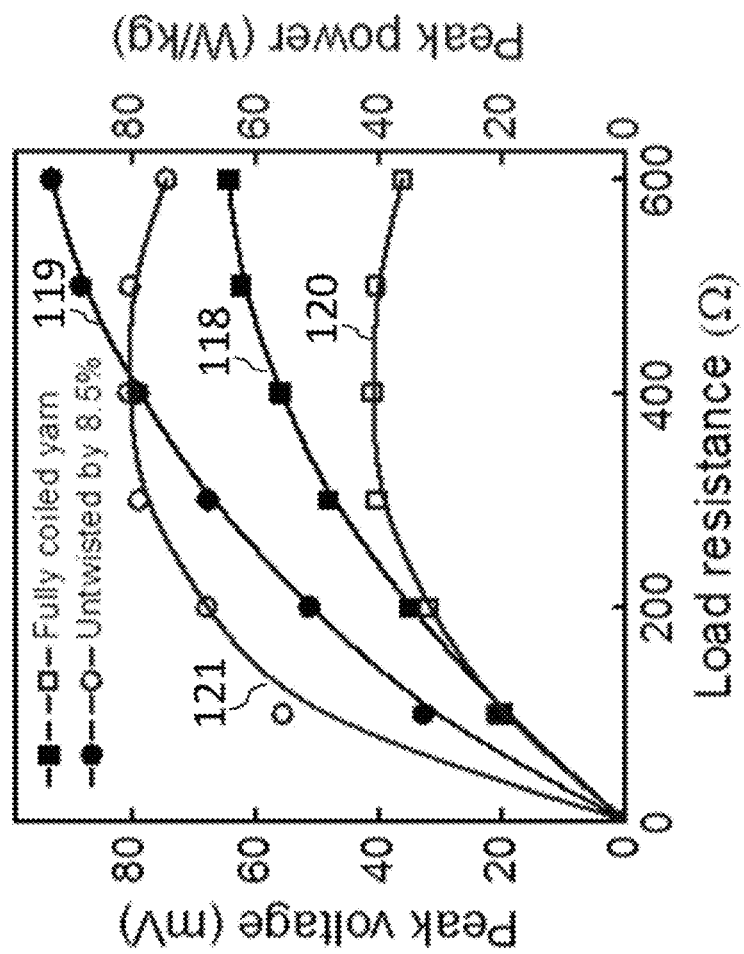

FIGS. 1C-1D and other experimental results show that only a fraction of the mechanically-induced capacitance change is used for harvesting electrical energy in some yarn samples. Using OCVs relative to the PZC, this fraction is the ratio of the product of OCV and the capacitance after twistron deformation to this product before deformation. Depending upon the particular CNT forest and twist-insertion method used for yarn preparation, the fraction of capacitance change that is useful for energy harvesting varies from 79.0% to 99.5% for torsional and tensile energy harvesters. This up to 21.0% of non-productive capacitance change is likely due to counter ions being trapped in void spaces that lose contact with the bulk electrolyte during twist, which prevents their associated charge from redistributing onto electrochemically-accessible surfaces to increase electrode voltage.

Twistron harvesters having harvesting electrode diameters between 10 µm and 500 µm are especially useful for most applications, because very large diameter harvesting electrode diameters severely limit their ability to harvest energy from rapid changes in harvester length or the amount of yarn twist (due to the need for ion diffusion over large distances in the yarn diameter). Unlimited numbers of twistrons, comprising small diameter electrodes, can be operated in parallel to generate giant amounts of power. While smaller yarn diameters can provide useful responses, the cost of twist insertion to provide useful performance increases with decreasing yarn diameter. Nevertheless, 150-nm-dimeter twisted carbon nanotubes can be spun as twistron harvesters that are deployable for energy harvesting and sensing on the nanoscale. A method for fabricating twisted 150 nm diameter carbon nanotube yarns has been previously described (Li 2011).

Figure 4A:
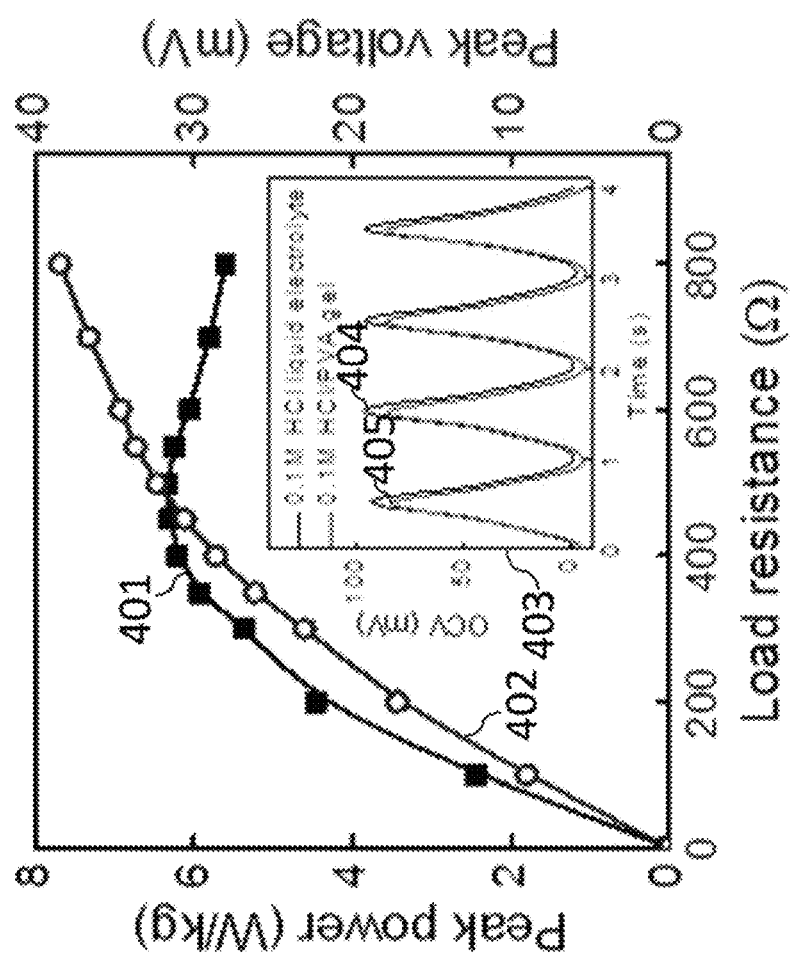
FIGS. 4A-4D show alternative harvester geometries.

Transition from electrolyte-bath-operated harvesters to dual-electrode harvesters that operate in air is important. Inventors demonstrated one such device by over-coating a coiled CNT yarn with a gel electrolyte (comprising 10 wt % polyvinyl alcohol, PVA, in 0.1 M HCl), which did not degrade the output power. A non-coiled, twisted, CNT yarn counter electrode, coated with an ionically-conducting polyurethane hydrogel to prevent shorting, was helically wrapped around the energy-harvesting electrode. Finally, this combined two-electrode assembly was overcoated with the PVA/HCl gel electrolyte to yield the peak voltage and peak harvested power shown in FIG. 4A. FIG. 4A shows in plots 401-402, respectively, the peak power and peak output voltage versus load resistance for 1 Hz, 30% stretch of a two-electrode twistron harvester containing an energy-harvesting, coiled CNT yarn working electrode, which is wrapped with a non-harvesting, non-coiled CNT yarn counter electrode. Polyvinyl alcohol (PVA) containing 0.1 M HCl was used to protect the harvester and electronically insulate opposite electrodes. Inset 403 of FIG. 4A shows that the OCV versus time, before and after PVA coating (plots 404-405, respectively).

Figure 4B:
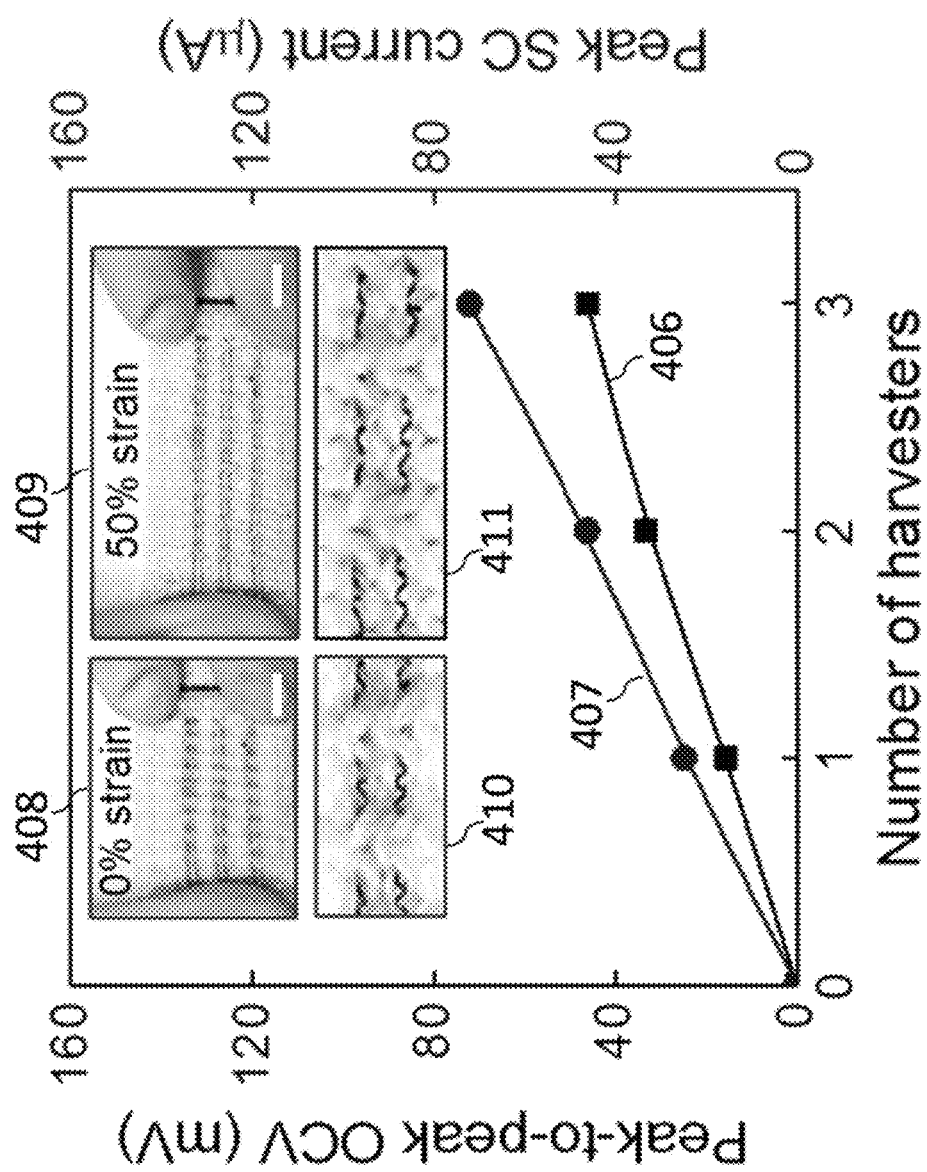

To provide liquid-electrolyte-free harvesters that generate energy from both electrodes, harvesters comprising electrodes that undergo opposite voltage changes when stretched were produced. To produce these yarns, two CNT sheet stacks were cone-spun in opposite twist directions until just before the onset of coiling. Both electrodes were then coiled in identical directions around 300%-elongated, 0.5-mm-diameter rubber mandrels, so that one electrode increases density and the second decreases density when stretched. These homochiral and heterochiral electrodes (containing their rubber cores) were then separately overcoated with PVA/HCl electrolyte, placed parallel (separated by ~1.5 mm), and finally jointly overcoated with additional PVA/HCl electrolyte. FIG. 2D plots the peak voltage versus time for 1 Hz stretch to 60% strain. Three of these 4-cm-long twistron harvester yarns were sewn into a knitted cotton glove and their performance was evaluated when connected in-parallel and in-series for 50% applied tensile strain (FIG. 4B). FIG. 4B shows peak-to-peak OCV and peak SCC at 1 Hz and 50% strain for series (plot 406) and parallel (plot 407) connected two-electrode harvesters made from the homochiral and heterochiral yarns. The yarns were coated with 10 wt % PVA/4.5 M LiCl gel electrolyte after being sewn into a textile. Insets 408-409 of FIG. 4B show low magnification photographs of the textile at 0% and 50% strain (scale bar: 1 cm), respectively. Insets 410-411 are the corresponding high magnification photographs.

Figure 9A:
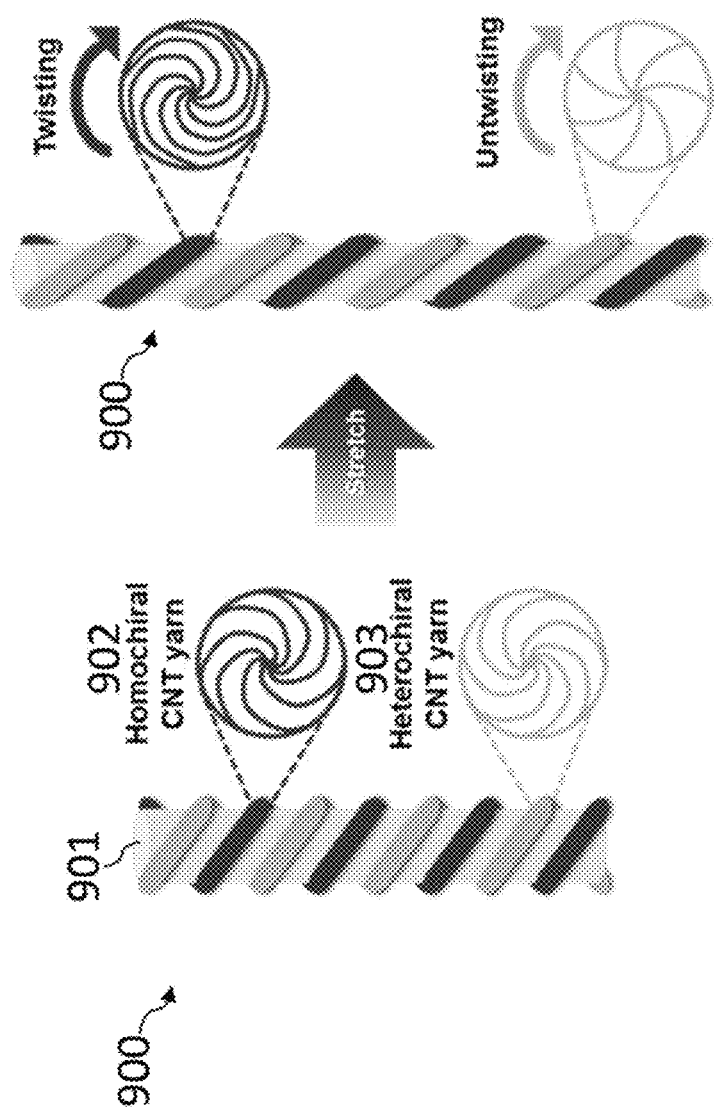
FIG. 9A-9B illustrate the structure of an elastomeric twistron harvester that combines opposite chirality harvester electrodes and the use of such harvesters in a textile that both harvests mechanical energy as electrical energy and stores this energy in supercapacitor yarns.
Figure 9B:
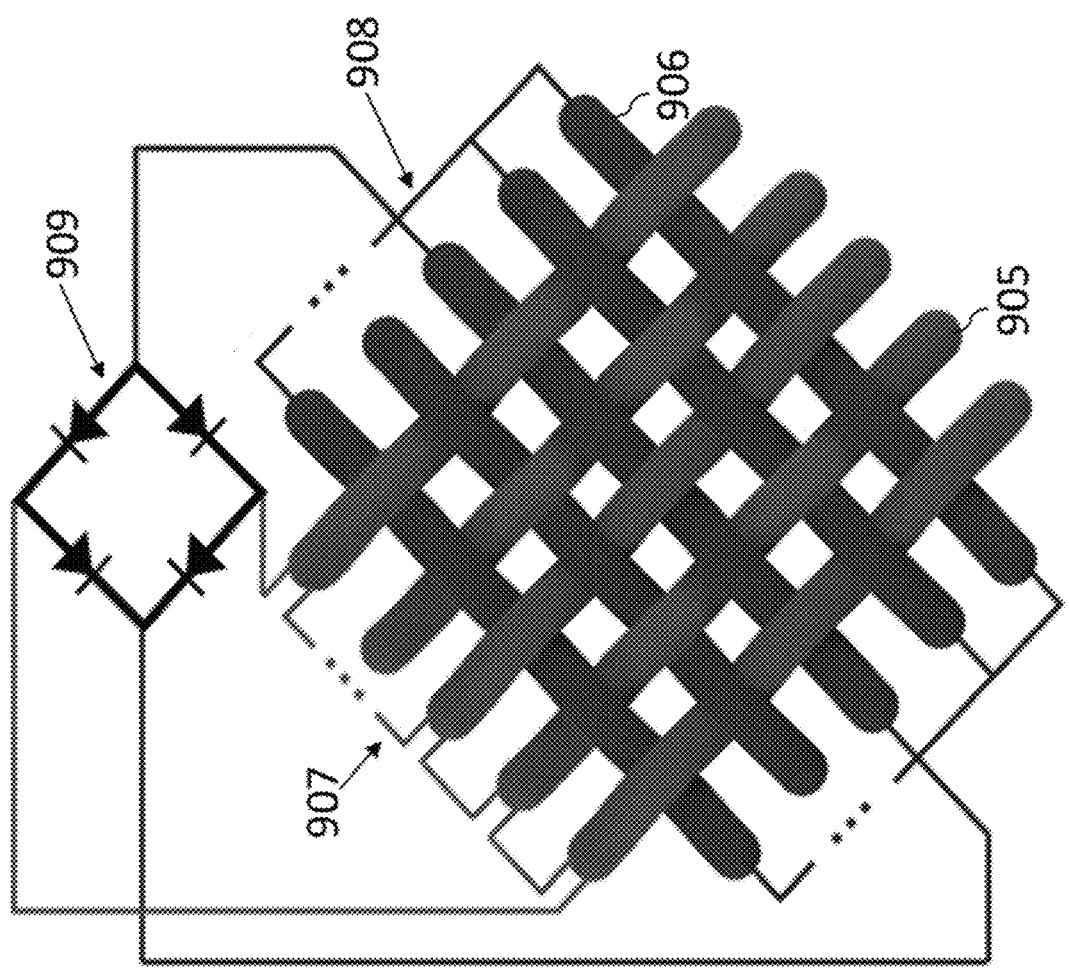

Harvesters that can generate energy from both electrodes were also enabled by combining homochiral and heterochiral CNT coils onto single rubber fibers. FIG. 9A shows the use of two oppositely-twisted CNT yarns (homochiral CNT yarn 902 and heterochiral CNT yarn 903), wrapped around a rubber fiber 901 in the same direction, to provide a single stretchable composite fiber 900 that incorporates both homochiral and heterochiral yarn electrodes. A layer of gel electrolyte is added to coat the two yarns. When stretched, the voltage of the homochiral yarn increases, while the voltage of the heterochiral yarn decreases, generating an increased voltage difference between the two yarns. Similarly, wrapping non-twisted yarns around a rubber fiber and coating with electrolyte yields an electrochemical supercapacitor that does not produce electricity when stretched, but can instead be used to store the energy generated by the harvesting yarn. FIG. 9B shows a schematic of an exemplary textile that is woven with energy harvesting yarns 905 (such as yarns 900 shown in FIG. 9A) in one direction and energy storing yarns 906 in the other direction. These yarns can be connected in series (907) or parallel (908) to optimize the voltage and current characteristics of the harvester and storage yarns, and a diode bridge 909 could be used to convert AC harvester voltage directly into DC voltage for storing in the capacitor yarns.

FIG. 10A-10D show another example architecture for producing a single rubber fiber harvester that incorporates both homochiral and heterochiral electrodes, and allows for easy serial connection to increase output voltage. In FIG. 10A, a spool of twisted CNT yarn 1002 is prepared for wrapping around a rubber mandrel 1001. Wrapping the CNT yarn around mandrel into the pattern shown in FIG. 10B creates alternating bands of homochiral and heterochiral harvesters. Cutting the connecting yarn at cutting points 1003, such as shown in FIG. 10C, separates these homochiral and heterochiral segments so they can act as separate electrodes that increase voltage and decrease voltage, respectively, during stretch. Bridging the separate homochiral and heterochiral regions with a gel electrolyte 1004, as shown in FIG. 10D, creates multiple individual harvester cells along the length of the yarn. The built-in series connection of these yarns provides the ability to scale output voltage by increasing the length of the yarn.

Depending upon the application need, the output voltages from these harvesters can be combined in-series or in-parallel for application as self-powered strain sensors or mechanical energy harvesters. The application of the twistron harvester of FIG. 2D and FIG. 4B as a self-powered solid-state strain sensor that is sewn into a shirt and used for monitoring breathing was demonstrated. When strained by ~10% during breathing, this 3-cm-long twistron sensor generated ~16 mV.

Figure 4C:
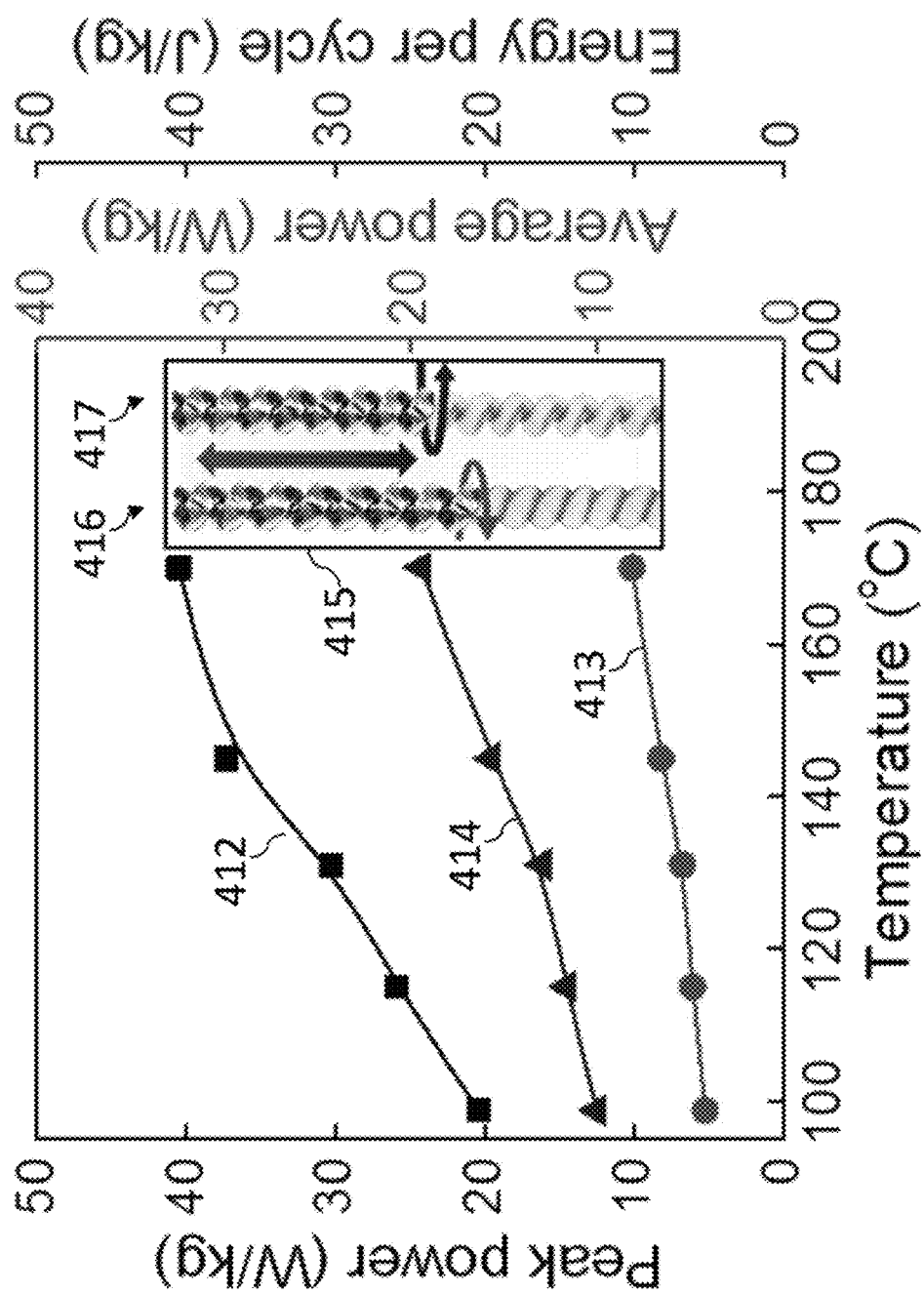

Inventors previously used polymer artificial muscles to convert temperature fluctuations into mechanical energy, which was harvested as electrical energy using an electromagnetic generator (Kim 2015). The problem for such applications as powering wireless sensors in the 'Internet of Things' is that the large volume and weight of the electromagnetic generator dwarfs the polymer muscle. Since twistron harvesters can be smaller in diameter than a human hair, they can solve this problem. To demonstrate this, a thermally-annealed coiled nylon fiber artificial muscle was attached to a coiled twistron harvester having the same twist direction. In this configuration, heating the nylon muscle both up-twists and stretches the twistron harvester, additively contributing to energy generation. Upon heating from room temperature to 170° C. in 1 s, followed by air cooling for 2 s, actuation of a 10-cm-long coiled nylon muscle drove the 2-cm-long twistron yarn to deliver a peak electrical power of 40.7 W/kg, relative to twistron weight (FIG. 4C). FIG. 4C shows the peak power (plot 412), average power (plot 413), and energy per cycle (plot 414) generated by a coiled twistron harvester when mechanically stretched and twisted by an in-series, coiled, 127-μm-fiber-diameter nylon artificial muscle (located over the electrolyte bath) that converts thermal energy into mechanical energy. Inset 415 of FIG. 4C shows twistron up-twist and stretch 416 during muscle heating, and the reverse processes 417 during muscle cooling.

Considering the entire system weight, including both the actuating nylon yarn and twistron energy harvester, this corresponds to a harvested peak power and average power during heating of 1.41 W/kg and 0.86 W/kg, respectively, and a full-cycle average electrical power of 0.29 W/kg, compared to 0.015 W/kg for a polymer muscle connected to an electromagnetic generator (Kim 2015). Small fluctuations in ambient temperature can be harvested by increasing the length of the polymer muscle, such as by using pulleys to minimize total package size, or by using large spring index polymer muscle coils to maximize stroke (Haines 2014).

A coiled twistron harvester was used to harvest the energy of near-shore ocean waves. Both the energy harvesting twistron yarn and the Pt mesh/CNT counter electrode were directly immersed in Gyeonpo Sea of Korea, where the ocean temperature was 13° C., the wave frequency during the study ranged from 0.9 to 1.2 Hz, and the NaCl content in the sea water was 0.31 M. The top of the twistron yarn was attached to a balloon and the bottom was rested on the seabed by attaching to a sinker. Using a 10-cm-long twistron harvester electrode weighing 1.08 mg, whose deformation was mechanically limited to 25%, a peak-to-peak open-circuit voltage of 46 mV and an average output power of 1.79 μW were measured during ocean wave harvesting. The average output power through a 25Ω load resistor (normalized to the weight of the harvesting electrode) was 1.66 W/kg.

For many electronic devices, it is desirable to have input voltages of several volts. Our harvester yarns can provide these voltages if multiple harvesters are combined in series to increase their voltage, as in FIG. 4B, or by using commercially-available circuits to transform the voltage of individual harvesters. For instance, a voltage step-up converter (Linear Technologies LTC3108) was used to convert the voltage of a single coiled harvester electrode (weighing 19.2 mg) from ~80 mV up to 2.8 V to charge a 5 μF capacitor. This harvester/converter was used to power a green LED, which lights up to indicate every time the harvester yarn is stretched.

Figure 4D:
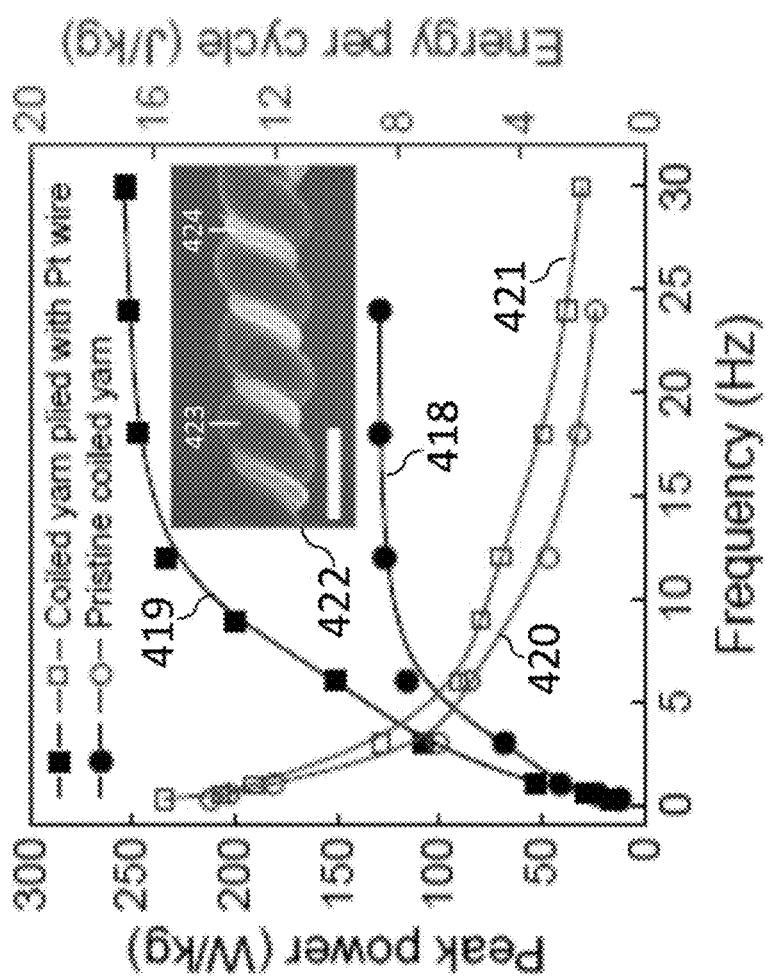

A major performance increase resulted from the discovery that yarn resistance was importantly contributing to twistron impedance. Specifically, the peak power for 50% stretch at 12 Hz was increased from 170 W/kg (FIG. 1E) to 250 W/kg (FIG. 4D) by coiling a 23-μm-diameter Pt wire within the coiled twistron yarn. FIG. 4D shows the frequency dependence of peak power before and after incorporating the Pt wire current collector into the coiled twistron yarn (plots 418-419, respectively). FIG. 4D further shows the corresponding energy-per-cycle before and after incorporating the Pt wire current collector into the coiled twistron yarn (plots 420-421, respectively). Inset 422 of FIG. 4I) is an SEM image of this harvester (scale bar: 100 μm) showing the coiled CNT yarn 423 and Pt wire 424.

Initially non-twisted yarns can be used for harvesting torsional mechanical energy, since the energy harvesting process provides twist insertion and twist removal. Coiled yarns are most useful for harvesting tensile mechanical energy, since non-twisted or twisted, non-coiled yarns harvest relatively negligible tensile mechanical energy as electrical energy. Since these yarns typically have high conductivity of 300 S/cm or above, the energy harvesters and supercapacitors are not required to have separate current collectors, making it possible to decrease device weight and volume and simplify device construction, unlike the case for other harvesters and supercapacitors. However, the results of FIG. 4D show that twistron performance can be enhanced by using an incorporated metal wire to decrease the resistance of the twistron harvester.

Figure 11A:
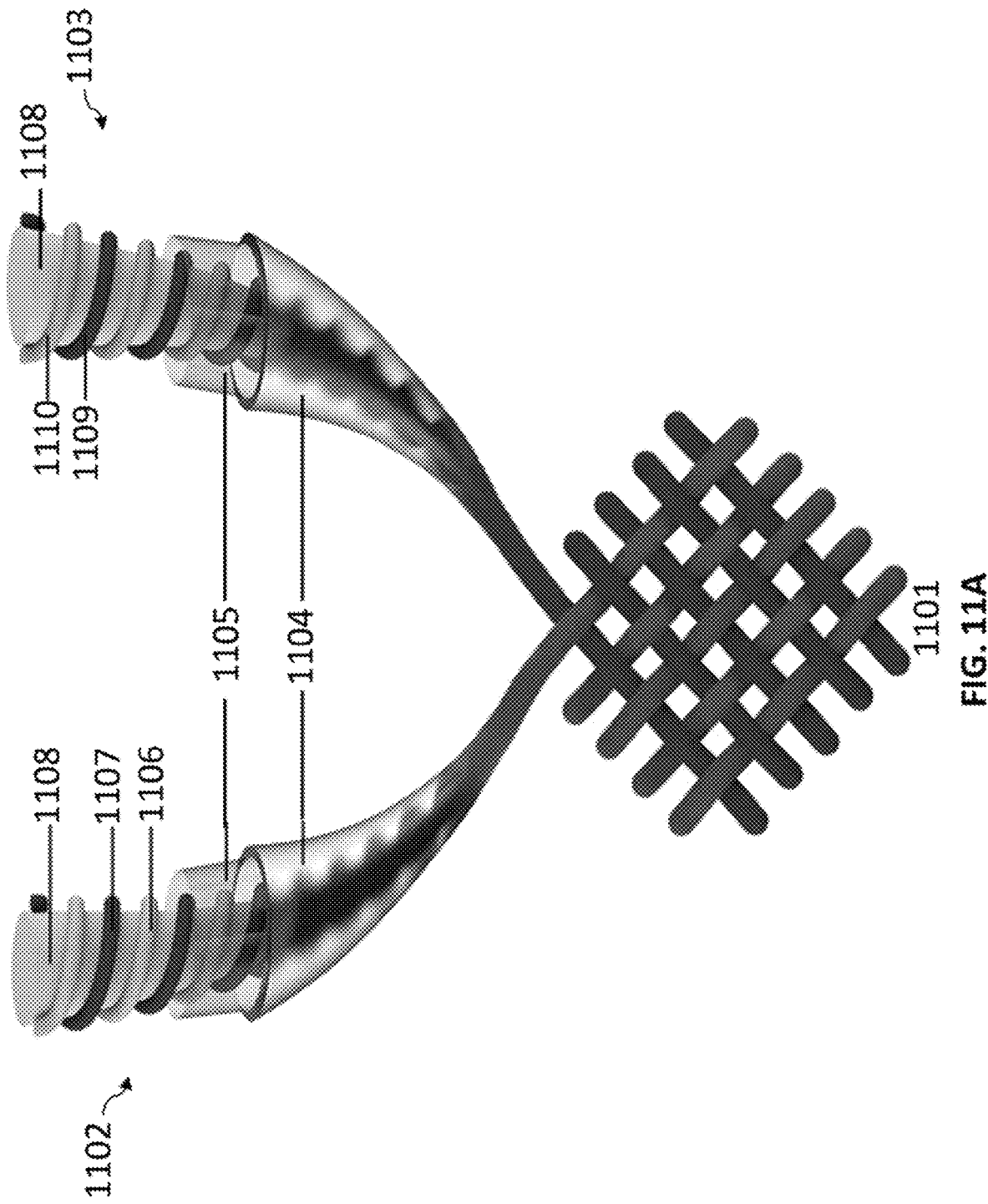
FIGS. 11A-11B are illustrations of a self-generating and storaging package of an embodiment of the present invention.

The twistron harvester of the present invention can be utilized for wearable device using diameter, length, and series/parallel connection. To make wearable, stretchable, and flexible harvester fiber based on twistron harvesters, the configuration can include working and counter electrodes in a one-body fiber. Embodiments of the present invention include configurations of stretchable and flexible one-body twistron fiber harvester (TFH). Advances resulted from adding and second type of chirality to CNT yarns that are highly twisted before coiling. Furthermore, since CNT are known as supercapacitor materials, flexible, stretchable fiber supercapacitor (SFSC) can be utilized in self-powered packages composed of TFH and SFSC as shown in FIG. 11A. FIG. 11A shows a self-generating and storaging package 1101 that includes twistron fiber harvesters (TFH) 1102 and stretchable fiber supercapacitors (SFSCs) 1103. The TFH 1102 includes a fiber 1108 (such as a silicone rubber fiber) that has a homochiral CNT yarn 1107 and a heterochiral CNT yarn wrapped about it by coiling, similar to as described above for the stretchable composite fiber 900 shown above in FIG. 9A. The TFH 1102 further has a solid electrolyte 1105 and a silicone rubber tube 1104. The SFSC 1103 also includes a fiber 1108 (such as a silicone rubber fiber) that has an anode 1110 and cathode 1109, which are both non-twisted CNT yarns. Like the TFH 1102, the SFSC 1103 further has a solid electrolyte 1105, such as the PVA-based gel electrolytes described earlier, and a silicone rubber tube 1104.

Solid state electrolytes are especially important for twistrons and supercapacitors used in textiles, and are also important for many of the other applications described. Examples of solid state electrolytes that are especially useful for invention embodiments are gels comprising a hydrophilic polymer that contains an aqueous solution of an acid, a base, a salt, a mixture of an acid and a salt, or a mixture of a base and a salt. Examples are a gel comprising 10 weight % (wt %) polyvinyl alcohol (PVA) in 0.1M HCl, which was used for a twistron harvester whose performance is presented in FIG. 4A, for the twistron harvesters that were sewn into the textile of FIG. 4B, and for the textile supercapacitor of FIG. 11A. As an example of the deployment of a solid state gel electrolyte that comprises a salt dissolved in water, a 10 wt % PVA/4.5 M LiCl gel electrolyte was used as a coating for the twistron harvesters of FIG. 4B, after the harvester electrodes were sewn into a textile. The ionic conductivity of this gel enabled ion flow between adjacent twistron harvester electrodes. In another example, a polyurethane-coated, non-coiled, twisted MWNT yarn was wrapped around a self-coiled MWNT yarn, which does the energy harvesting. The deployed polyurethane (PU) (Hydromed D4, from AdvanSource Biomaterials), which was used to prevent inter-electrode shorting in the solid-state twistron, is hydrophilic. Though this PU is not ionically conducting in the dry state, it expands when exposed to 0.1 M HCl as it absorbs up to 50 wt % water, allowing the free flow of ions.

When CNT yarn electrodes are coiled on an elastomeric mandrel fiber for use as supercapacitors for storing harvested energy, these yarns can usefully comprise non-twisted CNT yarns or CNT yarns having low degrees of twist, since elongation of the mandrel fiber will produce little change in capacitance. In contrast, elastic-mandrel-coiled tensile energy harvesters can be usefully made from CNT yarns that are highly twisted under tension to just below the twist needed to cause coiling.

A twistron fiber harvester (TFH) was fabricated from highly twisted yarns by helically wrapping the yarn on a silicone rubber fiber. Firstly, CNT yarn twisted in a clockwise direction when viewed from above (called S yarn) and a CNT yarn twisted in a counter-clockwise direction when viewed from above (called Z yarn) were prepared by high twist insertion into MWNT sheets under isobaric load until below a twist at which coiling occurs. Secondly, both S yarn and Z yarn were wound in the same clockwise direction around a 250 μm diameter rubber mandrel, which was stretched by 300%, similar to that shown in FIG. 9A. Coiling a S yarn by wrapping a rubber fiber in a clockwise direction produces a homochiral yarn (in which yarn twist and yarn winding around the rubber fiber have the same chirality) and coiling a Z yarn by wrapping a rubber fiber in a clockwise direction produces a heterochiral yarn (in which yarn twist and yarn wrapping around the rubber fiber have opposite chirality). Since homochiral yarns and heterochiral yarns undergo opposite voltage changes when stretched, both yarns contribute to harvesting when they are stretched on the same elastically deformed mandrel.

Figure 11B:
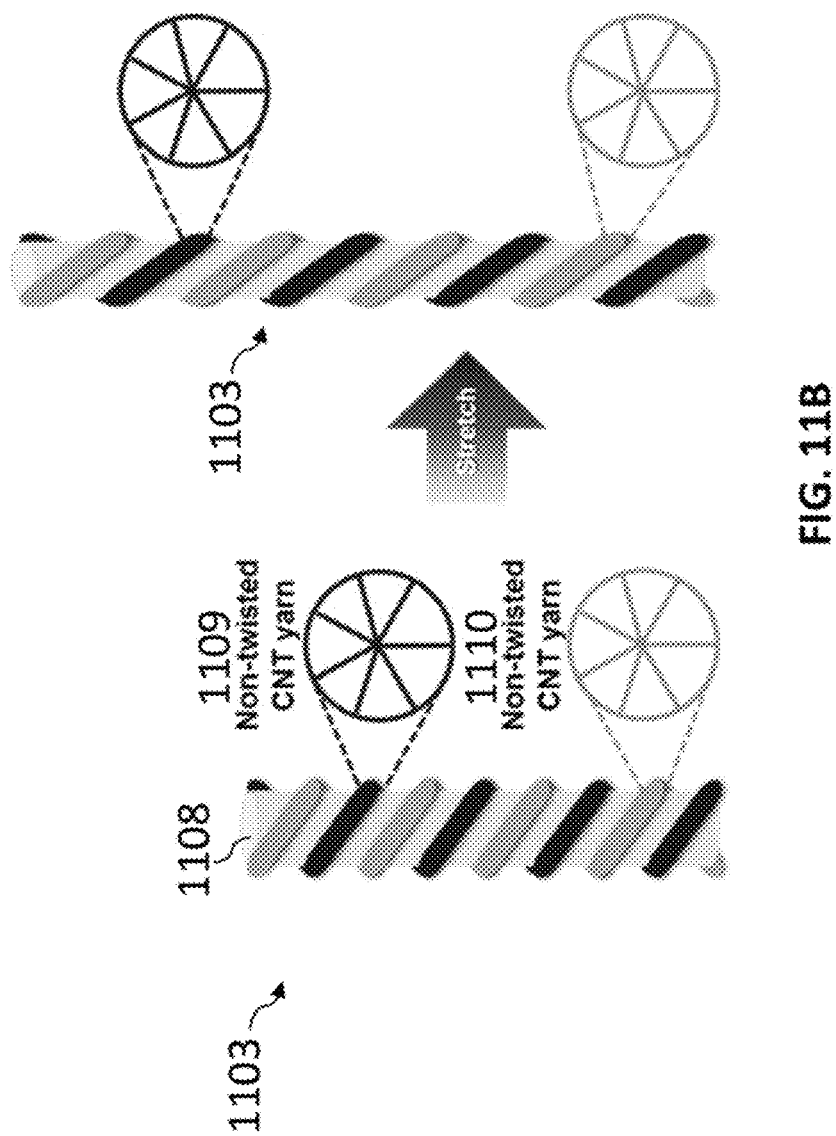

Flexible, stretchable fiber supercapacitors (SFSCs) were fabricated by a similar process as for the fiber harvester in FIG. 9A, except that the wrapped CNT yarns were non-twisted (or slightly twisted) to minimize voltage change during deformation, as shown in FIG. 11B. If the applied stretch used for the application (such as in a textile) is one that substantially elongates only the twistron harvester fibers, the supercapacitors used for energy storage can either be non-stretchable or stretchable, and can even be a second array of twistron harvesters that serve as supercapacitors. In general, twistron harvesters can be used as harvesters when they are stretched in an application mode and as supercapacitors when they are not stretched in this application mode. Similarly, stretchable or non-stretchable fibers that serve as batteries can be used to store the energy generated by the twistron harvesters, depending upon whether or not these fiber batteries are stretched during the application.

Figure 12B:
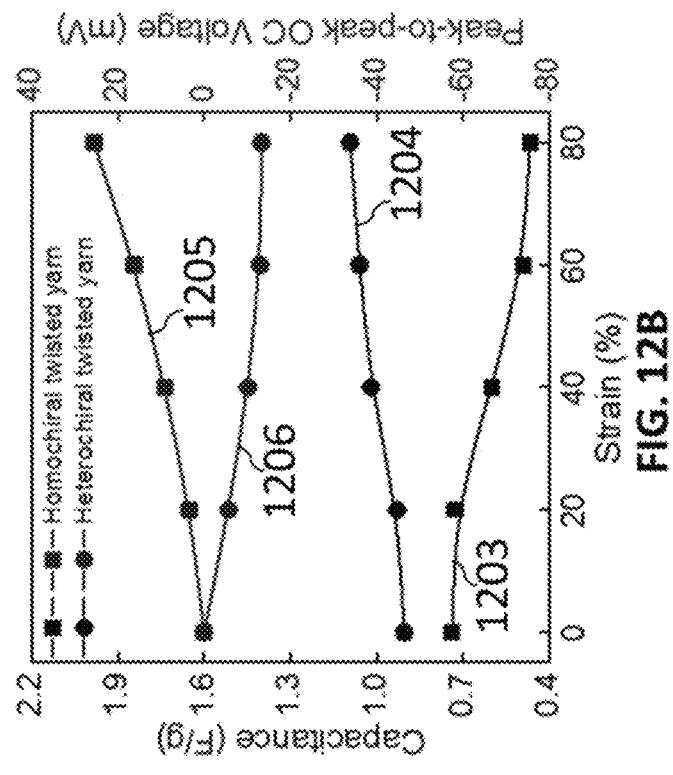
FIGS. 12A-12D show characterization of a twisted CNT yarn and the performance of the CNT yarn as an energy harvester.
Figure 12A:
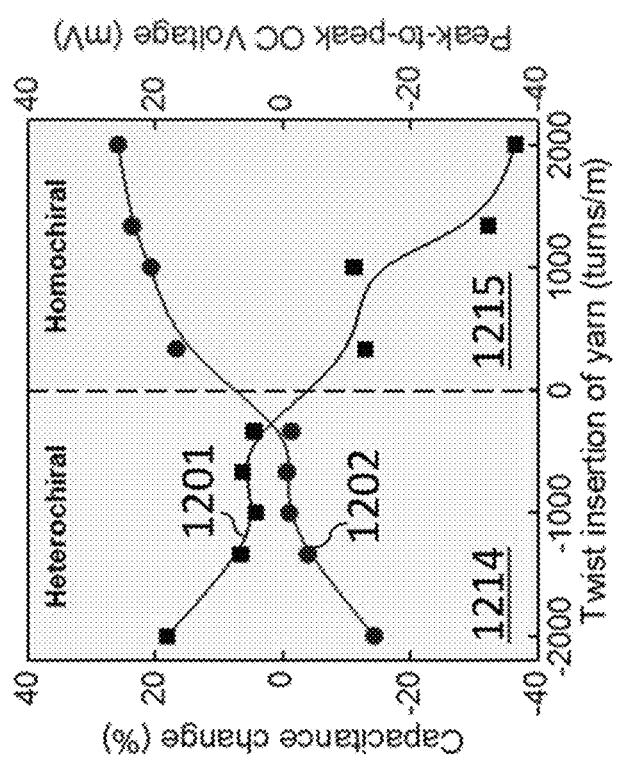

To optimize the harvester performance of highly twisted CNT yarn electrodes that were coiled on a 250-μm-diameter rubber fiber mandrel, these electrodes were characterized using an electrochemical cell that contains three-electrodes, which were the twistron CNT yarn working electrode, a Pt/CNT buckypaper counter electrode, and an Ag/AgCl reference electrode (which were in 0.1 M HCl electrolyte). FIG. 12A shows the twist dependence of percent capacitance change (plot 1201) and peak-to-peak open circuit voltage (plot 1202) of the homochiral and heterochiral CNT yarns that is measured for 80% strain change. A negative twist insertion and a positive twist insertion in these plots corresponds to Z and S directions of twist. Hence, a negative sign of twist insertion (region 1214) is for a heterochiral CNT yarn and positive sign of twist insertion (region 1215) is for a homochiral CNT yarn.

As S twist insertion of CNT yarn increases from 0 to 2000 turns/m, the capacitance change of CNT yarn decreases and the peak-to-peak OCV of the CNT yarn increases. On the other hand, as Z twist insertion of CNT yarn increases from 0 to −2000 turns/m, the capacitance change of CNT yarn increases and the peak-to-peak OCV of the CNT yarn decreases. Whether S yarn or Z yarn, yarns twisted up to just before coiling have the highest performance. In this condition, the homochiral yarn has −36.4% change of capacitance and a 25.9 mV peak-to-peak open circuit voltage (OCV), and the heterochiral yarn has an 18.2% capacitance change and a −14.3 mV peak-to-peak OCV. Plots 1203-1204 of FIG. 12B show capacitance versus strain of, respectively, the homochiral and heterochiral CNT yarn enwrapping rubber. Plots 1205-1206 of FIG. 12B show peak-to-peak open circuit voltage versus strain of, respectively, the homochiral and heterochiral CNT yarn enwrapping rubber.

The explanation for these results is as follows. Stretching a homochiral coiled CNT yarn causes the twist density of the CNT yarn to increase, which increases yarn density. On the other hand, stretching a heterochiral coiled CNT yarn causes the twist density of the CNT yarn to decrease, which decreases yarn density. As a result of yarn densification for the homochiral yarn that occurs on a scale comparable to the electrochemical double layer thickness, some pores in the yarn become too small to accommodate electrolyte ions, so the effective surface area and corresponding capacitance of the yarn decreases. If the amount of electrochemically accessible charge remains constant, this decrease in capacitance means that the electrode potential must change, which enables energy harvesting. Twistron harvesters, such as shown in 1102 in FIG. 11A, utilize this effect and its inverse for heterochiral yarns. When stretched, homochiral yarn up-twist causes the yarn's density to decrease and the OCV to increase and heterochiral yarn untwist causes the yarn's density to increase and the OCV to decrease.

Furthermore, this analysis and experimental data explains why the performance for energy harvesting increases with increasing yarn twist before coiling on the rubber mandrel. When stretching by 80%, the highly twisted yarn and non-twisted yarn (which both are enwrapping rubber fiber), the capacitance of highly twisted yarn decreased by 36.5% (from 0.73 F/g to 0.47 F/g) while yarn density increased from 1.00 g/cm$^3$ to 1.17 g/cm$^3$ (16.1% increase) by up-twist. The capacitance of non-twisted yarn barely changed while yarn density decreased from 0.656 to 0.664 g/cm$^3$ (1.3% change). These results agree with the explanation of the last paragraph.

The results shown in FIG. 12B demonstrate that a large fraction of the mechanically-induced capacitance change can be used for harvesting mechanical energy as electrical energy. If electrode charge is constant during stretch, this fraction is calculated as the ratio of the products of electrode potential relative to the electrochemical potential at zero charge (−126 mV vs. Ag/AgCl, which was obtained by piezoelectrochemical spectroscopy) and the capacitance of the yarn, where the numerator is before stretching and the denominator is after stretching. The thereby calculated fraction of stretch-induced capacitance change of the homochiral yarn and heterochiral yarn that contributed to harvesting were 68.9% and 91.8%, respectively, for a strain of 80%. However, stretch-induced OCV change of the homochiral yarn is larger than for the heterochiral yarn, as shown in FIG. 12B. The reason is that stretch-induced density changes of homochiral and heterochiral yarns were different. When stretched by 80% in electrolyte, the density of homochiral yarn increased by 16.1% (during up-twist), while the density of the heterochiral yarn decreased by 7.4% from 1.21 g/cm$^3$ to 1.12 g/cm$^3$ (untwist).

Figure 12C:
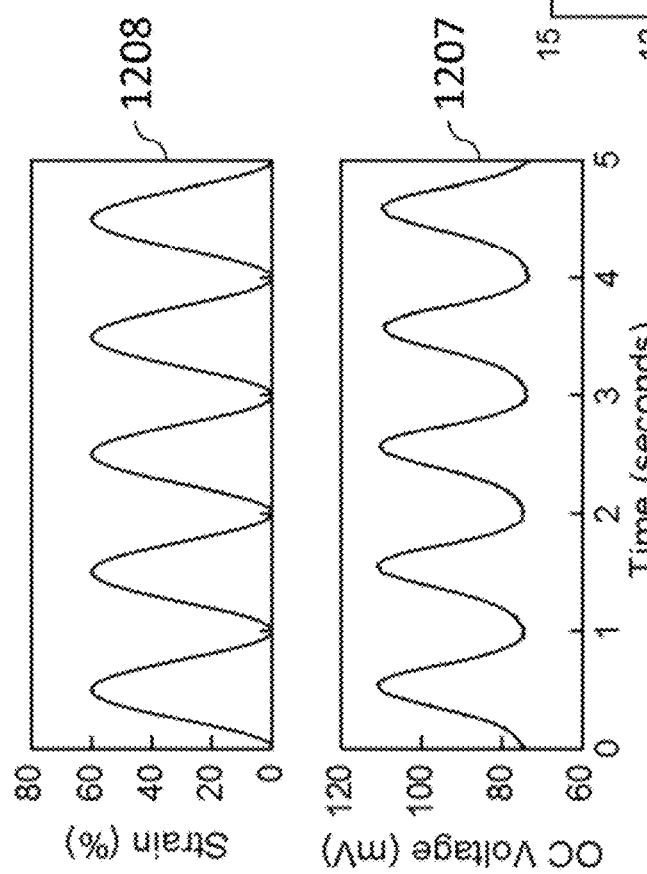
Figure 12D:
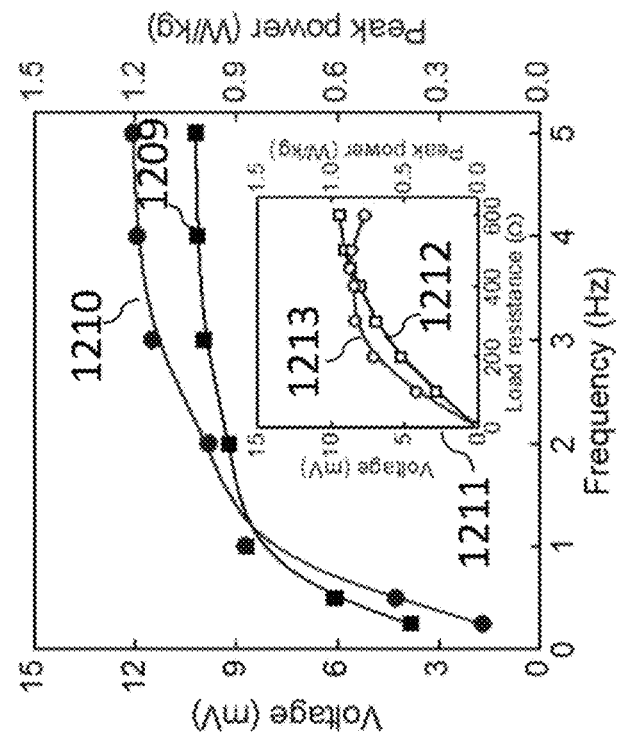

FIG. 12C shows the open circuit voltage of a one-body energy harvester with sinusoidal 60% strain at 1 Hz frequency (graphs 1207-1208, respectively). Plots 1209-1210 in FIG. 12D show, respectively, voltage and peak power versus frequency for the load resistance that maximizes power output. Plots 1212-1213 of inset 1211 of FIG. 12D show, respectively, voltage and peak power versus load resistance. FIGS. 12A-12B were measured for a three-electrode electrochemical cell in 0.1 M HCl electrolyte (working electrode: CNT yarn; counter electrode: Pt/CNT buckypaper, reference electrode: Ag/AgCl). Capacitance was measured from 0.3 to 0.6 V (Ag/AgCl) for a scan rate of 50 mV/s. FIGS. 12C-12D were measured for a two-stretched-electrode electrochemical cell in 0.1 M HCl/PVA 10 wt % solid electrolyte (working electrode: homochiral CNT yarn; counter electrode: heterochiral CNT yarn).

While stretching a single harvester electrode, and measuring voltage and current with respect to a static counter electrode, provides a good way to characterize this electrode, voltage and power output can be maximized by simultaneously using both working and counter electrodes as mechanical energy harvesters. Also, it is generally important for wearable textile application to convert the electrolyte-bath-operated fiber harvester into a lightweight, dual-electrode yarn harvester that operates in air. For this purpose, a modified one-body TFH was fabricated, comprising solid electrolyte gel in the yarn interiors (10 wt % polyvinyl alcohol, PVA, in 0.1 M HCl), S and Z yarns (1106 and 1107) that are coated with an ionically conducting polyurethane gel (1105), an inner silicone rubber fiber (1108), and a protective outer silicone rubber tube (1104), as shown in FIG. 11A. The polyurethane was used to prevent shorting between S and Z yarns, and allows ions to penetrate into the CNT yarn by absorbing solid electrolyte. S yarn and Z yarns enwrap rubber fibers in the same direction, which serve as working and counter electrodes, respectively. The modified one-body TFH can generate similar voltage and power compared with above reported twistron harvesters comprising laterally separated homochiral and heterochiral yarns (FIG. 4B).

FIG. 11A shows a SFSC containing solid electrolyte gel (10 wt % polyvinyl alcohol, PVA, in 0.1 M HCl) within slightly twisted anode and cathode CNT yarns, which are separately coated with polyurethane electrolyte. Both yarns are wrapped on the same silicone rubber fiber, and the total yarn assembly is within a silicone tube. Unlike the TFH, which generates electrical energy during mechanical deformation, the SFSC can store electrical energy during mechanical deformation for wearable applications without providing a potential change during stretch.

Figure 13A:
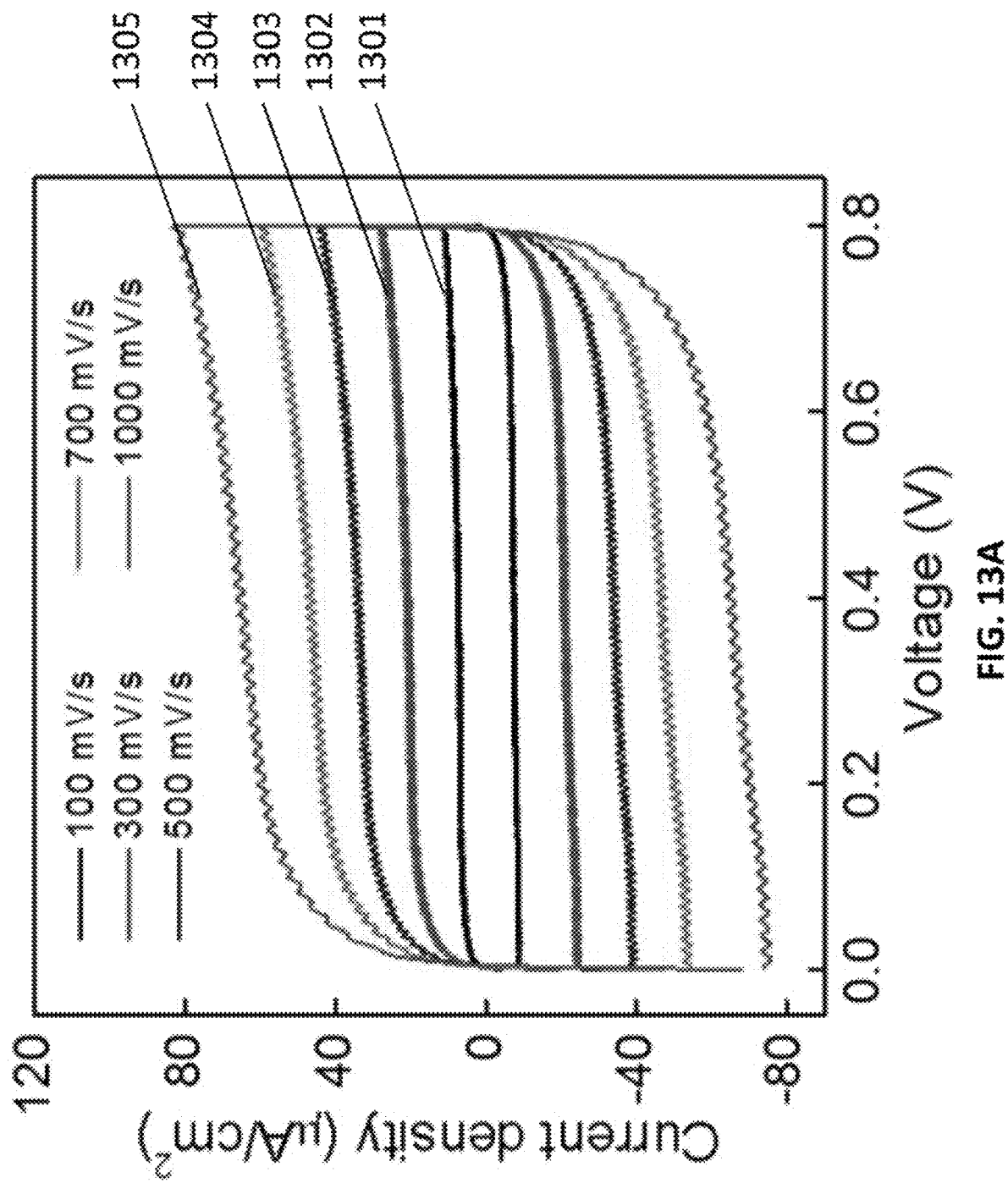
FIGS. 13A-13F show electrochemical performance of a solid-state MnO$_2$/CNT/nylon fiber supercapacitor.
Figures 13B, 13C:
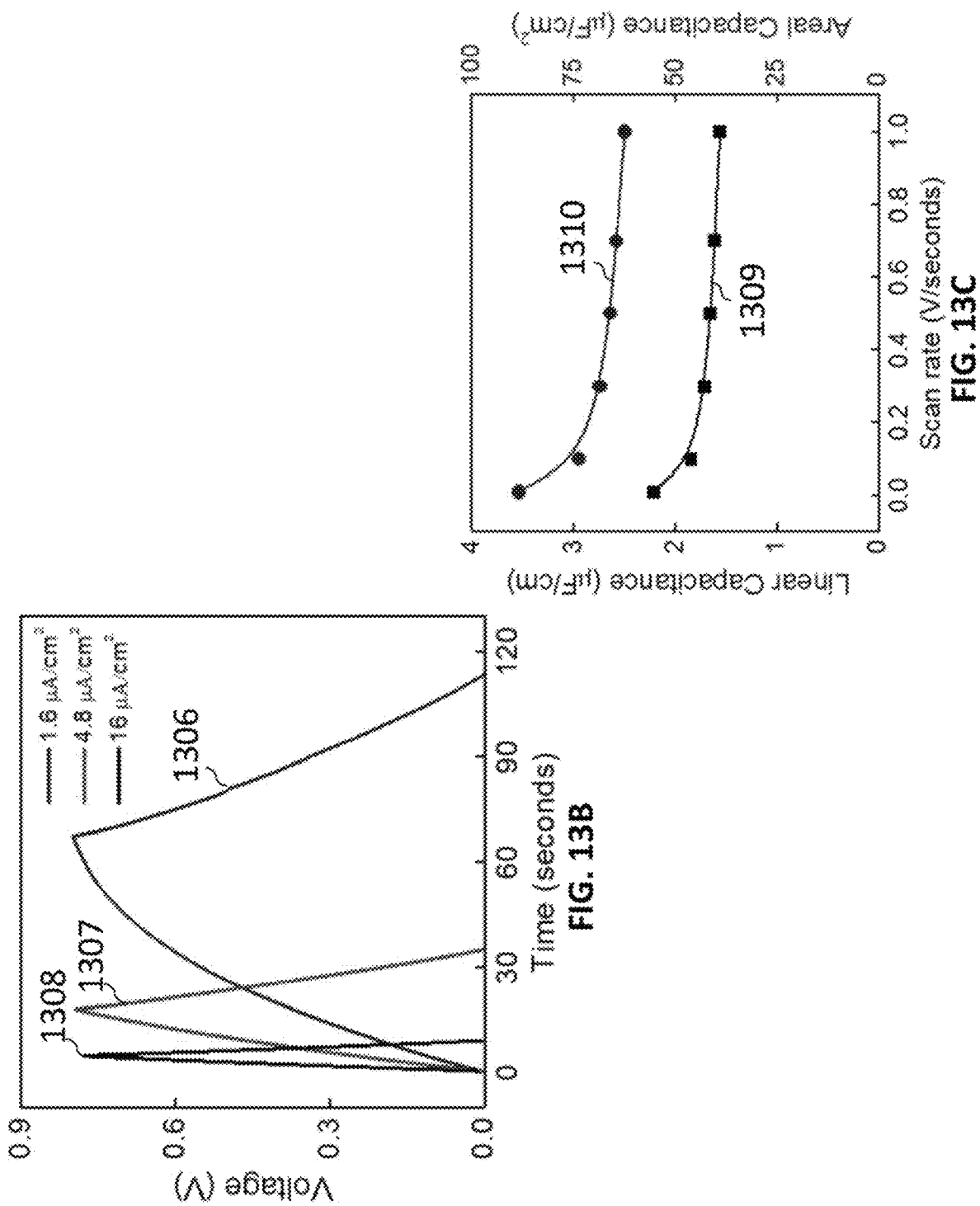

FIGS. 13A-13F show the electrochemical energy storage performance of a SFSC in solid electrolyte gel (10 wt % PVA/HCl). The cyclic voltammetry curves measured by various scan rates from 100 to 1000 mV/s, and galvanostatic charge-discharge curves for various current densities from 1.6 to 16 µA/cm$^2$ are shown in FIGS. 13A and 13B, respectively. FIG. 13A shows CV curves measured from 100 to 1000 mV/s for a solid-state stretchable fiber supercapacitor (SFSC) coated with solid electrolyte gel (comprising 10 wt % polyvinyl alcohol, PVA, in 0.1 M HCl). Plots 1301-1305 correspond to, respectively, 100, 300, 500, 700, and 1000 mV/s. FIG. 13B shows galvanostatic charge/discharge curves measured for current densities from 1.6 µA/cm$^2$ to 16 MA/cm$^2$. Plots 1306-1308 correspond to current densities of 1.6, 4.8, and 16 µA/cm$^2$, respectively.

The SFSC had area-normalized and length-normalized capacitances of 73.8 µF/cm$^2$ and 1.8 µF/cm, respectively, at a potential scan rate of 100 mV/s, and had 70.6% capacitance retention in going from a scan rate of 100 mV/s to 1000 mV/s (FIG. 13C). FIG. 13C shows the calculated linear capacitance (plot 1309, normalized by SFSC length) and areal specific capacitance (plot 1310, normalized by the surface area of the SFSC) at scan rates from 100 to 1000 mV/s.

Figure 13D:
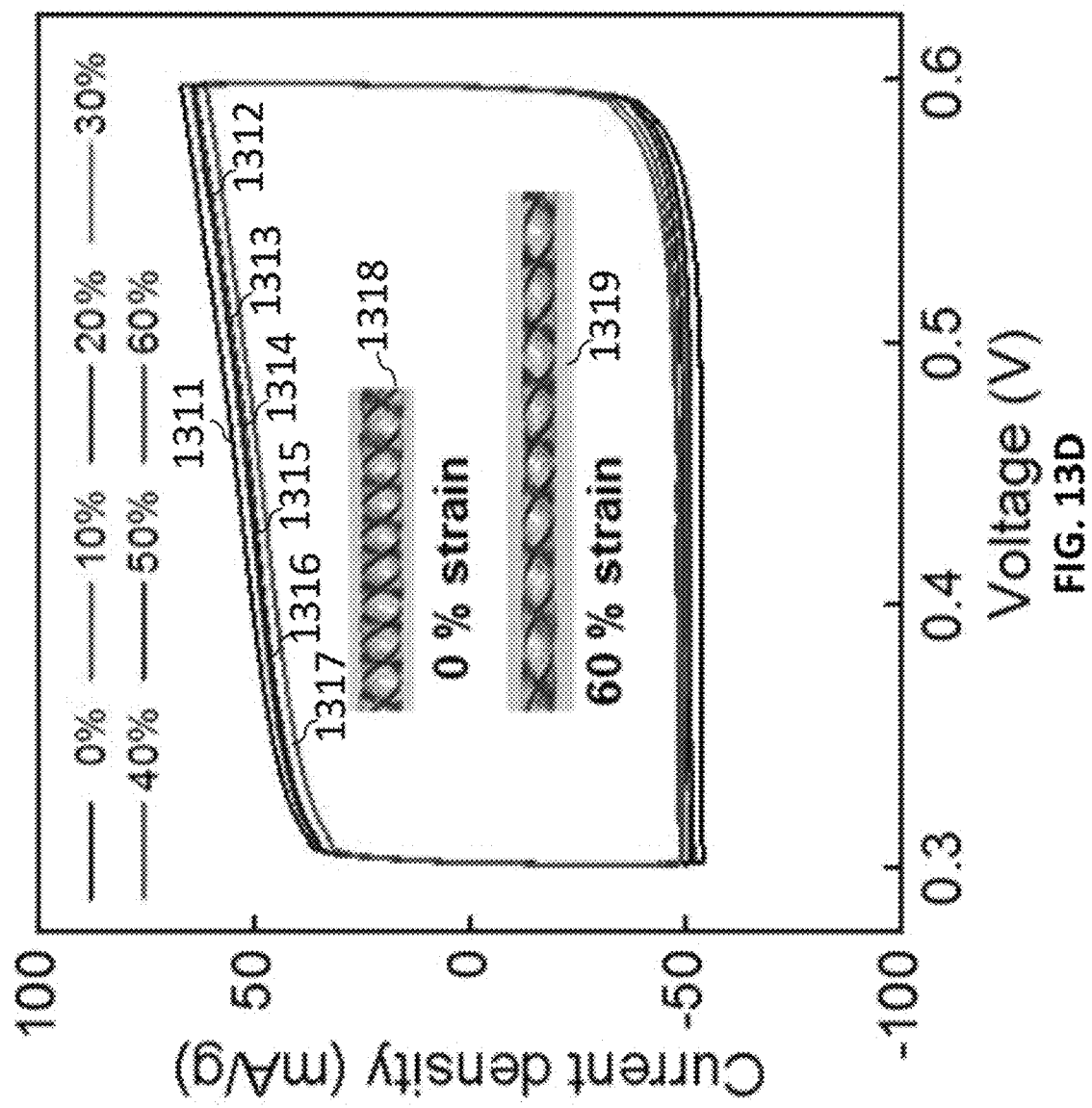
Figure 13E:
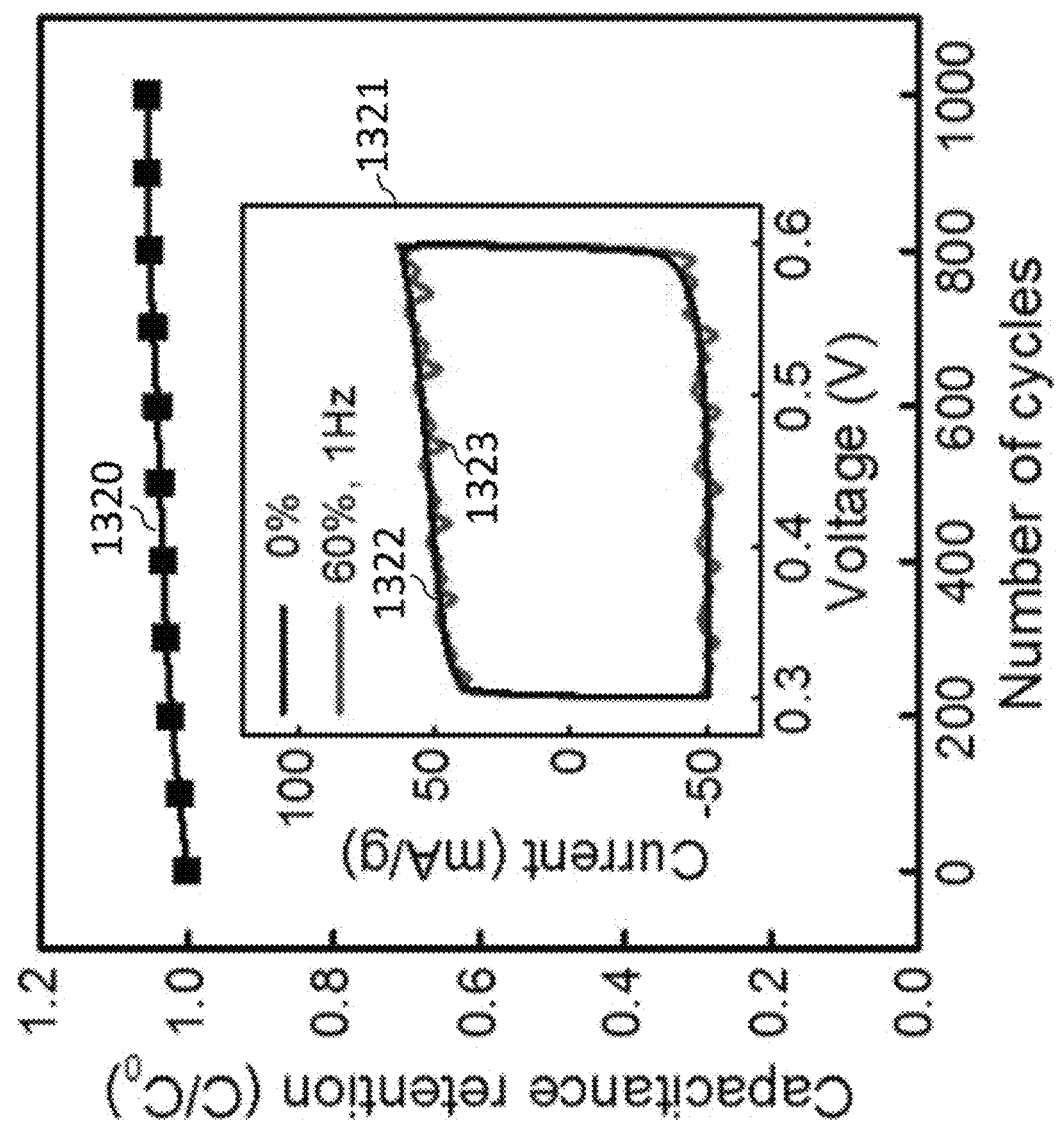
Figure 13F:
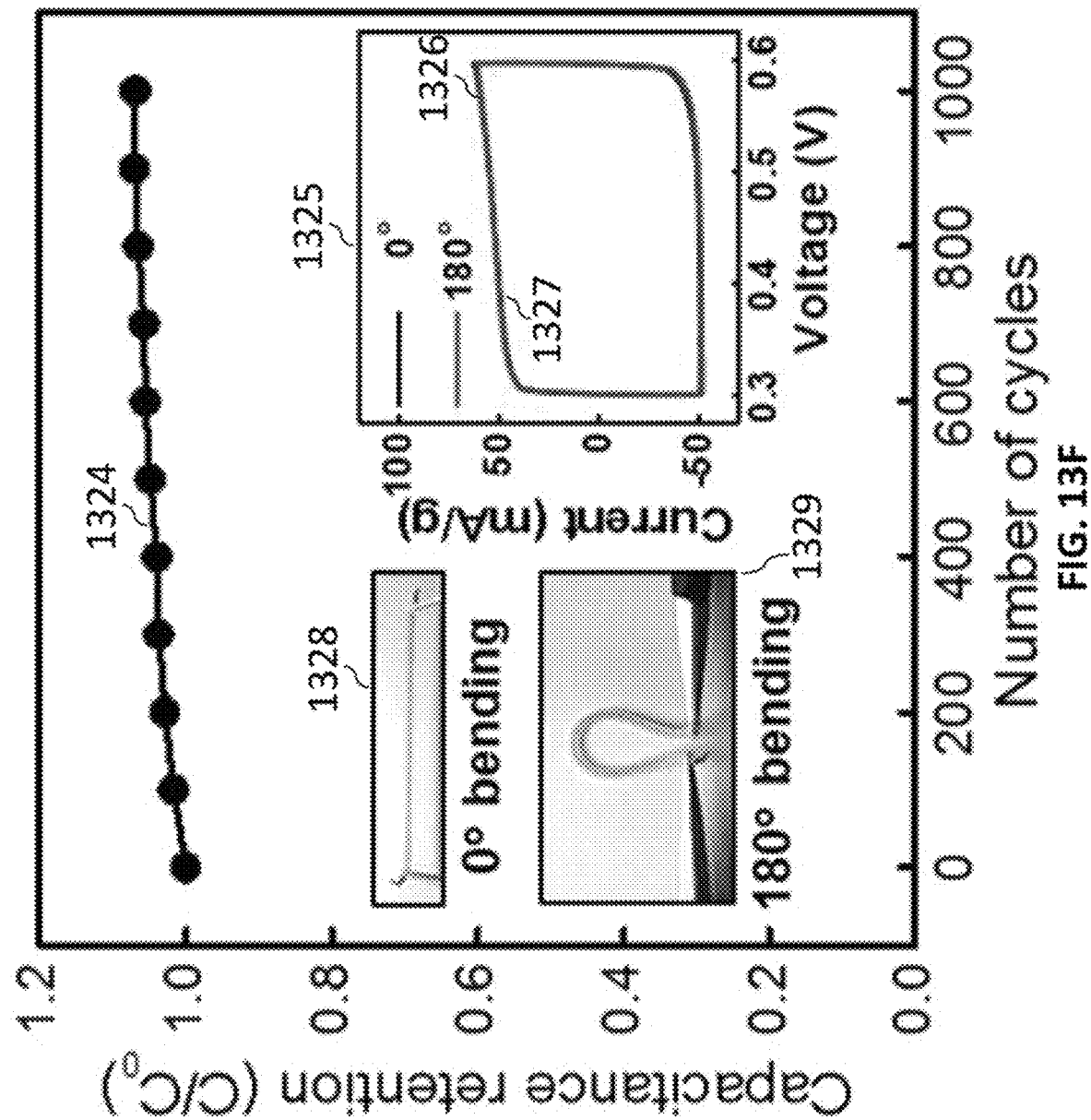

At scan rate of 50 mV/s, the SFSC shows less than 10% capacitance change (from 1.04 to 0.94 F/g) for a strain range from 0 to 60% (FIG. 13D), and excellent capacitance retention during this 60% strain dynamic sinusoidal stretching and during 180 degree bending deformation for 1000 cycles, as shown in FIGS. 13E-13F, respectively. FIG. 13D shows static CV curves for a solid-state SFSC at different strains (0 to 60%). Plots 1312-1317 correspond to 0%, 10%, 20%, 30%, 40%, 50%, and 60% strain, respectively. Insets 1318-1319 of FIG. 13D show optical images of SFSC at 0% and 60% strains, respectively. In FIGS. 13E-13F, the plots 1320 and 1324 show capacitance retention during sinusoidal stretching and 180 degree bending mechanical deformation for 1000 cycles, respectively. For FIGS. 13E-13F, capacitance was measured after mechanical deformation. Inset 1321 of FIG. 13E shows CV curves for the solid-state SFSC at 10% strain (Plot 1322) and during 1 Hz stretching to 60% strain (plot 1323). Insets 1328-1329 of FIG. 13F show optical images of SFSC before and after 180° of bending, respectively. Plots 1326-1327 of inset 1325 show CV curves of the solid-state SFSC before and after 180 degree bending. The CV curves of FIGS. 13D-13F were measured using a potential scan rate of 50 mV/s.

Since the frequency of human motion is generally below 10 Hz, these dynamic results are generally important for wearable devices. Although SFSC has smaller capacitance than other stretchable supercapacitors, it provides CV curves that are little effected by periodic stretch between 0% and 60% strain at 1 Hz (Insert 1321 of FIG. 13E). Also, it is generally important to configure the anode and cathode of supercapacitor to prevent electrical shorting. Several supercapacitor fibers, made using two-ply or parallel anode and cathode configurations, have shorting problems during mechanical deformation. In these regards, the present configuration of SFSC has the advantage of preventing shorting between anode and cathode during mechanical deformation, since both yarn electrodes are helically wound in parallel on the same rubber fiber core.

Figure 14A:
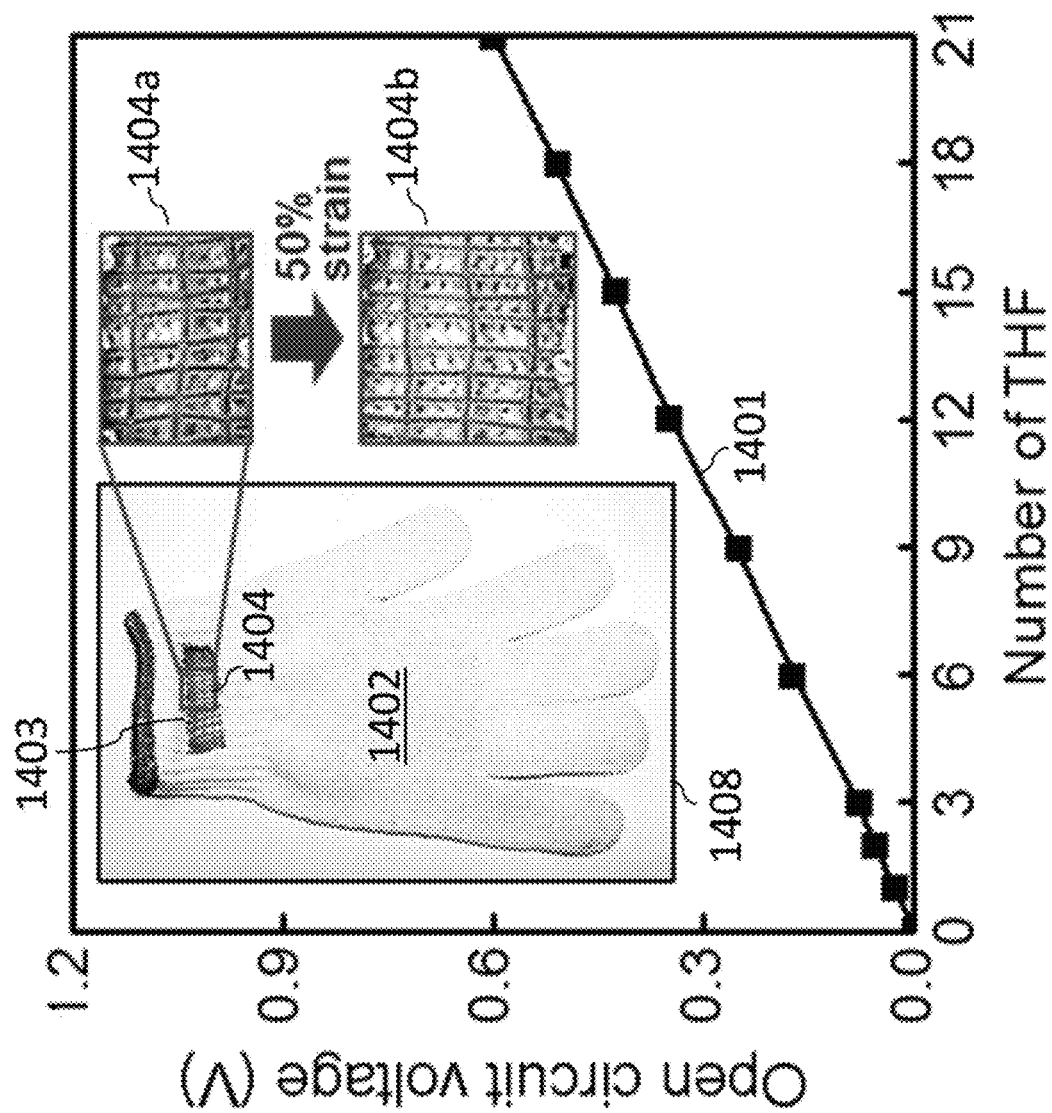

The above shows a combined package which both harvests mechanical energy into electrical energy and stores this electrical energy in a supercapacitor using optimized TFH (FIGS. 12A-12D) and SFSC (FIGS. 13A-13F). THF and SFSC are woven into a textile with energy harvesting yarns 905 (such as yarns 900 shown in FIG. 9A) in one direction and energy storing yarns 906 in the other direction, as shown in FIG. 9B. In order to increase the voltage generated from the package, the THFs are connected in series, while the SFSCs are connected in parallel to increase the amount of stored electrical charge (FIG. 14A). Inset 1408 of FIG. 14A shows a picture of an electricity generating and storing package 1403 (size: width: 5 cm; height: 2 cm), which was woven into a commercial glove 1402. This package comprised 21 THFs in the longitudinal direction and 3-SFSCss in the transverse direction. When THFs were connected in series (up to 21), the output voltage increased in proportion to the number of TFHs up to 600 mV when stretched to 50% strain (plot 1401). Insets 1404a-1404b of FIG. 14A (which are magnified images of box 1404 of package 1403) show optical images of an electricity generating and storing package at 0% and 50% strains.

Since THFs generate AC voltage, a rectification process using a bridge rectifier is required to convert AC voltage to rectified voltage for storing electrical energy in the SFSC. Graphs 1405-1406 of FIG. 14B show, respectively, the OCV and the rectified voltage from 21 THFs connected in series. Since the series voltage of this initial demonstration was only 600 mV, the combined voltage drop across two IN5817 diodes used in the bridge rectifier decreased the output to just 30 mV. FIG. 14C shows that SFSCs were charged by the rectified electrical voltage. As shown in plot 1407, the voltage across the SFSCs (45 µF) reached 18.8 mV within 18.3 seconds when the THF were sinusoidally stretched at 2-3 Hz to 50% strain. Adding additional harvesters in series or using diodes with a lower voltage drop would allow a greater voltage to charge the SFSCs.

Though the present combined energy harvesting and storing package based on CNT yarns is attractive compared with individual electrolyte-bath-immersed energy harvesting yarns, the realized output electrical energy and stored electrical energy is relatively small. The electrical voltage output can be increased by increasing the number of THFs that are connected in series. Connecting 40 THFs in series can produce a rectified voltage of IV. Also, the energy storage capability of SFSCs can be improved by various methods, such as serial connection, parallel connection, biscrolling with pseudocapacitor materials, or coated with pseudocapacitor materials.

These invention embodiments are applicable to twisted or coiled twistron harvesters for which the harvesting electrode or electrodes comprise conducting components in addition to, or instead of, carbon nanotubes. For example, graphene can be incorporated within a twisted or coiled CNT yarn by using a process called "biscrolling" (Lima 2011). In this biscrolling process, a guest material is deposited onto a sheet of nanofibers or microfibers, and thereafter the sheet is twisted to form a twisted or coiled yarn. As a result of this process, the guest material is trapped within the helical corridors of the yarn.

In one embodiment, micro-sized graphene oxide is dispersed in water, and deposited on a stack of forest-drawn CNT sheets. Thereafter, the resulting bilayer is twisted to make twisted or coiled graphene oxide/CNT yarns. This yarn is subsequently annealed at high temperature in vacuum to reduce the graphene oxide to graphene. This incorporation of graphene into a coiled CNT yarn provides a coiled yarn that is highly elastic, able to be reversibly stretched by over 50% even when the spring index is as small as 0.75. Using 1 Hz sinusoidal stretch to 100% strain, such yarns were able to provide over 240 mV peak-to-peak change in open circuit voltage, over 120 W/kg of peak power, and over 40 J/kg of electrical energy per cycle.

In another embodiment, graphene was deposited into a previously-twisted CNT yarn from a dispersion of graphene oxide by electrochemical deposition and reduction. Deposition was performed by immersing the yarn in a 1 M $LiClO_4$ electrolyte containing around 2.5 mg/mL of dispersed graphene oxide, and applying a –1.2 V potential relative to an Ag/AgCl reference electrode. The incorporation of graphene into the yarn resulted in a harvester capable of delivering over 280 mV of peak-to-peak change in open circuit voltage, a peak power of 330 W/kg, and an energy per cycle of over 75 J/kg during 1 Hz sinusoidal stretching.

Twistron harvesters need not comprise CNTs. The capacitance changes used for twistron energy harvesting can result from the effect of twist on either host nanofibers or guest materials. It is necessary for either the host yarn or guest particles to provide an electrically conducting pathway for collecting harvested charge. Additionally, it is necessary to provide an ionically conducting material inside the yarn. These requirements can be met by conducting percolated materials that are incorporated into an electrically insulating or electrically conducting yarn that does not comprise CNTs.

Graphitized nanofibers, which can be obtained by pyrolyzing electrospun polymers, like polyacrylonitrile, (Zussman 2005; Kim 2003) provide an attractive alternative material to carbon nanotubes for use in twistron yarns, since they can be spun to below 100 nm diameters and be modified by conventional surface treatment means to provide the electrochemical properties needed for a twistron harvester. As an alternative to using carbon nanofiber as the yarn component that directly provides the mechanically-induced capacitance changes used for harvesting mechanical energy as electrical energy, these yarns can act as the host for a capacitance changing guest. Useful examples of such guest capacitance-changing materials are carbon nanotubes, carbon nanohorns, graphene, fullerenes, activated carbon, carbon black, and combinations thereof.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above.

The disclosures of all patents, patent applications, and publications cited herein are hereby incorporated herein by reference in their entirety, to the extent that they provide exemplary, procedural, or other details supplementary to those set forth herein.

REFERENCES

M. Aureli et al., "Energy harvesting from base excitation of ionic polymer metal composites in fluid environments" *Smart Mater. Struct.* 19, 015003 (2010) ("Aureli 2010").

J. N. Barisci et al., "Electrochemical Properties of Single-Wall Carbon Nanotube Electrodes," *J. Electrochem. Soc.* 150, E409-E415 (2003) ("Barisci 2003").

S. Beeby, in *Energy Harvesting Technologies*, S. Priya, D. Inman, Eds. (Springer, New York, 2009), chap. 5 ("Beeby 2009").

N. Behabtu et al., "Strong, light, multifunctional fibers of carbon nanotubes with ultrahigh conductivity," *Science* 339, 6116, 182-186 (2013) ("Behabhm 2013").

S. Chiba et al., "Innovative power generators for energy harvesting using electroactive polymer artificial muscles," *Proc. Of SPIE* 6927, 692715 (2008) ("Chiba 2008").

J. Chmiola et al., "Anomalous increase in carbon capacitance at pore sizes less than 1 nanometer," *Science* 313, 1760-1763 (2006) ("Chmiola 2006").

C. Dagdeviren et al., "Conformal piezoelectric energy harvesting and storage from motions of the heart, lung, and diaphragm," *Proceedings of the National Academy of Sciences* 111, 1927-1932 (2014) ("Dagdeviren 2014").

J. Di et al, "Strong, twist-stable carbon nanotube yarns and muscles by tension annealing at extreme temperatures," *Adv. Mater.* 28, 6598-6605 (2016) ("Di 2016").

S. Efrima et al., "Measurement of the potential of zero charge of solid electrodes by the time-of-contact method," *J. Electrochem. Soc.: Electrochemical Science and Technology* 120, 879-882 (1973) ("Efrima 1973").

S. Ghosh et al., "Carbon nanotube flow sensors," *Science* 299, 1042 (2003) ("Ghosh 2003").

E. Gileadi et al., "The potential of zero charge of platinum and its pH dependence," *J. Phys. Chem.*, 70, 2044-2046 (1966) ("Gileadi 1966").

C. S. Haines et al., "New twist on artificial muscles," *Proc. Natl. Acad. Sci U.S.A* 113, 11709-11716 (2016) ("Haines 2016").

C. S. Haines et al., "Artificial Muscles from Fishing Line and Sewing Thread," *Science* 343, 868-872 (2014) ("Haines 2014").

T. Iwasita et al., "Adsorption of water at Pt(111) electrode in $HClO_4$ solutions. The potential of zero charge," *J. Electroanal. Chem.* 411, 95-102 (1996) ("Iwasita 1996").

B. Jaffe et al., Piezoelectric Ceramics, (Academic Press, London and New York, 1971) ("Jaffe 1971").

C. Kim et al., "Electrochemical properties of carbon nanofiber web as an electrode for supercapacitor prepared by electrospinning," *Appl. Phys. Lett.* 83, 1216-1218 (2003) ("Kim 2003")

S. Kim et al., "Electrochemically driven mechanical energy harvesting," *Nat. Commun.* 7, 10146 (2016) ("Kim 2016").

S. H. Kim et al., "Harvesting temperature fluctuations as electrical energy using torsional and tensile polymer muscles," *Energy Environ. Sci.* 8, 3336-3344 (2015) ("Kim 2015").

K. Koziol et al., "High-performance carbon nanotube fiber," *Science* 318, 1892-1895 (2007) ("Koziol 2007").

T. Krupenkin et al., "Reverse electrowetting as a new approach to high-power energy harvesting," *Nat. Commun.* 2, 448 (2011) ("Krupenkin 2011").

X. Lepró et al., "Catalytic Twist—Spun Yarns of Nitrogen—Doped Carbon Nanotubes," *Adv. Func. Mater.* 22, 1069-1075 (2012) ("Lepró 2012").

W. Li et al., "Spinning Carbon Nanotube Nanothread Under a Scanning Electron Microscope" *Materials* 4, 1519-1527 (2011) ("LI 2011").

M. D. Lima et al., "Electrically, Chemically, and Photonically Powered Torsional and Tensile Actuation of Hybrid Carbon Nanotube Yarn Muscles," *Science* 338, 928-932 (2012) ("Lima 2012").

M. D. Lima et al., "Biscrolling nanotube sheets and functional guests into yarns," *Science* 331, 51-55 (2011) ("Lima 2011").

J. Liu et al., "Multiwalled carbon nanotubes for flow-induced voltage generation," *Journal of Applied Physics* 101, (K64312 (6 pages) (2007) ("Liu 2007").

T. Mirfakharai et al., "Carbon Nanotube Yarns as High Load Actuators and Sensors," *Advances in Science and Technology* 61, 65-74 (2008) ("Mirfakharai 2008").

J. K. Moon et al., "Electrical power generation by mechanically modulating electrical double layers," *Nature Communications, DOI:*10.1038/ncomms2485 (2013) ("Moon 2013").

M. Motto et al., "High Performance Fibres from 'Dog Bone' Carbon Nanotubes," *Advanced Materials* 19, 3721-3726 (2007) ("Motto 2007").

S. Niu et al., "A Universal self-charging system driven by random biomechanical energy for sustainable operation of mobile electronics," *Nature Communications*|6: 8975|DOI: 10.1038/ncomms9975|(2015) ("Niu 2015").

T. Park et al., "Flexible PEDOT electrodes with large thermoelectric power factors to generate electricity by the touch of fingertips," *Energy Environ. Sci.* 6, 788 (2013) ("Park 2013").

R. Pelrine et al., "Dielectric elastomers: generator mode fundamentals and applications," *Proc. Of SPIE* 6927, 692715 (2008) ("Pelrine 2008").

L. Persano et al., "High performance piezoelectric devices based on aligned arrays of nanofibers of poly(vinylidene-fluoride-co-trifluoroethylene)," *Nat. Commun.* 4, 1633 (2013) ("Persano 2013").

J. P. Randin et al., "Differential capacitance study on the basal plane of stress-annealed pyrolytic graphite," *J. Electroanal. Chem. Interfacial Electrochem.* 36, 257-276 (1972) ("Randin 1972").

J. P. Randin et al., "Differential capacitance study of stress-annealed pyrolytic graphite electrodes," *J. Electrochem. Soc.* 118, 711-714 (1971) ("Randin 1971").

Y. Tanaka et al., "Experimentally determined redox potentials of individual (n,m) single-walled carbon nanotubes," *Angew. Chem. Int. Ed.* 48, 7655-7659 (2009) ("Tanaka 2009").

J. M. T. Thompson et al., "Supercoiling of DNA plasmids: mechanics of the generalized pl," *Proc. R. Soc. Lond. A* 458, 959-985 (2002) ("Thompson 2002").

Z. L. Wang et al., "Piezoelectric Nanogenerators Based on Zinc Oxide Nanowire Arrays," *Science* 312, 242-246 (2006) ("Wang 2006").

X. Wen et al., "Harvesting Broadband Kinetic Impact Energy from Mechanical Triggering/Vibration and Water Waves," *ACS Nano* 8, 7405-7412 (2014) ("Wen 2014").

J. Yin et al., "Generating electricity by moving a droplet of ionic liquid along graphene," *Nat. Nanotechnol.*, 9, 378-383 (2014) ("Yin 2014").

M.-F. Yu et al., "Structure and mechanical flexibility of carbon nanotube ribbons: An atomic-force microscopy study," *Journal of Applied Physics* 89, 4554-4557 (2001) ("Yu 2001").

M. Zhang et al., "Strong, transparent, multifunctional, carbon nanotube sheets," *Science* 309, 1215-1219 (2005) ("Zhang 2005").

M. Zhang et al., "Multifunctional carbon nanotube yarns by downsizing an ancient technology," *Science* 306, 1358-1361 (2004) ("Zang 2004").

E. Zussman et al., "Mechanical and structural characterization of electrospun PAN-derived carbon nanofibers," *Carbon* 43(10), 2175-2185 (2005) ("Zussman 2005").

What is claimed is:

1. A mechanical energy harvester comprising:
   (a) a first electrode;
   (b) a second electrode, wherein at least one electrode of the first electrode and the second electrode comprises a twisted, high-electrochemical-surface-area, conductive yarn; and
   (c) an electrolyte, wherein
      (i) both the first electrode and the second electrode are immersed in the electrolyte, and
      (ii) there exists a path through the electrolyte for ionic conductivity between the first electrode and the second electrode, and
   wherein the energy harvester is operable to generate power without an external bias voltage by deformation of the twisted high-electrochemical-surface area, conductive yarn.

2. The energy harvester of claim 1, wherein the twisted yarn is additionally coiled.

3. The coiled energy harvester of claim 2, wherein the twisted yarn has a coil spring index that is between 0.2 and 0.8.

4. The energy harvester of claim 1, wherein the energy harvester is operable to convert tensile deformation directly into electrical energy.

5. The energy harvester of claim 1, wherein the energy harvester is operable to convert torsional deformation directly into electrical energy.

6. The energy harvester of claim 1, wherein
   (a) the energy harvester comprises a high-surface-area carbon material, and
   (b) the high-surface-area carbon material is selected from a group consisting of carbon nanotubes, carbon nanohorns, graphene, fullerene, activated carbon, carbon black, carbon nanofibers, and combinations thereof.

7. The energy harvester of claim 1, wherein the energy harvester is operable to provide at least 20 W of peak electrical power per kilogram of the twisted, high-electrochemical-surface-area, conductive yarn when stretched at rates above 20 Hz.

8. The energy harvester of claim 1, wherein the energy harvester is operable to provide at least 10 J of electrical energy per kilogram of the twisted, high-electrochemical-surface-area, conductive yarn per mechanical cycle.

9. The energy harvester of claim 1, wherein the twisted yarn has a diameter between 10 μm and 500 μm.

10. The energy harvester of claim 1, wherein the twisted yarn has a diameter between 100 nm and 10 μm.

11. The energy harvester of claim 1, wherein at least one electrode of the first electrode and the second electrode comprises an overcoat comprising an elastomeric barrier material.

12. The energy harvester of claim 1, wherein the energy harvester is operable to generate a change of voltage of at least 50 mV during stretch.

13. The energy harvester of claim 1, wherein the twisted yarn is wrapped around an elastomeric support.

14. The energy harvester of claim 1, wherein both the first electrode and the second electrode comprise twisted, high-electrochemical-surface area, conductive yarn.

15. The energy harvester of claim 14, wherein
   (a) the first electrode increases in potential when stretched, and
   (b) the second electrode decreases in potential when stretched.

16. The energy harvester of claim 15, wherein
   (a) the first electrode comprises homochiral coils, and
   (b) the second electrode comprises heterochiral coils.

17. A method comprising:
   (a) selecting a twistron mechanical energy harvester comprising an electrode comprising a twisted, high-electrochemical-surface-area, conductive yarn, wherein the electrode is immersed in an electrolyte, and
   (b) applying mechanical energy to deform the yarn by tension, torsion, or combinations thereof, to convert the mechanical energy directly to electrical energy.

18. The method of claim 17, wherein the twisted, high-electrochemical-surface-area, conductive yarn is additionally coiled.

19. The method of claim 17, wherein
   (a) the yarn comprises high-surface-area carbon material, and
   (b) the high-surface-area carbon material is selected from a group consisting of carbon nanotubes, carbon nanohorns, graphene, fullerene, activated carbon, carbon black, carbon nanofibers, and combinations thereof.

20. The method of claim 17, wherein the electrode generates an average electrical power of at least 1 W per kilogram of the twisted, high-electrochemical-surface-area, conductive yarn, without requiring an external bias voltage.

21. The method of claim 17, wherein the twistron mechanical energy harvester provides at least 20 W of peak electrical power per kilogram of the twisted, high-electrochemical-surface-area, conductive yarn when stretched at rates above 20 Hz.

22. The method of claim 17, wherein the twistron mechanical energy harvester provides at least 1 J of electrical energy per kilogram of the twisted, high-electrochemical-surface-area, conductive yarn, per mechanical cycle.

23. The method of claim 17, wherein the twisted yarn has a diameter between 10 μm and 500 μm.

24. The method of claim 17, wherein the twisted single yarn has a diameter between 100 nm and 10 μm.

25. The method of claim 17, wherein the electrode comprises an overcoat comprising an elastomeric barrier material.

26. The method of claim 17, wherein the twisted yarn is wrapped around a stretchable core.

27. The method of claim 17, wherein the mechanical energy is supplied by a human body.

28. The method of claim 17, wherein the mechanical energy is supplied by an oscillating source.

29. The method of claim 17 further comprising utilizing the generated electrical energy to power a device selected from a group consisting of sensor nodes, sensors, actuators, transmitters, wearable electronics, and combinations thereof.

30. The method of claim 17, wherein the energy harvester is incorporated into a textile.

\* \* \* \* \*